US011905758B2

(12) United States Patent
Graybar et al.

(10) Patent No.: US 11,905,758 B2
(45) Date of Patent: Feb. 20, 2024

(54) ROLLER SHADE ASSEMBLY

(71) Applicant: Springs Window Fashions, LLC, Middleton, WI (US)

(72) Inventors: Michael Allen Graybar, Madison, WI (US); Eric Nathan Krantz-Lilienthal, Janesville, WI (US); Jason Wilhelm Hall, Dane, WI (US); Jake Malesky, Middleton, WI (US); Benjamin James Kolbeck, Madison, WI (US); Brian Matthew Albrecht, Middleton, WI (US)

(73) Assignee: Springs Window Fashions, LLC, Middleton, WI (US)

( * ) Notice: Subject to any disclaimer, the term of this patent is extended or adjusted under 35 U.S.C. 154(b) by 0 days.

(21) Appl. No.: 17/366,674

(22) Filed: Jul. 2, 2021

(65) Prior Publication Data

US 2022/0003041 A1 Jan. 6, 2022

Related U.S. Application Data

(60) Provisional application No. 63/047,554, filed on Jul. 2, 2020.

(51) Int. Cl.
*E06B 9/60* (2006.01)
*E06B 9/174* (2006.01)
(Continued)

(52) U.S. Cl.
CPC ................ *E06B 9/60* (2013.01); *E06B 9/174* (2013.01); *E06B 9/88* (2013.01); *E06B 2009/804* (2013.01)

(58) Field of Classification Search
CPC ..... E06B 9/50; E06B 9/56; E06B 9/60; E06B 9/62; E06B 9/80; E06B 2009/807;
(Continued)

(56) References Cited

U.S. PATENT DOCUMENTS 1,905,980 A 4/1933 Burns
4,224,973 A * 9/1980 Hugin ..................... E06B 9/361 160/176.1 V
(Continued)

FOREIGN PATENT DOCUMENTS

CA 2905672 A1 * 6/2008 ............... E06B 9/50
EP 3002406 A1 4/2016
(Continued)

OTHER PUBLICATIONS

PCT Document: Invitation To Pay Additional Fees And, Where Applicable, Protest Fee, for related Application No. PCT/US2021/040276 dated Oct. 26, 2021 (15 Pages).
(Continued)

*Primary Examiner* — Abe Massad
*Assistant Examiner* — Matthew R. Shepherd
(74) *Attorney, Agent, or Firm* — Michael Best & Friedrich LLP

(57) ABSTRACT

A roller shade assembly includes a roller tube including a first end opposite a second end, the roller tube defining an opening longitudinally extending between the first and second ends, and an idler assembly partially received by the opening at the first end, the idler assembly including an idler housing, a plunger received by the idler housing, and a biasing member configured to apply a biasing force onto the plunger, wherein the plunger is configured to slide relative to the idler housing, and the plunger is configured to selectively engage a bracket member.

18 Claims, 53 Drawing Sheets

(51) Int. Cl.
*E06B 9/88* (2006.01)
*E06B 9/80* (2006.01)

(58) Field of Classification Search
CPC ... E06B 9/88; E06B 9/90; E06B 9/174; E06B 2009/804
See application file for complete search history.

(56) References Cited

U.S. PATENT DOCUMENTS

| | | | | |
|---|---|---|---|---|
| 4,373,569 | A * | 2/1983 | Barettella | E06B 9/50 160/323.1 |
| 4,838,333 | A * | 6/1989 | Mottura | E06B 9/80 192/12 B |
| 5,437,324 | A | 8/1995 | Sternquist | |
| 5,706,876 | A | 1/1998 | Lysyj | |
| 5,934,354 | A | 8/1999 | Price et al. | |
| 5,975,185 | A | 11/1999 | Miller et al. | |
| 6,134,835 | A | 10/2000 | Krupke et al. | |
| 6,244,325 | B1 | 6/2001 | Miller et al. | |
| 6,854,503 | B2 | 2/2005 | Cross et al. | |
| 7,051,782 | B2 | 5/2006 | Nichols, Jr. et al. | |
| RE39,504 | E | 3/2007 | Scates et al. | |
| 7,240,716 | B2 | 7/2007 | Nichols, Jr. et al. | |
| 7,717,156 | B2 | 5/2010 | Costello et al. | |
| 8,299,734 | B2 | 10/2012 | Mullet et al. | |
| 8,567,476 | B2 | 10/2013 | Costello et al. | |
| 8,575,872 | B2 | 11/2013 | Mullet et al. | |
| 8,659,246 | B2 | 2/2014 | Mullet et al. | |
| 8,739,854 | B2 | 6/2014 | Mullet et al. | |
| 8,739,943 | B2 * | 6/2014 | Hopson | F16D 65/853 188/264 D |
| 8,791,658 | B2 | 7/2014 | Mullet et al. | |
| 8,800,633 | B2 | 8/2014 | Mullet et al. | |
| 8,807,196 | B2 | 8/2014 | Mullet et al. | |
| 8,893,766 | B2 | 11/2014 | Bohlen | |
| 8,919,419 | B2 | 12/2014 | Mullet et al. | |
| 9,018,868 | B2 | 4/2015 | Lucas et al. | |
| 9,062,494 | B2 * | 6/2015 | Chen | E06B 9/60 |
| 9,152,032 | B2 | 10/2015 | Mullet et al. | |
| 9,194,179 | B2 | 11/2015 | Mullet et al. | |
| 9,206,634 | B1 | 12/2015 | Prieto et al. | |
| 9,353,570 | B2 | 5/2016 | Smith et al. | |
| 9,394,743 | B2 | 7/2016 | Mullet et al. | |
| 9,611,690 | B2 | 4/2017 | Mullet et al. | |
| 9,663,987 | B2 | 5/2017 | Huang et al. | |
| 9,663,988 | B2 | 5/2017 | Merker et al. | |
| 9,708,842 | B1 | 7/2017 | Giese | |
| 10,138,676 | B2 | 11/2018 | Bohlen et al. | |
| 10,221,622 | B2 | 3/2019 | Campagna | |
| 10,246,938 | B2 | 4/2019 | Mullet et al. | |
| 10,415,304 | B2 | 9/2019 | Merker et al. | |
| 10,480,231 | B2 | 11/2019 | Giese | |
| 10,590,699 | B2 | 3/2020 | Chen | |
| 10,738,530 | B2 | 8/2020 | Campagna | |
| 2006/0272782 | A1 | 12/2006 | Nichols et al. | |
| 2008/0314533 | A1 | 12/2008 | Park | |
| 2009/0283226 | A1 | 11/2009 | Cheng | |
| 2012/0234956 | A1 * | 9/2012 | Lin | E06B 9/60 185/37 |
| 2013/0333848 | A1 | 12/2013 | Mullet et al. | |
| 2014/0014280 | A1 * | 1/2014 | Bohlen | E06B 9/78 160/291 |
| 2014/0157547 | A1 | 6/2014 | Chen | |
| 2015/0047795 | A1 | 2/2015 | Bohlen et al. | |
| 2015/0300086 | A1 | 10/2015 | Chen et al. | |
| 2016/0083999 | A1 * | 3/2016 | Chen | E06B 9/50 160/315 |
| 2016/0201390 | A1 | 7/2016 | Mcgowan | |
| 2017/0218703 | A1 * | 8/2017 | Wei | F16H 29/12 |
| 2018/0106107 | A1 * | 4/2018 | Smith | E06B 9/322 |
| 2018/0112462 | A1 | 4/2018 | Chen et al. | |
| 2018/0252034 | A1 | 9/2018 | Lin et al. | |
| 2018/0305980 | A1 | 10/2018 | Hall et al. | |
| 2019/0100961 | A1 | 4/2019 | Kutell et al. | |
| 2019/0128063 | A1 | 5/2019 | Bohlen et al. | |
| 2019/0136617 | A1 * | 5/2019 | Kao | E06B 9/42 |
| 2019/0257146 | A1 | 8/2019 | Norton | |
| 2019/0257149 | A1 | 8/2019 | Lei et al. | |
| 2020/0080372 | A1 | 3/2020 | Hsu et al. | |
| 2020/0141183 | A1 | 5/2020 | Jang | |
| 2020/0248505 | A1 | 8/2020 | Dahlgren et al. | |
| 2020/0284093 | A1 | 9/2020 | Dahlgre et al. | |
| 2022/0106835 | A1 * | 4/2022 | Francoeur | E06B 9/42 |

FOREIGN PATENT DOCUMENTS

| | | | | |
|---|---|---|---|---|
| EP | 3018283 | A1 | 5/2016 | |
| EP | 3611329 | A1 | 2/2020 | |
| EP | 2820224 | B1 | 4/2020 | |
| EP | 3561216 | B1 | 11/2020 | |
| EP | 3739162 | A1 | 11/2020 | |
| GB | 2564228 | A * | 1/2019 | E06B 9/42 |
| WO | 2014203287 | A1 | 12/2014 | |
| WO | 2018132337 | A1 | 7/2018 | |
| WO | 2018235993 | A1 | 12/2018 | |
| WO | 2020132750 | A1 | 7/2020 | |
| WO | 2020160651 | A1 | 8/2020 | |

OTHER PUBLICATIONS

Draper Inc., "FlexShade® Coupler," <https://www.draperinc.com/windowshades/productdetail.aspx?detail=34> website visited May 1, 2018, 3 pages.

Qmotion, "Torsion Spring Counterbalance Replacement Instructions," publicly available at least as early as May 1, 2018, 1 page.

Vulcan Spring, "Contorque@ Constant Torque Springs," <http://www.vulcanspring.com/contorque-constant-torque-springs>website visited May 1, 2018, 3 pages.

* cited by examiner

ROLLER SHADE ASSEMBLY

CROSS-REFERENCE TO RELATED APPLICATIONS

This application claims priority to U.S. Provisional Patent Application No. 63/047,554, filed on Jul. 2, 2020 and entitled "Roller Shade Assembly," the contents of which is hereby incorporated by reference in its entirety.

FIELD OF THE DISCLOSURE

The present disclosure relates to a covering for an architectural opening. More specifically, the present disclosure relates to an improved roller shade and associated assembly for selectively adjusting a position of the covering relative to the architectural opening.

SUMMARY

In one example of an embodiment, a roller shade assembly includes a roller tube including a first end opposite a second end, the roller tube defining an opening longitudinally extending between the first and second ends, and an idler assembly partially received by the opening at the first end, the idler assembly including an idler housing, a plunger received by the idler housing, and a biasing member configured to apply a biasing force onto the plunger, wherein the plunger is configured to slide relative to the idler housing, and the plunger is configured to selectively engage a bracket member.

In another example of an embodiment, an idler assembly includes an idler housing, a plunger received by the idler housing, and a biasing member configured to apply a biasing force onto the plunger, wherein the plunger is configured to slide relative to the idler housing, and the plunger is configured to selectively engage a bracket member.

In another example of an embodiment, an idler assembly includes an idler housing, a plunger received by the idler housing, and a biasing member configured to apply a biasing force onto the plunger, wherein the plunger is configured to slide relative to the idler housing along an axis, the axis defining an axis of rotation of a roller tube, and the plunger is configured to selectively engage a bracket member.

In another example of an embodiment, an idler assembly includes an idler housing, a plunger received by the idler housing, a biasing member configured to apply a biasing force onto the plunger, a timing ring coupled to the idler housing, the timing ring is configured to rotate relative to the idler housing and laterally travels along the idler housing. The idler housing can include a support collar defining a first stop member, and the timing ring can defines a second stop member, wherein in response to the second stop member contacting the first stop member, the timing ring is restricted from rotational movement relative to the idler housing in a first direction.

In another example of an embodiment, a spring assembly includes a housing, a shaft received by the housing, and a spring member connected at one end to the housing and at an opposite end to the shaft, the spring assembly received by a roller tube. A spring drive can include a drive shaft, the spring drive received by the roller tube. The spring assembly can be configured to interlock with the idler housing, the drive shaft of the spring drive can be configured to engage the shaft of the spring assembly, and the spring assembly can be configured to apply a counterbalancing force to the roller tube.

In another example of an embodiment, a first spring assembly includes a first housing, a first shaft received by the housing, and a first spring member connected at one end to the first housing and at an opposite end to the first shaft, the first spring assembly can be received by a roller tube, a second spring assembly includes a second housing, a second shaft received by the second housing, and a second spring member connected at one end to the second housing and at an opposite end to the second shaft, the second spring assembly can be received by the roller tube, and a spring drive including a drive shaft, the spring drive received by the roller tube. The first housing of the first spring assembly can be configured to interlock with the idler housing, the second shaft of the second spring assembly can be configured to engage the first shaft of the first spring assembly, and the drive shaft of the spring drive can be configured to engage the second shaft of the second spring assembly. The first spring assembly and the second spring assembly are each configured to apply a counterbalancing force to the roller tube, and the counterbalancing forces generated by the first spring assembly and the second spring assembly are arranged in parallel.

In another example of an embodiment, a first spring assembly includes a first housing, a first shaft received by the housing, and a first spring member connected at one end to the first housing and at an opposite end to the first shaft, the first spring assembly can be received by a roller tube. A second spring assembly includes a second housing, a second shaft received by the second housing, and a second spring member connected at one end to the second housing and at an opposite end to the second shaft, the second spring assembly can be received by the roller tube. A series connection assembly includes a third housing and a third shaft, the series connection assembly is connected to the first spring assembly and the second spring assembly. A spring drive including a drive shaft, the spring drive can be received by the roller tube. The first housing of the first spring assembly is configured to interlock with the idler housing, the first shaft of the first spring assembly is configured to engage the third shaft of the series connection assembly, the second housing of the second spring assembly is configured to interlock with the third housing of the series connection assembly, and the drive shaft of the spring drive is configured to engage the second shaft of the second spring assembly. The first spring assembly and the second spring assembly are each configured to apply a counterbalancing force to the roller tube, and the counterbalancing forces generated by the first spring assembly and the second spring assembly are in arranged in series.

In another example of an embodiment, a brake assembly includes a brake shaft partially received by a brake housing, a brake cap coupled to the brake shaft, a plurality of braking surfaces carried by the brake shaft and received by the brake housing, and a brake force adjustment member partially received by the brake housing and in operable engagement with the plurality of braking surfaces. The brake cap can be configured to engage the roller tube. In response to rotation of the brake force adjustment member relative to the brake housing, a braking force applied by the plurality of braking surfaces to a roller tube can be adjusted.

Other aspects of the disclosure will become apparent by consideration of the detailed description and accompanying drawings.

Figure 1:
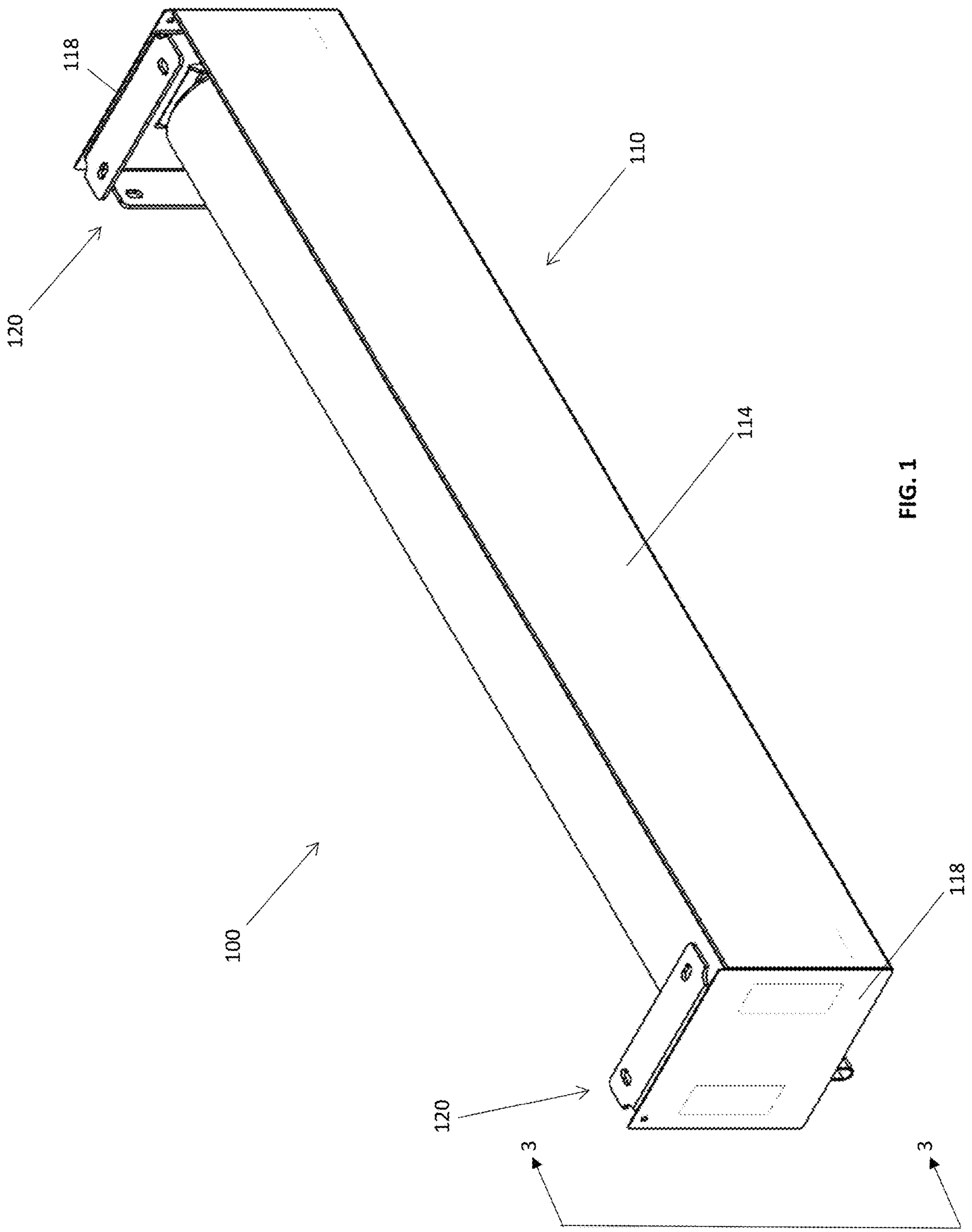
FIG. 1 is a perspective view of an embodiment of a roller shade assembly shown detached from an architectural opening.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The present disclosure is generally directed to a roller shade assembly 100 for selectively adjusting a position of a covering relative to an architectural opening. The roller shade assembly 100 includes a cover assembly 110 (shown in FIGS. 1-2), a bracket assembly 120 (shown in FIG. 1), and a roller tube assembly 200 (shown in FIGS. 2 and 4).

For ease of discussion and understanding, the following detailed description will refer to an architectural opening. It should be appreciated that the architectural opening can include any suitable opening in a building or other structure, such as a window, a door, a skylight, and/or an open-air opening. The detailed description will also refer to a window, which is provided as an example of an architectural opening for ease of understanding one or more aspects of the innovation. The term window should be construed to include not only a window, but any other suitable architectural opening that the innovation described herein can be used to selectively cover.

In addition, the detailed description refers to and illustrates a roller shade. It should be appreciated that a roller shade can includes any type of shade or covering for an architectural opening that includes a roller tube. Accordingly, the term roller shade can include a roller shade, a roller blind, a layered shade, a layered sheer shade, or any other shade or covering for an architectural opening that includes a roller tube.

Figure 2:
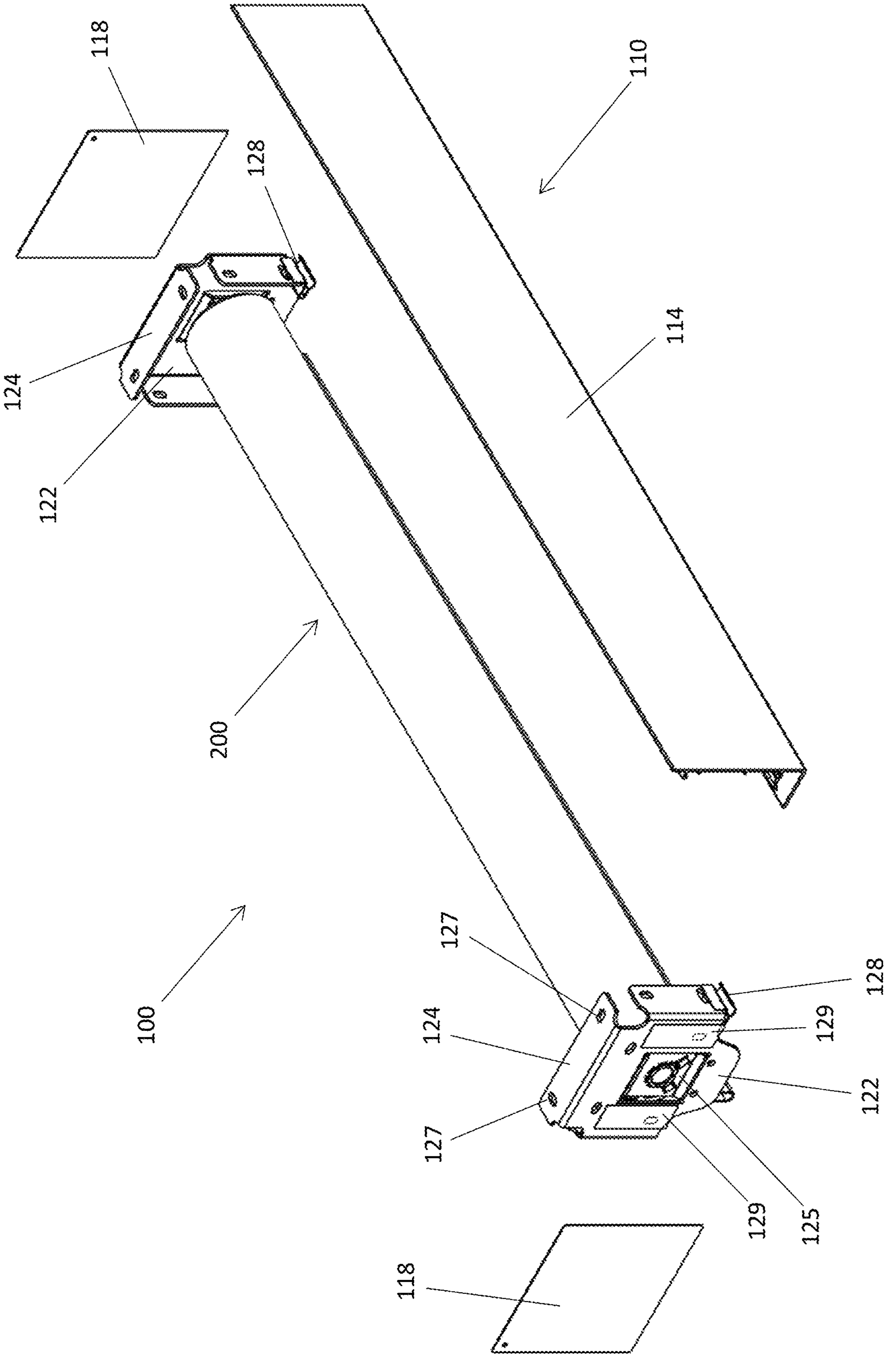
FIG. 2 is a partially exploded perspective view of the roller shade assembly of FIG. 1 shown with a decorative cover in a detached configuration.

With reference to FIGS. 1-2, the roller shade assembly 100 (or shade assembly 100) includes the cover assembly 110. The cover assembly 110 includes a decorative first cover 114 (or front cover 114 or front facia 114) and a plurality of decorative second covers 118 (or end covers 118 or end facia 118). The covers 114, 118 are configured to cover (or surround or partially enclose or decoratively hide) the bracket assembly 120 and operational components of the roller tube assembly 200.

With reference to FIG. 2, the bracket assembly 120 includes a plurality of bracket members 122. In the illustrated embodiment, the bracket members 122 include a pair of bracket members 122 and are substantially identical. The bracket members 122 are oriented to face each other (i.e., one bracket member 122 is rotated one hundred and eighty degrees (180°) relative to the other bracket member 122, or one bracket member 122 is a mirror image of the other bracket member 122). Each bracket member 122 includes a mounting portion 124 and a roller tube support portion 125. The pair of bracket members 122 can be referred to as a first bracket member 122 and a second bracket member 122.

Figure 3:
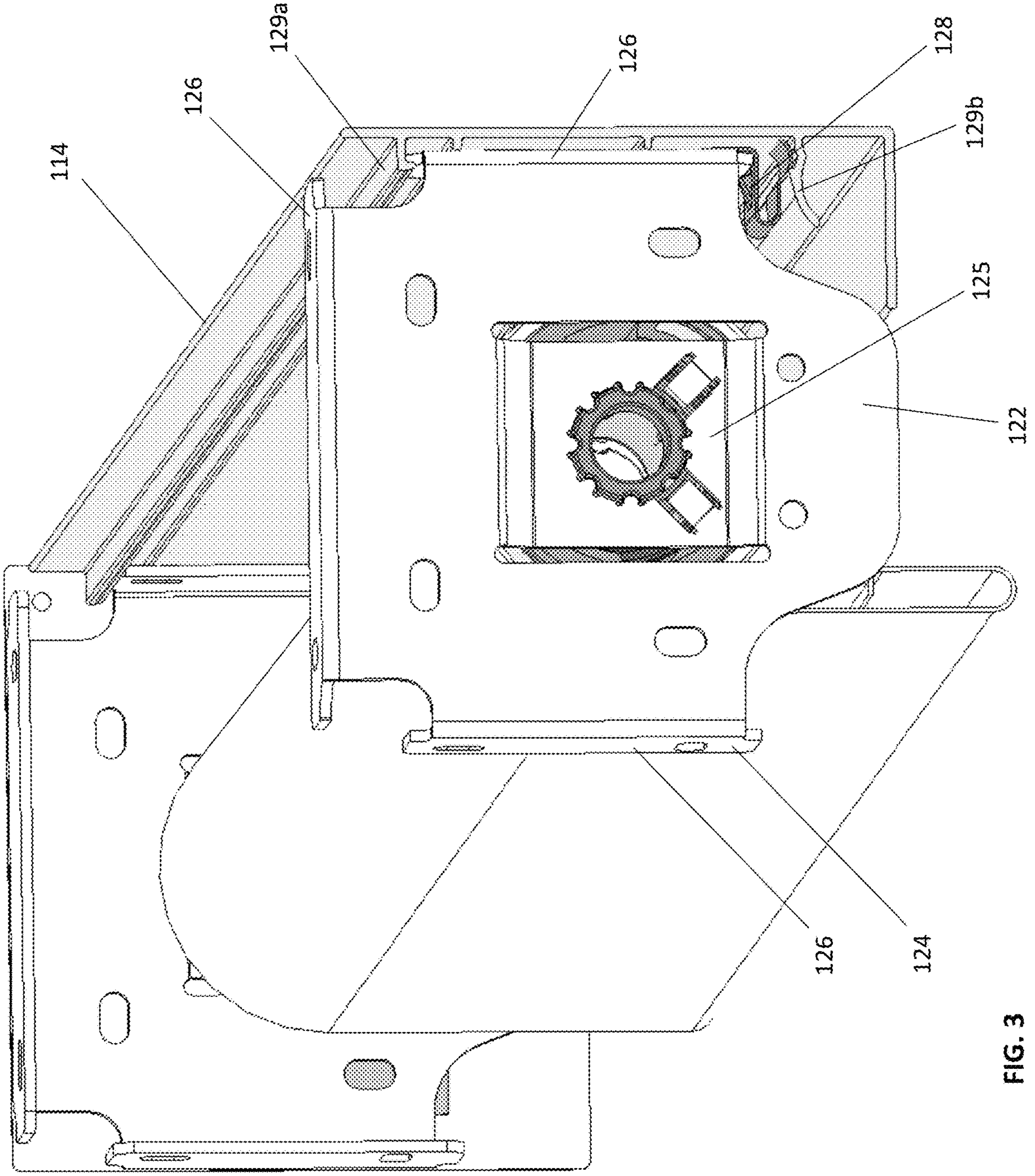
FIG. 3 is a perspective view of the roller shade assembly of FIG. 1, taken along line 3-3 of FIG. 1 and with the second cover removed to illustrate the bracket member in engagement with the first cover.

With reference to FIG. 3, the mounting portion 124 includes a plurality of mounting members 126. In the illustrated embodiment, the mounting portion 124 includes three mounting members 126. Two of the mounting members 126 are positioned on opposing sides of the roller tube support portion 125 and are arranged parallel to each other. One of the mounting members 126 is positioned between the parallel mounting members 126 and arranged perpendicular to the parallel mounting members 126. Each mounting member 126 is planar and includes at least one aperture 127 (shown in FIG. 2) that is configured to receive a fastener (e.g., a nail, a screw, a bolt, etc.). The fastener is configured to selectively attach (or mount) each respective bracket member 122 relative to the architectural opening (e.g., to facilitate attachment within a perimeter of the architectural opening, outside of the perimeter of the architectural opening, to a window frame, to a wall or other structure outside of the window frame, etc.).

With reference back to FIGS. 2-3, a mounting clip 128 (or mounting member 128 or facia clip 128) is coupled to each bracket member 122. With specific reference to FIG. 3, the mounting clip 128 is coupled to an end of one of the mounting members 126. The first cover 114 is then configured to removably attach to the bracket members 122. The first cover 114 includes a first longitudinal rib 129*a* spaced from a second longitudinal rib 129*b*. The ribs 129*a*, 129*b* extend longitudinally along the first cover 114 between the opposing bracket members 122. The first rib 129*a* defines a hook portion that is configured to engage one end of each mounting member 126. The second rib 129*b* defines a hook portion that is configured to engage the mounting clip 128 coupled to the second, opposite end of each mounting member 126. The second rib 129*b* can also be biased into engagement with the mounting member 128.

Referring back to FIG. 2, the second covers 118 are configured to fasten to a respective bracket member 122. As illustrated, each second cover 118 is fastened by a fastener 129, depicted as strips of two-sided adhesive tape. In other embodiments, any fastener (e.g., a tack, nail, screw, etc.) or adhesive (e.g., tape, glue, etc.) suitable to fasten the covers 118 to the bracket member 122 can be used. The covers 118 are oriented to cover (or overlap) the respective bracket member 122 to decoratively cover a portion of the bracket member 122 including the roller tube support portion 125.

Figure 4:
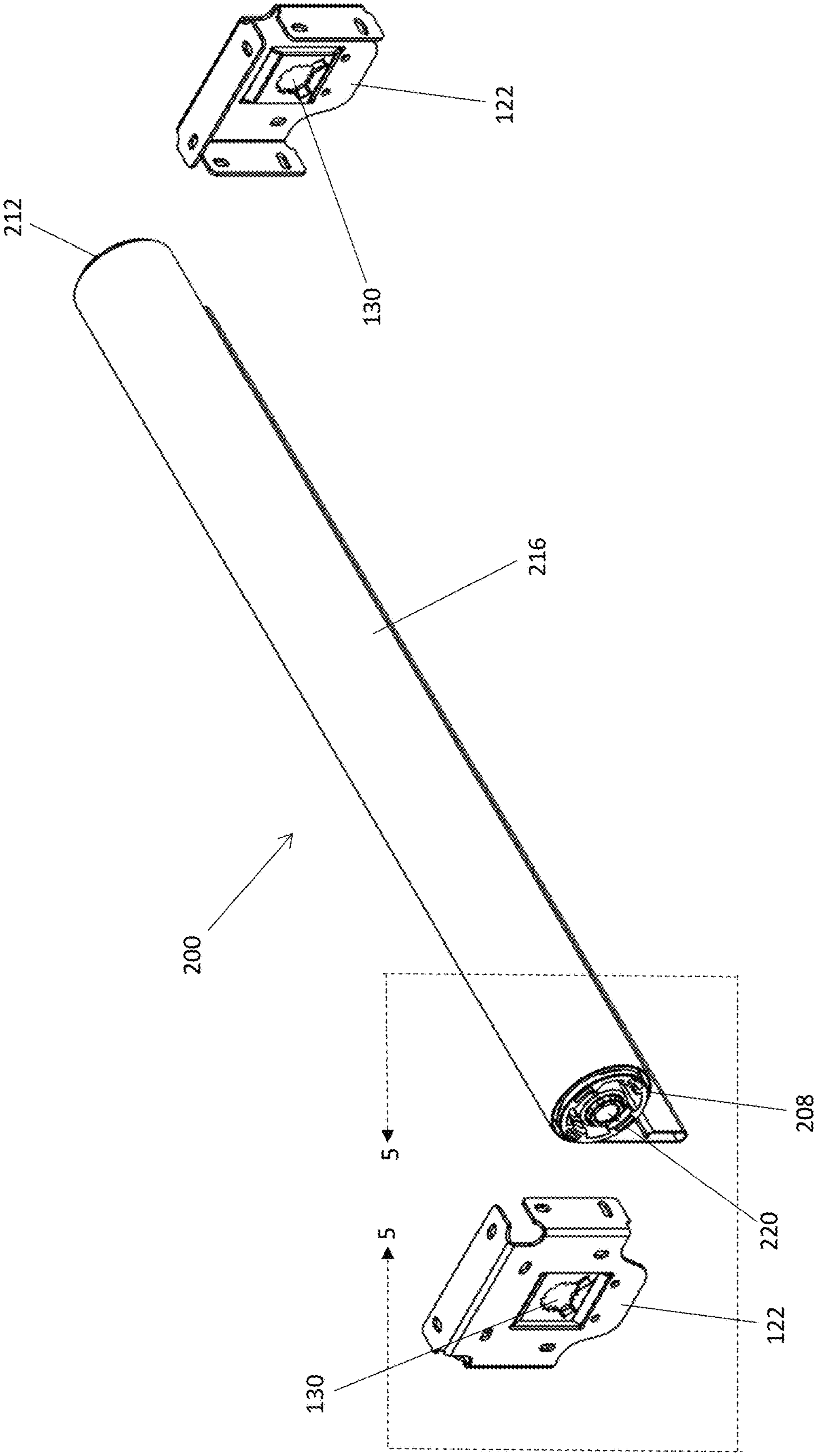
FIG. 4 is a partially exploded perspective view of the roller shade assembly of FIG. 1, with the cover assembly removed and the roller tube assembly detached from the opposing bracket members.
Figure 5:
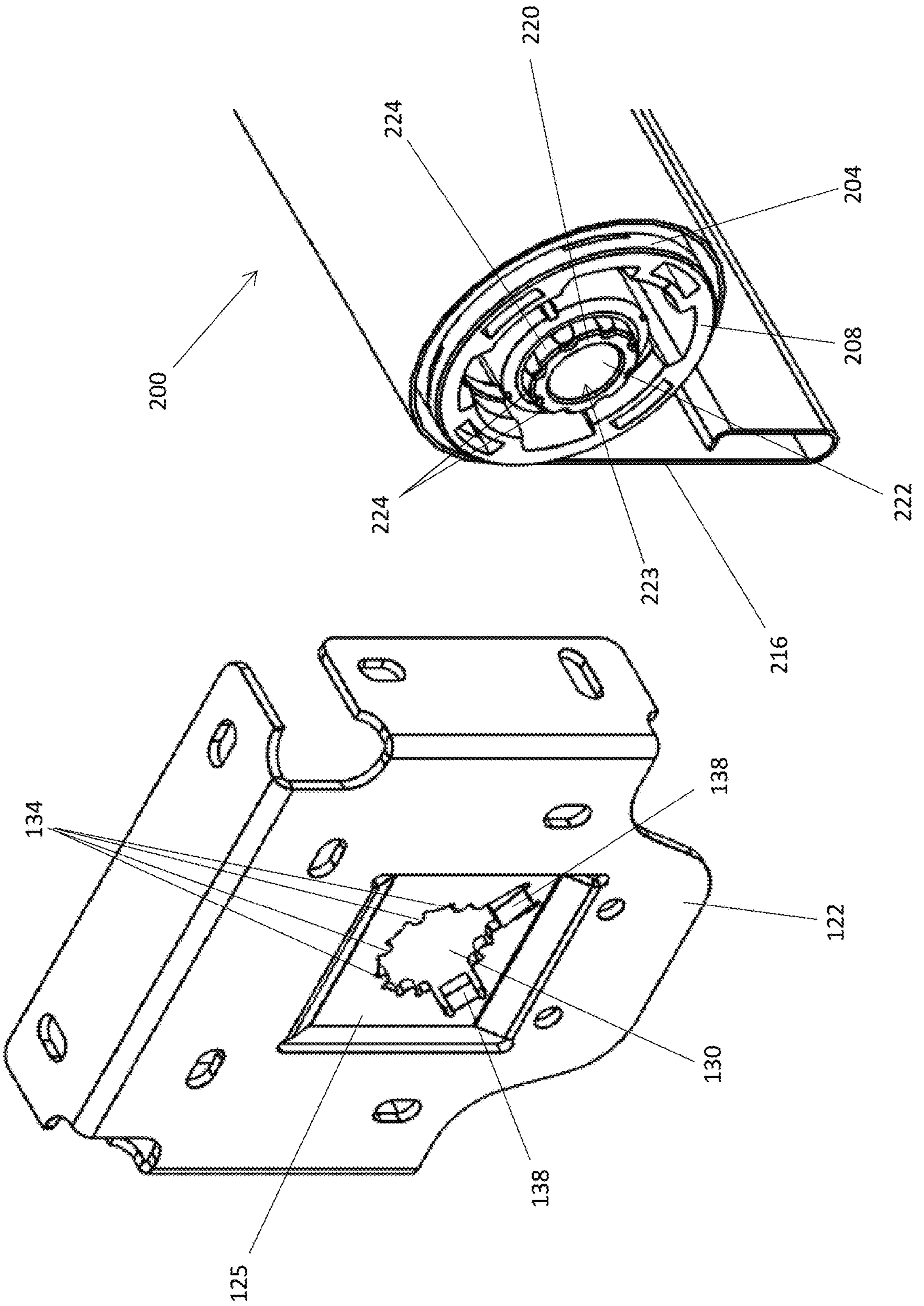
FIG. 5 is an enhanced perspective view of a portion of the roller tube assembly and one bracket member, taken along line 5-5 of FIG. 4.

With reference now to FIGS. 4-5, the roller tube assembly 200 is configured to engage the bracket members 122 of the bracket assembly 120. Each bracket member 122 defines an aperture 130 in the roller tube support portion 125. As shown in FIG. 5, the aperture 130 includes a plurality of radial members 134 (or radial fingers 134) that are positioned around a circumference of the aperture 130 and extend from the bracket member 122 into the aperture 130 (or protrude into the aperture 130). Each radial member 134 is spaced a distance apart from the adjacent radial member 134, forming a serrated (or sawtooth) profile. The aperture 130 also includes at least one projection 138. In the illustrated embodiments, the aperture 130 includes a pair of projections 138. However, in other embodiments, the aperture 130 can include a single projection 138 or three or more projections 138. The projections 138 can be biased and are configured to move (or pivot) relative to the bracket member 122.

The roller tube assembly 200 includes a roller tube 204 (shown in FIG. 5). The roller tube 204 includes a first end 208 opposite a second end 212 (shown in FIG. 4). A covering 216 (or shade 216 or architectural covering 216) is coupled to the roller tube 204 and is configured to be wound onto the roller tube 204 as the roller tube 204 rotates in a first direction, or is configured to be unwound from the roller tube 204 as the roller tube 204 rotates in a second direction opposite the first direction. The covering 216 is configured to selectively cover (or overlap) an architectural opening to, among other examples, limit light penetration, protect interior areas from sunlight exposure, and/or provide privacy.

A plunger 220 projects out of each end of the roller tube 204 and is configured to selectively engage the respective bracket member 122. With reference to FIG. 5, the plunger 220 defines a substantially hollow internal channel 222 and an access aperture 223. A plurality of members 224 (or projections 224 or protuberances 224) extend (or project) radially outward from the plunger 220, and around an outer circumference of the access aperture 223. The members 224 are spaced around the circumference of the plunger 220 and are spaced a distance apart from the adjacent member 224, forming a serrated (or sawtooth) profile. In the illustrated embodiment, eight members 224 are shown extending radially outward from the plunger 220. In other embodiments, the plunger 220 can include fewer than eight members 224, more than eight members 224, or any suitable number of members 224.

Figure 6:
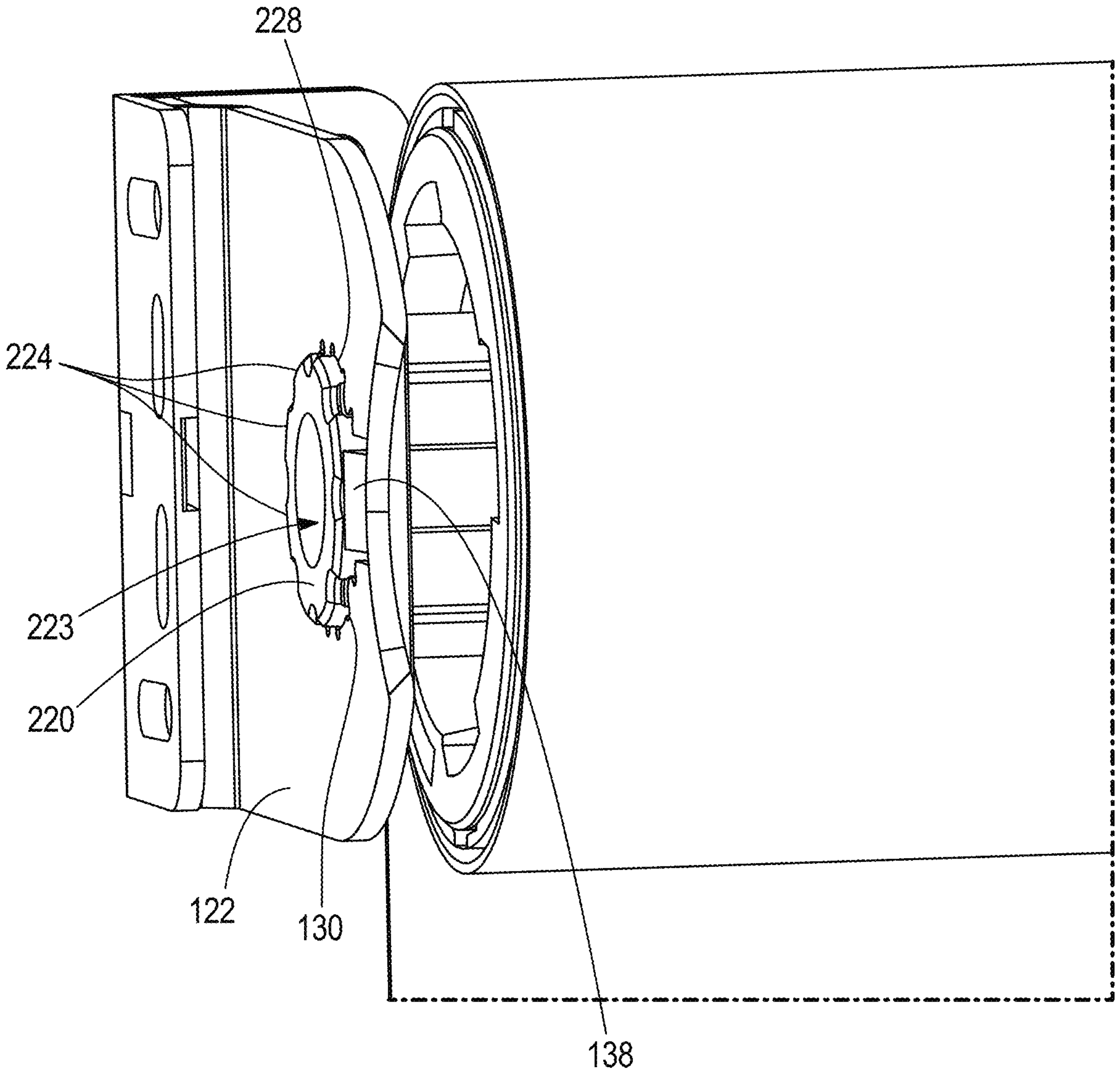
FIG. 6 is a perspective view of a portion of the roller tube assembly in engagement with one bracket member.

The serrated profile of the plunger 220 is complimentary to the serrated profile of the aperture 130 defined by the bracket member 122. As such, the plunger 220 is configured to be received and retained by the aperture 130 of the bracket member 122. With reference to FIG. 6, the plunger 220 is illustrated in engagement with the bracket member 122. More specifically, the plunger 220 is received by the aperture 130 and forms an interlocking (or interference) engagement with the aperture 130 of the bracket member 122. Each member 224 also defines an undercut portion 228 on a face of the member 224 that faces the bracket assembly 120 when the plunger 220 is received by the aperture 130. The undercut portion 228 provides additional resistance to removal (or pullout) of the plunger 220 from the aperture 130 in response to a vertical load on the roller tube assembly 200 (or a load applied in a direction that is oblique (or perpendicular) to an axis defined by the roller tube 204 and parallel to the plunger 220). One or more of the radial members 138 can engage the undercut portion 228, such that the undercut portion 228 can partially define a groove. A force downward force (e.g., gravity, etc.) applied to the roller tube 204 and associated plunger 220 can facilitate receipt of the one or more radial members 138 into the undercut portion 228 (or the groove partially defined by the undercut portion 228). Thus, the undercut portion 228 defines anti-slip resistance to assist to maintain engagement of the plunger 220 with the aperture 130 and reduce the risk on unintentional disengagement. In addition, it should be appreciated that while FIGS. 4-6 illustrate the plunger 220 in selective engagement with the bracket member 122 on the first end 208 of the roller tube 204, the components and functionality are the same on the second end 212 of the roller tube 204. To facilitate insertion and/or removal of the plunger 220 from the aperture 130, and thus engagement or disengagement of the cover assembly 110 from the bracket assembly 120, each projection 138 can be actuated relative to the bracket member 122 to provide additional space to insert the plunger 220 into the aperture 130 (or remove the plunger 220 from the aperture 130). Actuation of the projection 138 is generally user initiated, and can implemented with a tool (e.g., by a screwdriver or other device, etc.) or other suitable device (e.g., a finger, etc.).

Figure 7:
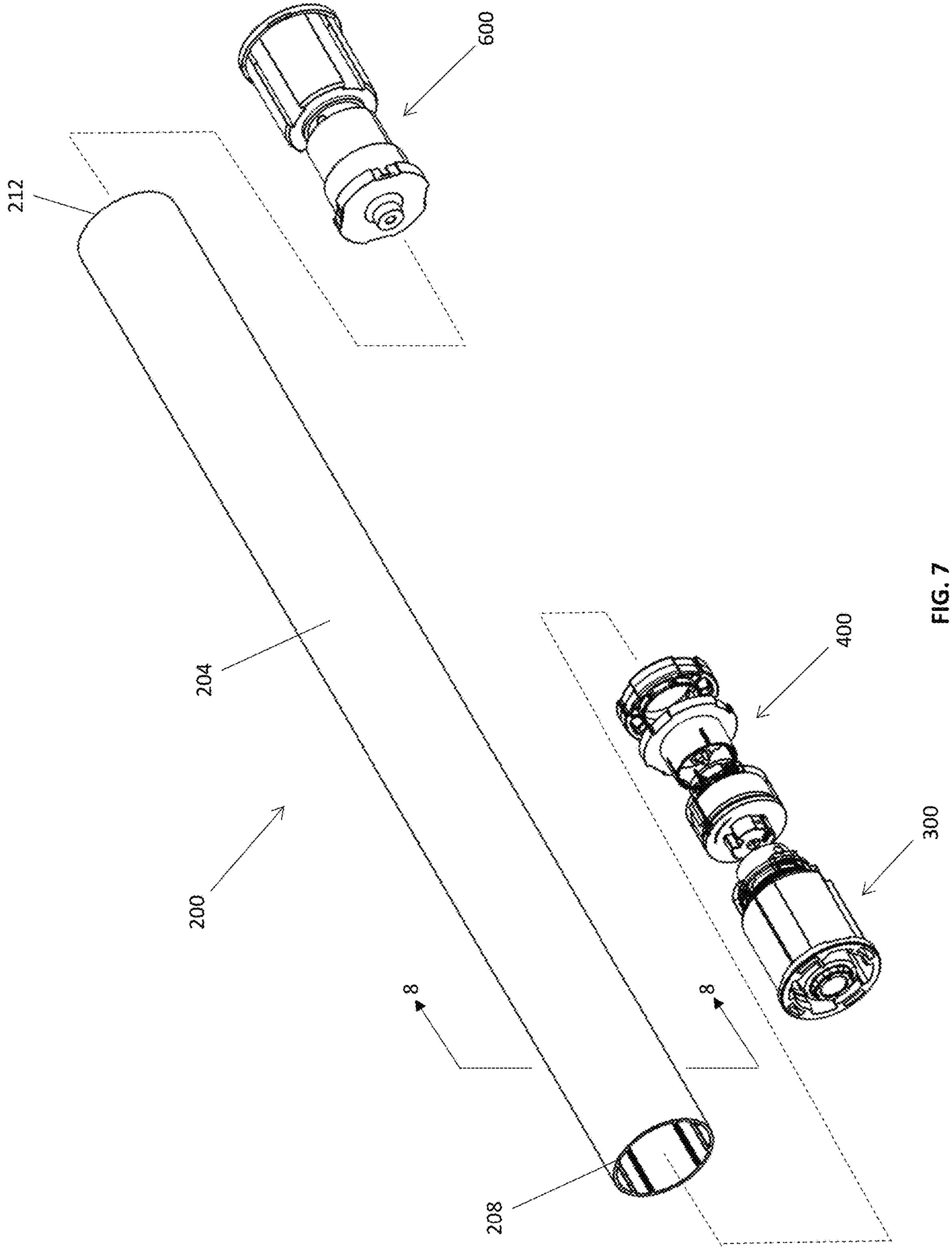
FIG. 7 is a partially exploded view of the roller tube assembly, with the covering for the architectural opening removed.

With reference now to FIG. 7, the roller tube assembly 200 is illustrated with the covering 216 removed. The roller tube assembly 200 is also shown partially exploded. The roller tube assembly 200 includes an idler assembly 300, a spring tension assembly 400, and a brake assembly 600. The idler assembly 300 and the spring tension assembly 400 are configured to be received in the first end 208 of the roller tube 204. The brake assembly 600 is configured to be received in the second end 212 of the roller tube 204. The idler assembly 300 is also configured to engage the spring tension assembly 400.

Figure 8:
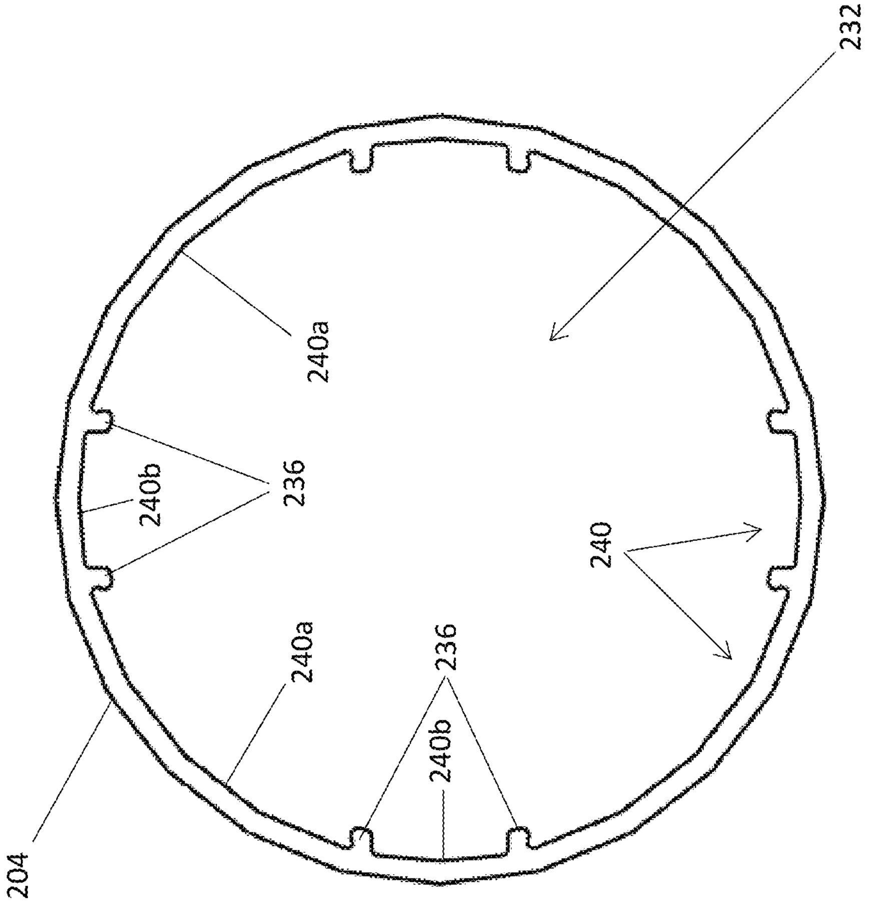
FIG. 8 is a cross-sectional view of a roller tube, taken along line 8-8 of FIG. 7.

FIG. 8 illustrated a cross-sectional view of the roller tube 204. The roller tube 204 defines a central opening 232 that extends longitudinally within the roller tube 204. A plurality of longitudinal ribs 236 extend from the roller tube 204 and into the opening 232. The illustrated roller tube 204 includes four pairs of ribs 236. The ribs 236 and roller tube 204 define a plurality of engagement zones 240. Each engagement zone 240 is defined between adjacent (or consecutive) ribs 236. The engagement zones 240 provide an area for components of the idler assembly 300, the spring tension assembly 400, and the brake assembly 600 to engage with the roller tube 204, and more specifically the ribs 236 that define each engagement zone 240. The engagement zones 240 include a first engagement zone 240*a* and a second engagement zone 240*b*. The first engagement zone 240*a* is provided between consecutive (or adjacent) pairs of ribs 236, while the second engagement zone 240*b* is provided between the ribs 236 of each pair of ribs 236. In the illustrated embodiment, the first engagement zone 240*a* is larger (or longer) than the second engagement zone 240*b*.

With reference now to FIGS. 9-13, the idler assembly 300 is illustrated in greater detail. The idler assembly 300 includes an idler member 304, an idler housing 308, and a timing ring 312. The idler member 304 is coupled to the idler housing 308 and is configured to rotate relative to the idler housing 308. With specific reference to FIG. 12, the idler housing 308 includes an annular bearing 316 (or ring bearing 316 or bearing 316) positioned around the housing 308. The annular bearing 316 engages the idler member 304 (or is otherwise coupled to the idler member 304). More specifically, the annular bearing 316 is received by a corresponding annular groove 320 positioned on an interior surface of the idler member 304. While the illustrated annular groove 320 is depicted as a plurality of grooves extending around portions of the interior surface of the idler member 304, in other embodiments the annular groove 320 can continuously extend around an internal circumference of the idler member 304, or can include a plurality of annular groove portions that extend around the internal circumference of the idler member 304. The idler member 304 is configured to freely rotate relative to the idler housing 308 by the annular bearing 316.

Figure 9:
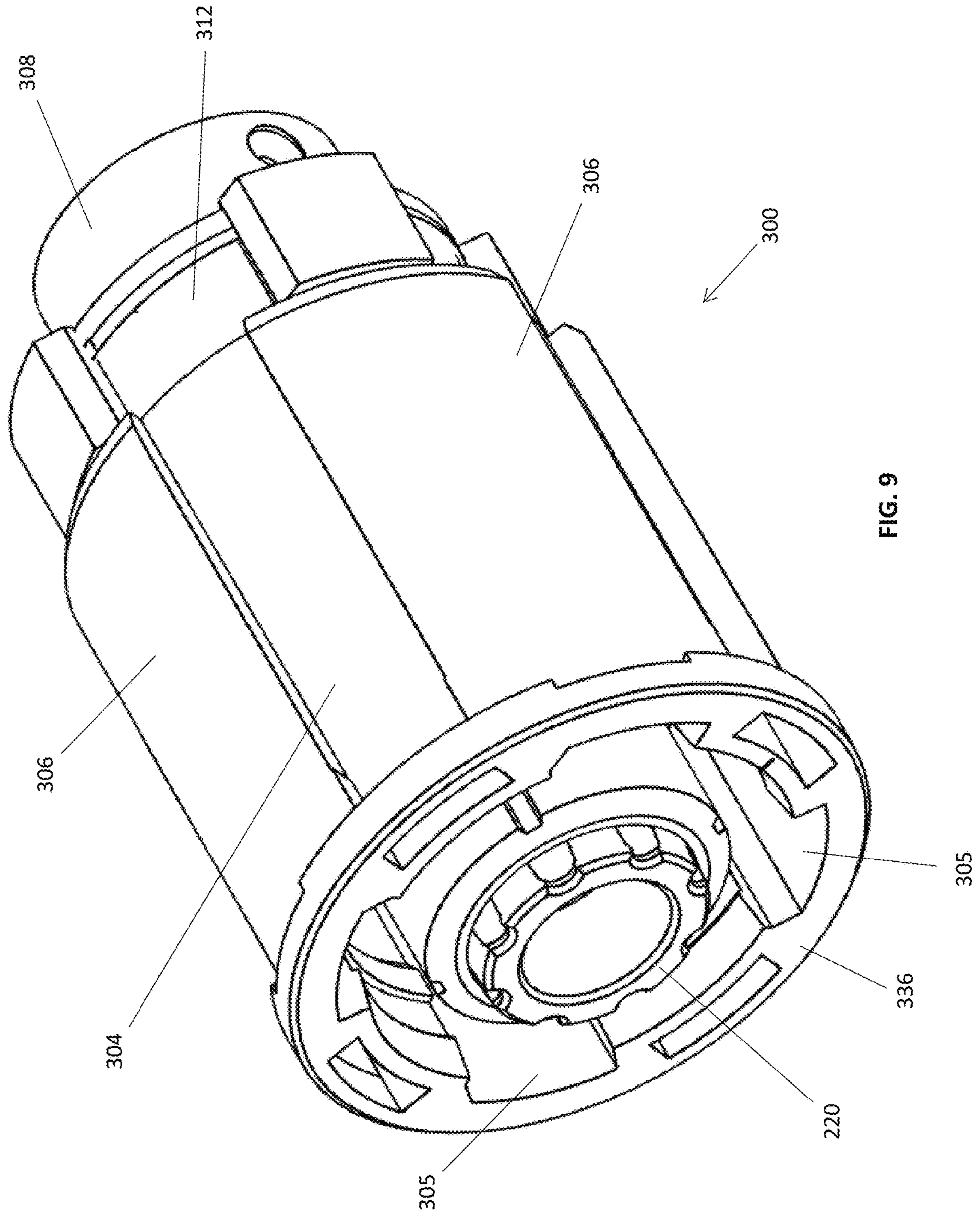
FIG. 9 is a perspective view of a first end of an idler assembly associated with the roller shade assembly of FIG. 1.
Figure 10:
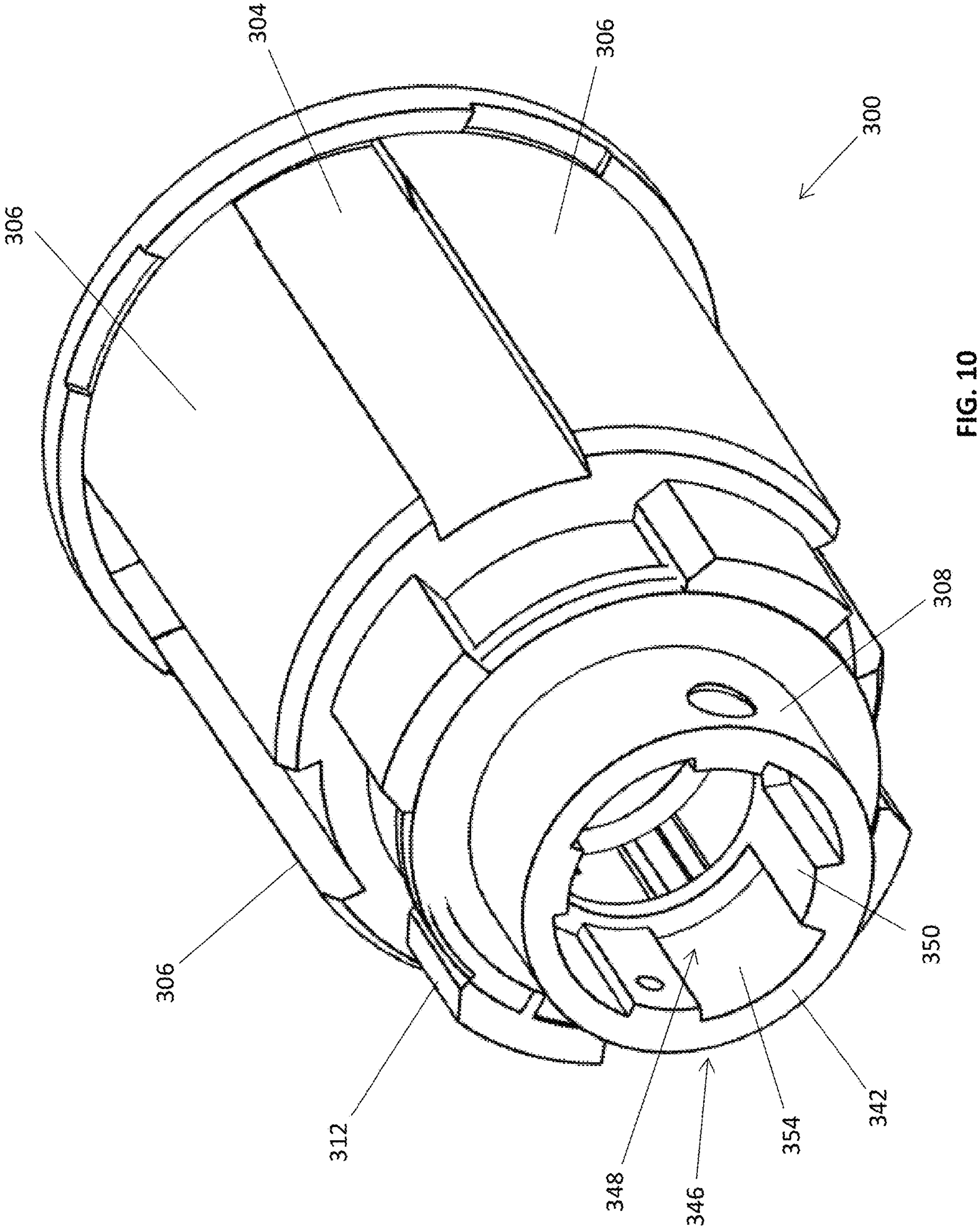
FIG. 10 is a perspective view of a second end, opposite the first end, of the idler assembly of FIG. 9.
Figure 11:
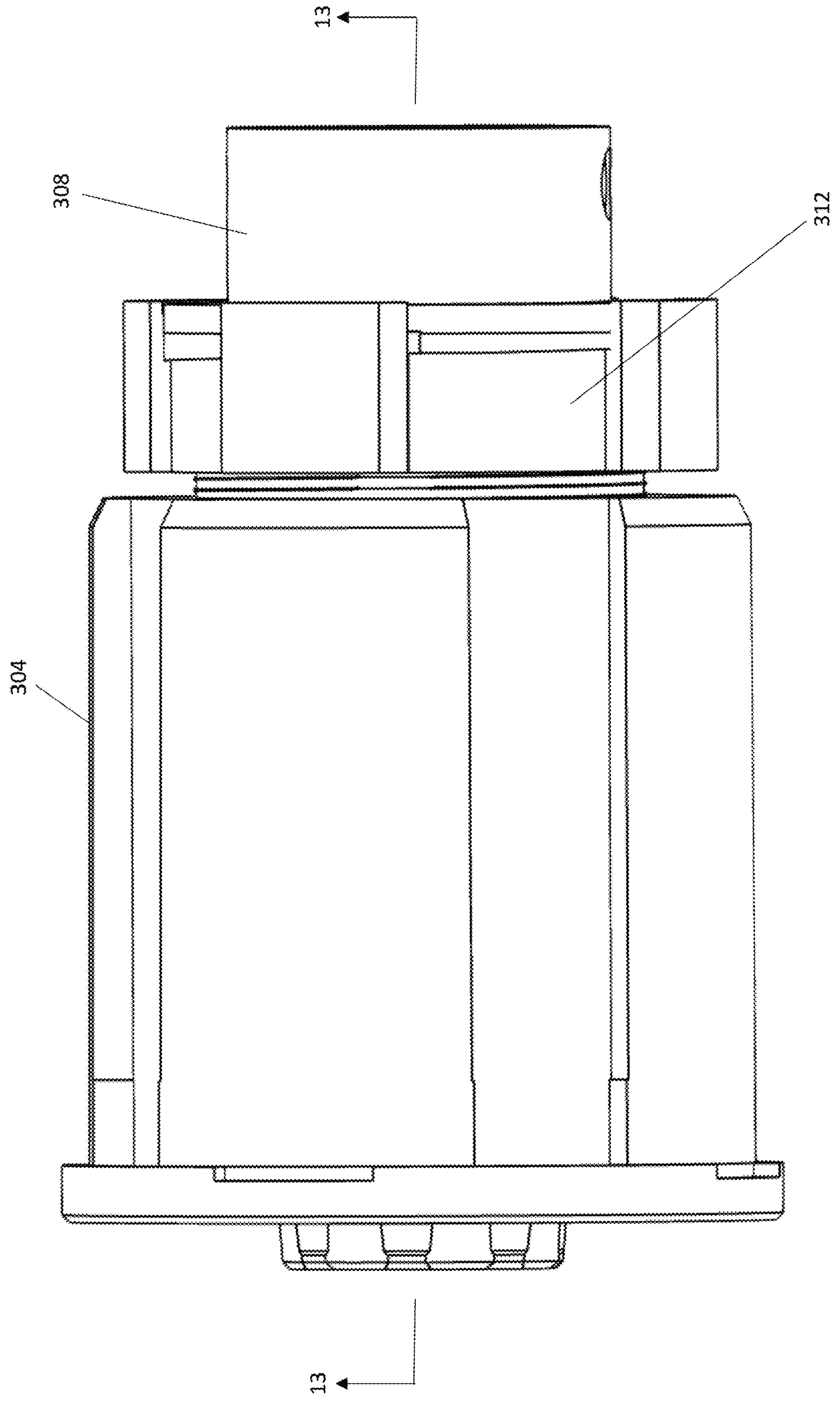
FIG. 11 is a plan view of the idler assembly of FIG. 9

With reference to FIGS. 9-10, the idler member 304 defines a plurality of projections 306 (or members 306). The projections 306 are positioned around an outer circumference of the idler member 304. The projections 306 are configured to engage corresponding engagement zones 240 within the roller tube 204. More specifically, each projection 306 is configured to engage a corresponding first engagement zone 240*a*. This facilitates a rotatable connection between the roller tube 204 and the idler member 304, such that they rotate together.

Figure 15:
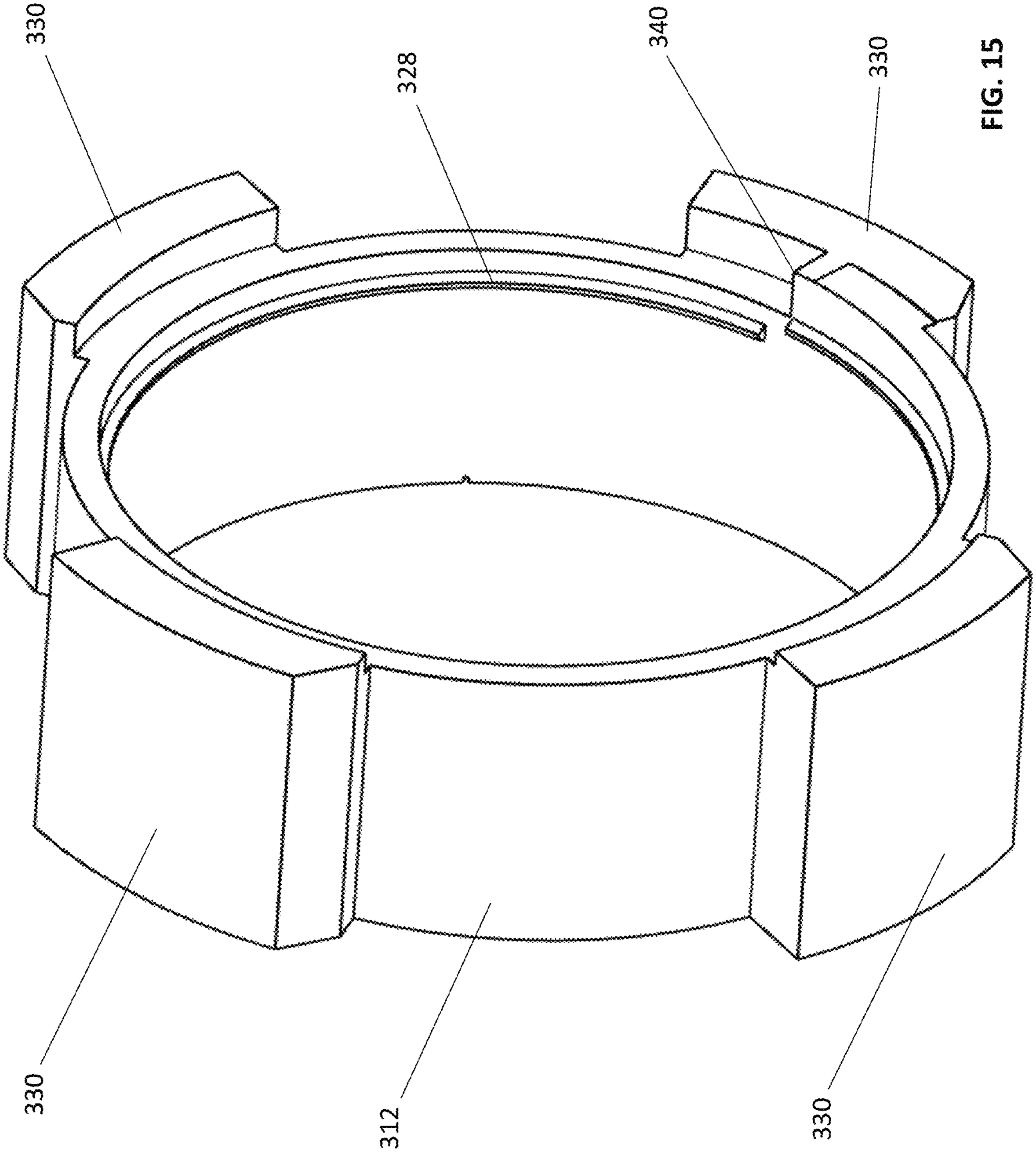
FIG. 15 is a perspective view of the timing ring of the idler assembly of FIG. 9.

The timing ring 312 is also coupled to the idler housing 308 and is configured to rotate relative to the idler housing 308. With specific reference to FIG. 12, the idler housing 308 includes a thread 324 (or screw thread 324 or first thread 324) wrapped around a cylindrical portion of the idler housing 308. The thread 324 is a straight thread and defines a helical thread arrangement on the idler housing 308. With reference to FIG. 15, the timing ring 312 includes a corresponding thread 328 (or timing ring thread 328 or timing thread 328 or second thread 328). The timing ring thread 328 extends around an internal circumference of the timing ring 312. The thread 328 is helical in shape. In the illustrated embodiment, the thread 328 is a single thread (or extends approximately one time around the internal circumference of the timing ring 312). In other embodiments, the thread 328 can extend around the internal circumference of the timing ring 312 a plurality of times. The thread 328 of the timing ring 312 is configured to engage the thread 324 of the idler housing 308. The timing ring 312 also defines a plurality of projections 330 (or members 330). The projections 330 are positioned around an outer circumference of the timing ring 312. The projections 330 are configured to engage corresponding engagement zones 240 within the roller tube 204. More specifically, each projection 330 is configured to engage a corresponding second engagement zone 240*b*. This facilitates a rotatable connection between the roller tube 204 and the timing ring 312, such that they rotate together.

As the timing ring 312 rotates with the roller tube 204, the timing ring 312 travels in a lateral direction (or horizontally) along the idler housing 308. The lateral travel is in response to the engagement of the timing ring thread 328 with the thread 324 on the idler housing 308. Accordingly, as the timing ring 312 rotates relative to the idler housing 308, the timing ring 312 traverses the idler housing 308, and further laterally travels within (or along) the roller tube 204. For example, the timing ring 312 laterally travels along each channel that defines the second engagement zone 240*b* of the roller tube 204 in response to rotation of the timing ring 312. The direction of travel is in response to the direction of rotation of the timing ring 312 (e.g., rotation of the timing ring 312 in a first direction results in a travel of the timing ring 312 in a first direction relative to the idler housing 308, rotation of the timing ring 312 in a second direction, opposite the first direction, results in a travel of the timing ring 312 in a second direction, opposite the first direction, relative to the idler housing 308, etc.).

Figure 12:
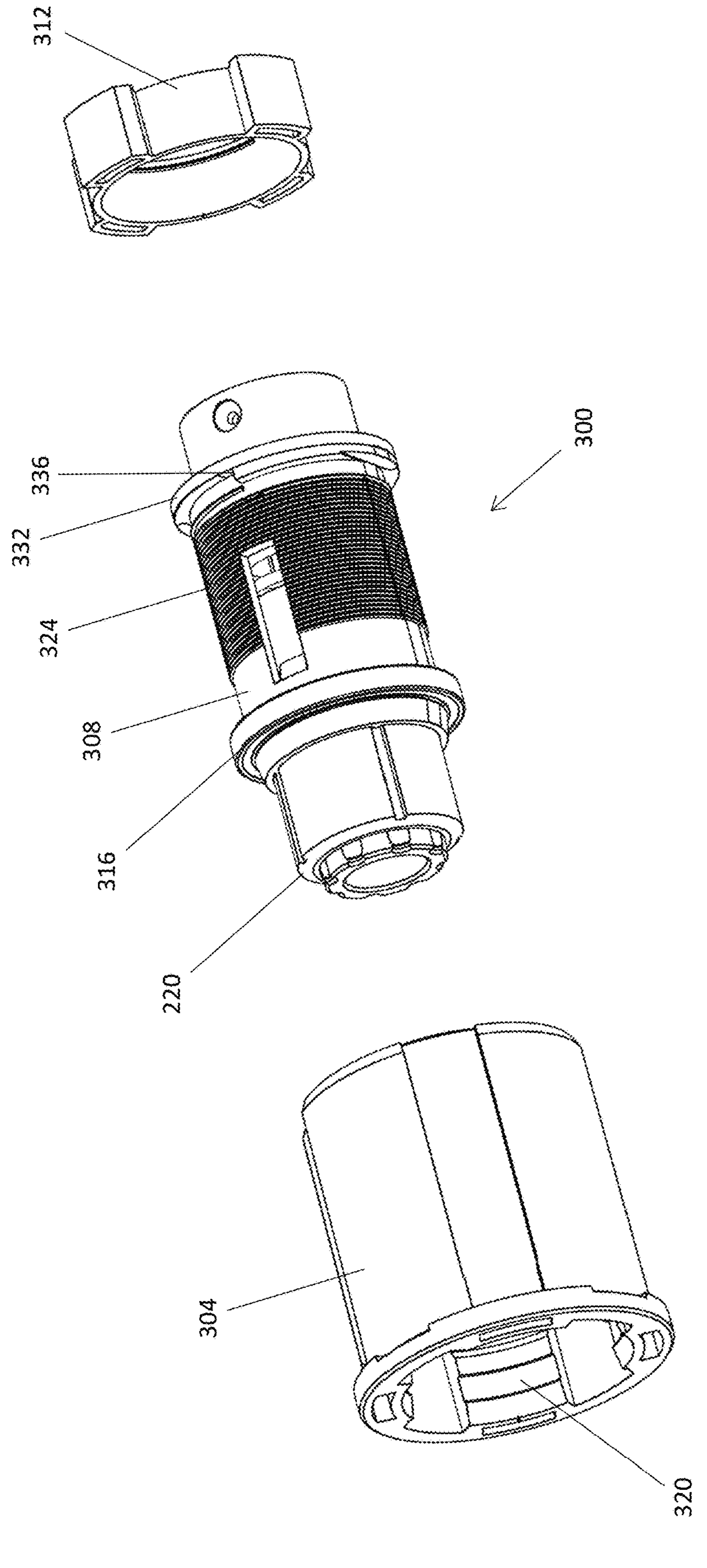
FIG. 12 is a partially exploded view of the idler assembly of FIG. 9.
Figure 14:
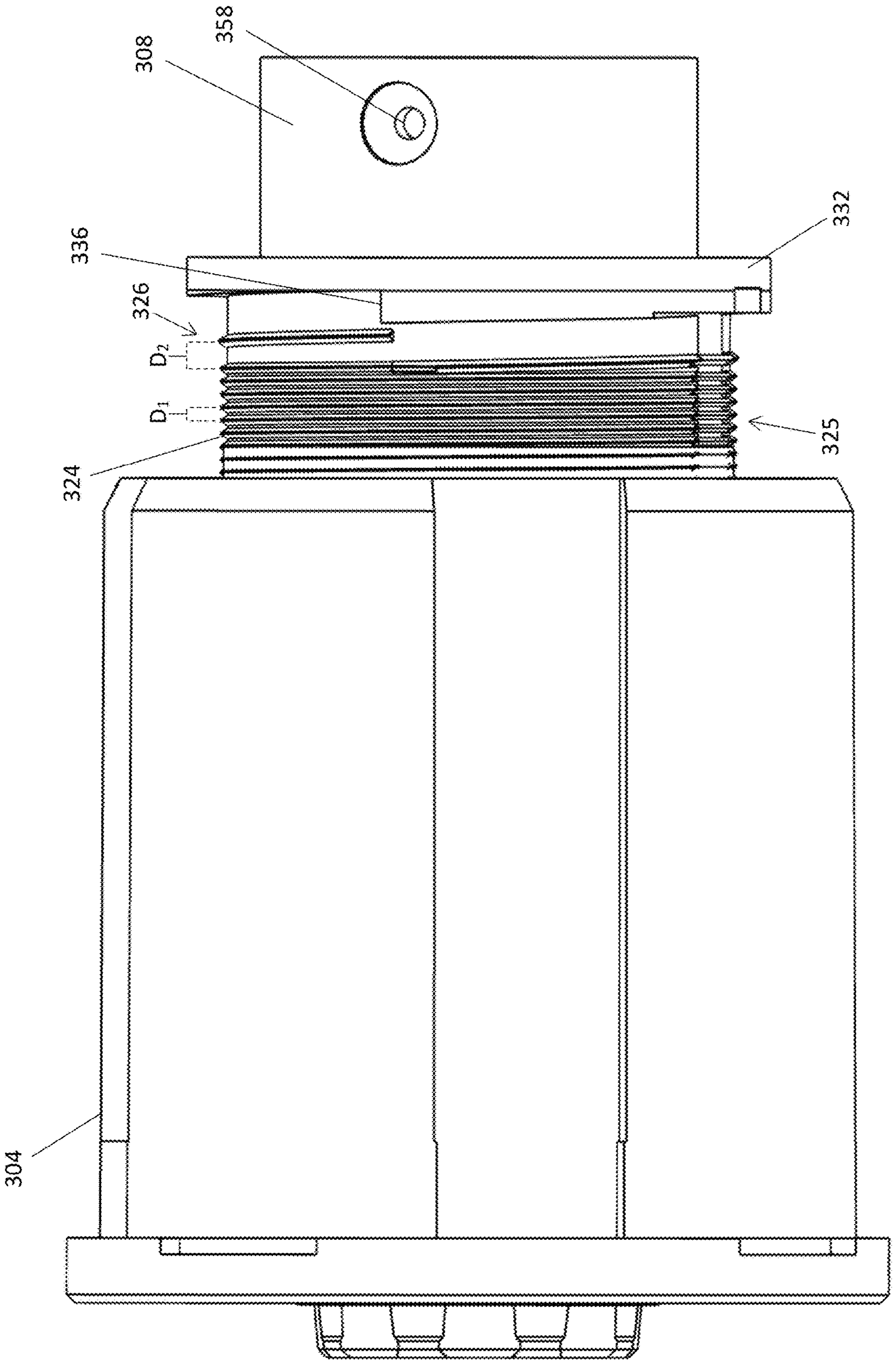
FIG. 14 is a plan view of the idler assembly of FIG. 9 with the timing ring removed to further illustrate the thread and support collar on the idler housing.

With reference to FIGS. 12 and 14, the idler housing 308 includes a support collar 332. The support collar 332 is provided to restrict disengagement of the timing ring 312 from the idler housing 308. Stated another way, the support collar 332 assists to keep the timing ring 312 in engagement with the idler housing 308. The support collar 332 defines a first stop member 336. With reference to FIG. 15, the timing ring 312 defines a second stop member 340. The first stop member 336 is a surface that is configured to engage the surface of the second stop member 340. In response to the stop members 336, 340 coming into contact with each other, rotation of the timing ring 312 is restricted in the corresponding direction of rotation.

With specific reference to FIG. 14, the thread 324 on the idler housing 308 includes a first thread zone 325 separated from a second thread zone 326. The first thread zone 325 is defined by the thread 324 being spaced a first distance $D_1$, as measured between the peaks of adjacent threads 324. The second thread zone 326 is defined by the thread 324 being spaced a second distance $D_2$, as measured between the peaks of adjacent threads 324. The second distance $D_2$ is greater than the first distance $D_1$. More specifically, the second distance $D_2$ is approximately four times greater than the first distance $D_1$. As a non-limiting example, the first distance $D_1$ is approximately 0.8 mm, while the second distance $D_2$ is approximately 3.2 mm. In other embodiments, the distances $D_1$ and $D_2$ can be any suitable or desired distance. The second thread zone 326, which in the illustrated embodiment includes a single loop of the thread 324 around the idler housing 308 facilitates engagement of the timing ring 312 and support collar 332 stop members 336, 340.

Figure 13:
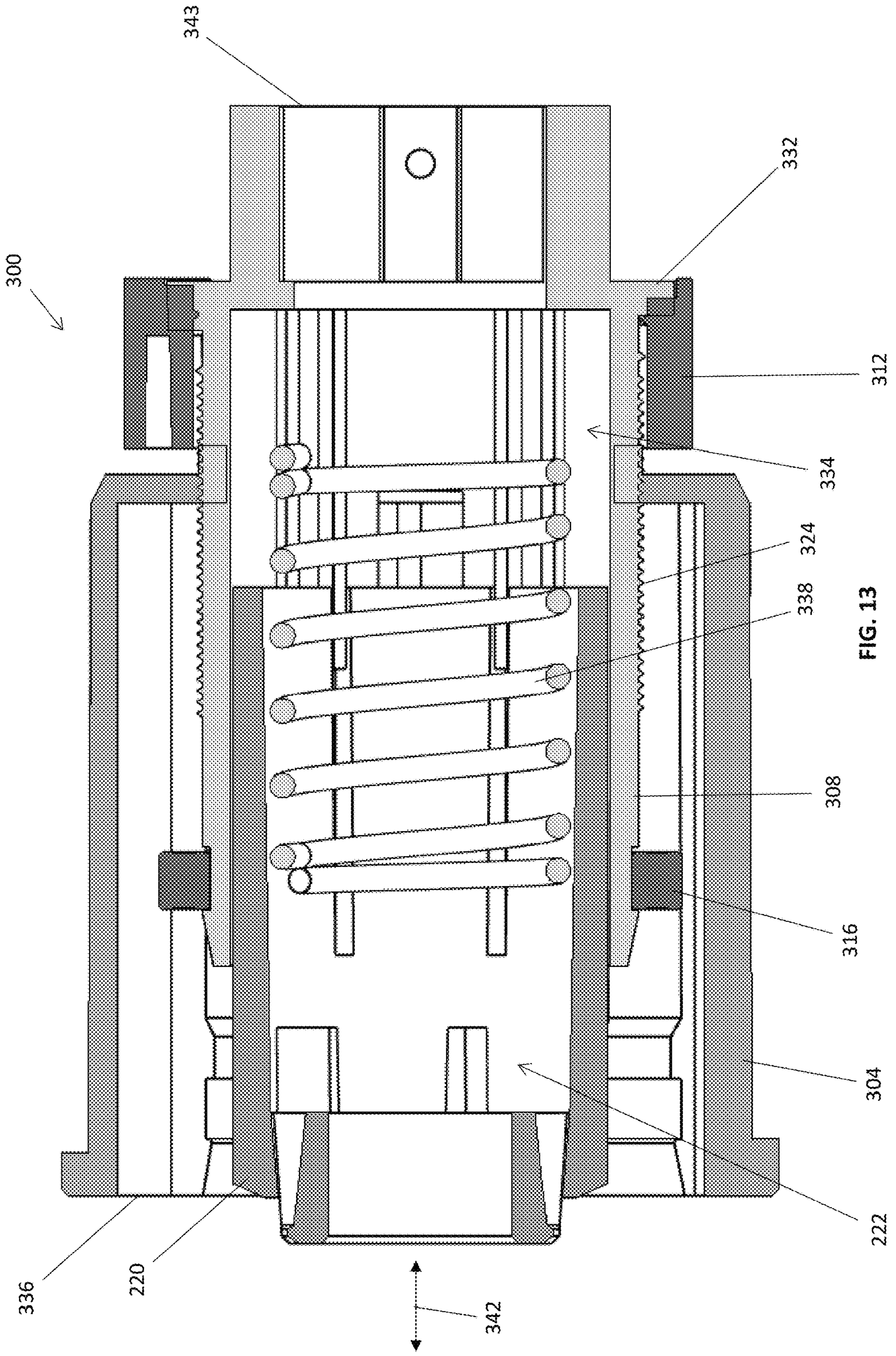
FIG. 13 is a cross-sectional view of the idler assembly of FIG. 9, taken along line 13-13 of FIG. 11.

With reference now to FIG. 13, the plunger 220 is slidably received and retained by the idler housing 308. The idler housing 308 defines an internal channel 334 that slidably receives the plunger 220 through a first end 336 of the idler housing. A biasing member 338 is received by, and retained in, the internal channel 334. The biasing member 338, illustrated as a spring 338, is in operable communication with the internal channel 334 and the plunger 220. More specifically, the biasing member 338 extends from the internal channel 334 of the idler housing and into the internal channel 222 of the plunger 220. The biasing member 338 is configured to apply a biasing force onto the plunger 220. Thus, the plunger 220 is configured to laterally slide along an axis 342 parallel to (or defined by) the roller tube 204 (shown in FIG. 7). The plunger 220 slides in a first direction along the axis 342 (or away from the idler housing 308, or away from the roller tube 204) in response to the biasing force being applied on the plunger 220 by the biasing member 338. Alternatively, the plunger 220 slides in a second direction along the axis 342 (or towards the idler housing 308 or into the roller tube 204) in response to an outside force being applied to the plunger 220 that is sufficient to overcome the biasing force applied by the biasing member 338. An example of the outside force can include a finger of a user (or installer) that depresses the plunger 220 into the idler housing 308. It should be appreciated that the axis 342 defined by the roller tube 204 can be the axis of rotation of the roller tube 204 (or parallel to an axis of rotation of the roller tube 204).

It should be appreciated that the geometry of the travel of the plunger 220 (or plunger travel) and the travel of the timing ring 312 relative to the idler housing 308 has certain advantages. For example, the thread 324 on the idler housing 308 overlaps with the internal channel 334 defined by the idler housing 308. Accordingly, the thread 324 overlaps the plunger travel. This facilitates a reduction in overall size of the idler assembly 300. This compact design allows for installation and use in shades smaller roller shades (e.g., roller shade diameter, length of architectural opening and corresponding shade, and/or width of architectural opening and corresponding shade, etc.) in addition to larger roller shades.

With reference to FIG. 10, a second end 343 of the idler housing 308, opposite the first end 336 (shown in FIGS. 9 and 13), defines a first locking member 346. The idler housing 308 defines an opening 348 (or aperture 348). The first locking member 346 includes a plurality of alternating projections 350 and recesses 354 positioned on an inner circumference that surrounds the opening 348. The first locking member 346 is configured to engage a corresponding second locking member 456 defined by the spring tension assembly 400, which is discussed in additional detail below. The first locking member 346 is illustrated as defined on an inner circumference of the idler housing 308. In other embodiments, the first locking member 346 can be defined on an outer circumference of the idler housing 308.

Figure 16:
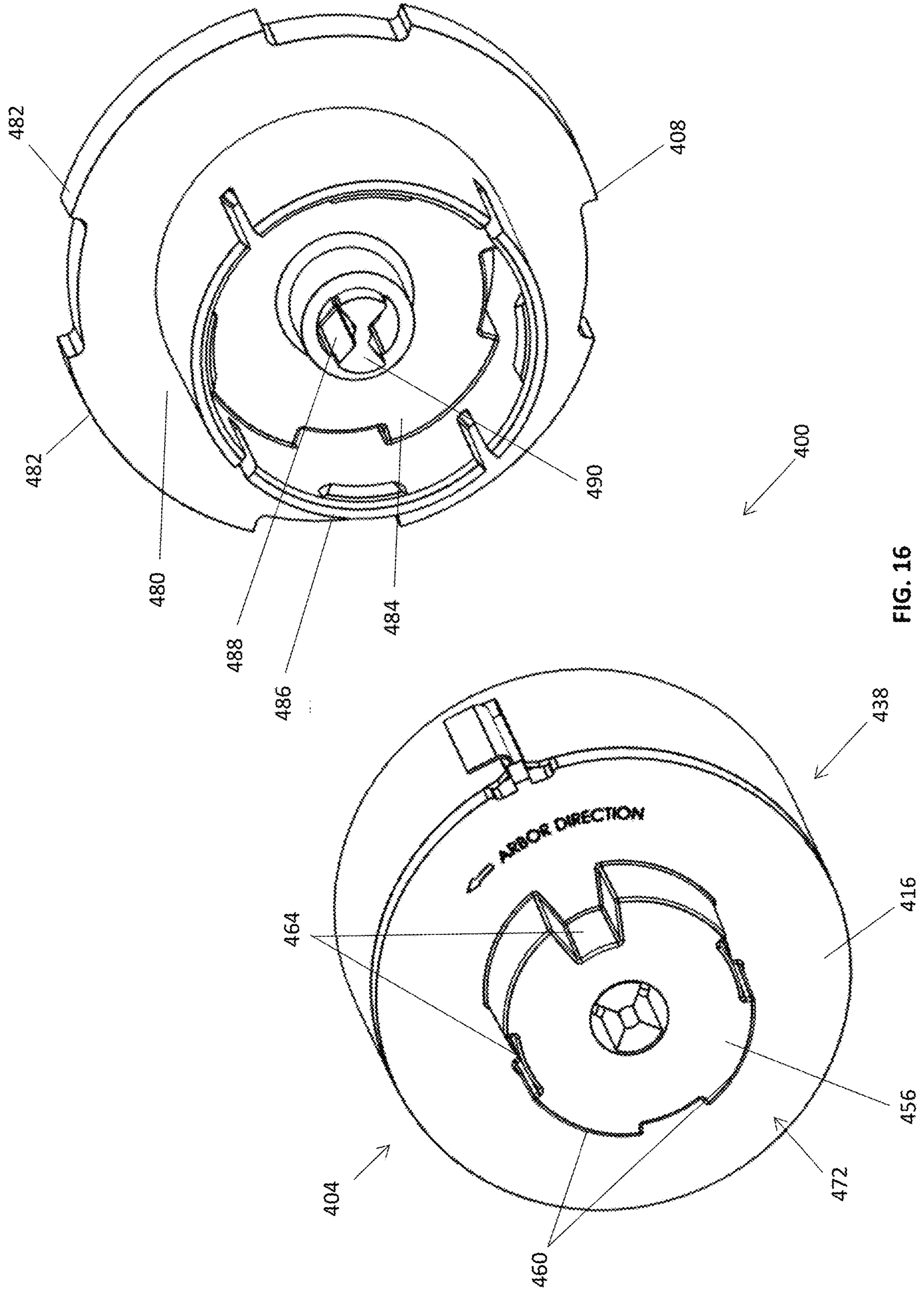
FIG. 16 is a perspective, partially exploded view of a first end of the spring tension assembly associated with the roller shade assembly of FIG. 1.
Figure 17:
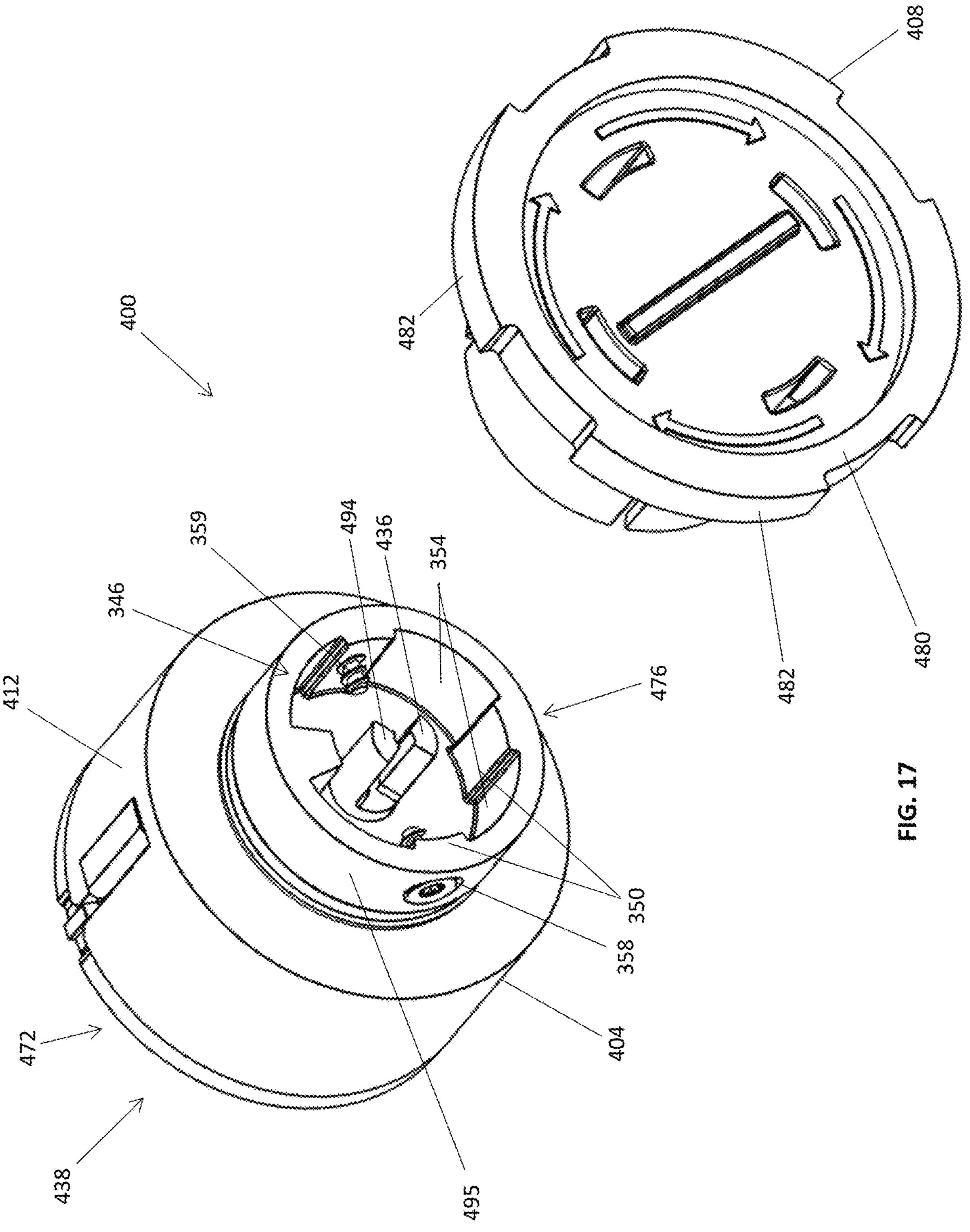
FIG. 17 is a perspective, partially exploded view of a second end, opposite the first end, of the spring tension assembly of FIG. 16.

With reference to FIGS. 16-17, a perspective, partially exploded view of the spring tension assembly 400 is illustrated. The spring tension assembly 400 includes at least one spring assembly 404 and a spring drive 408 (or tube adapter 408). The spring tension assembly 400 is configured to apply a counterbalancing force (or to counterbalance) the roller shade.

Figure 18:
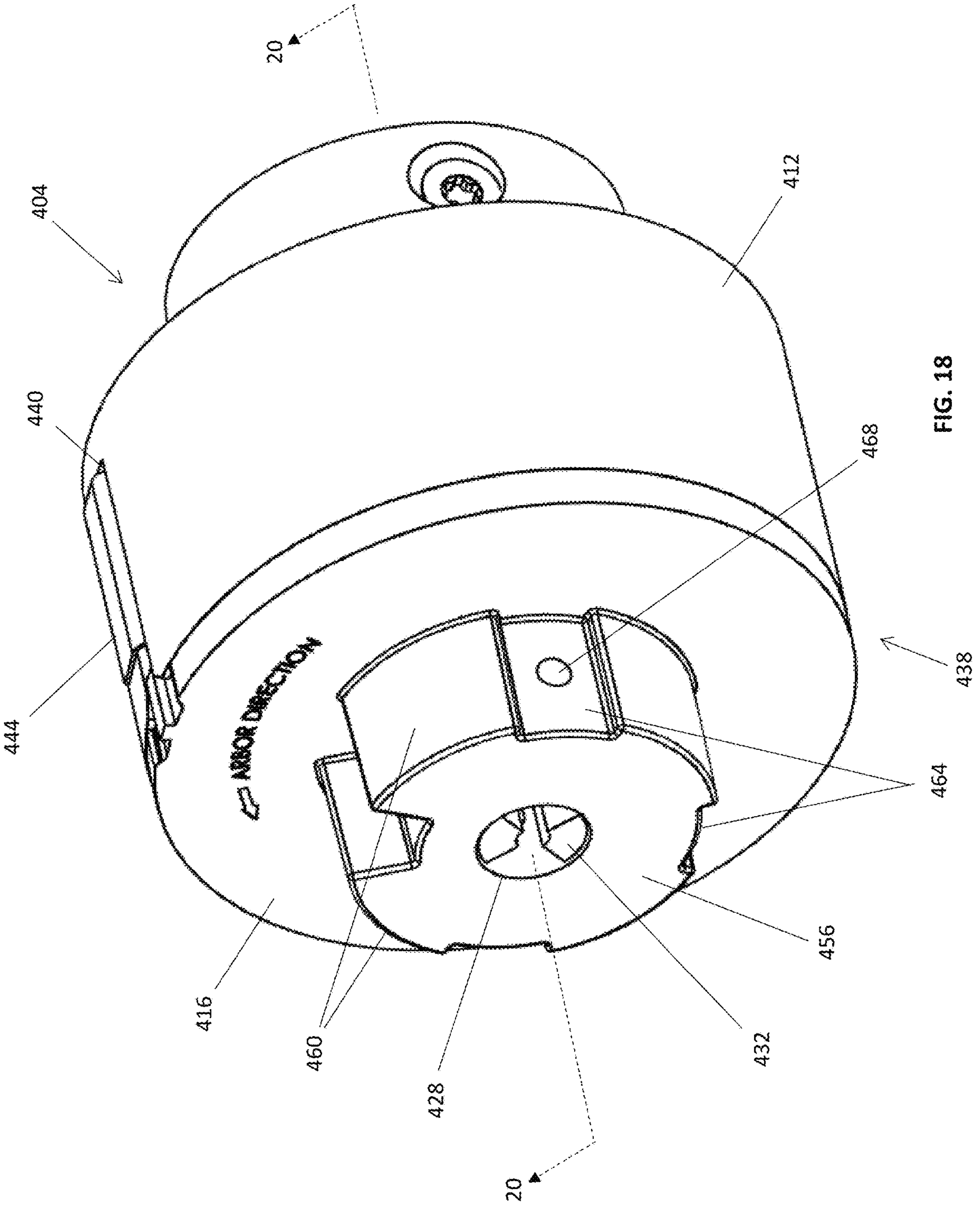
FIG. 18 is a perspective view of a spring assembly of the spring tension assembly of FIG. 16.
Figure 19:
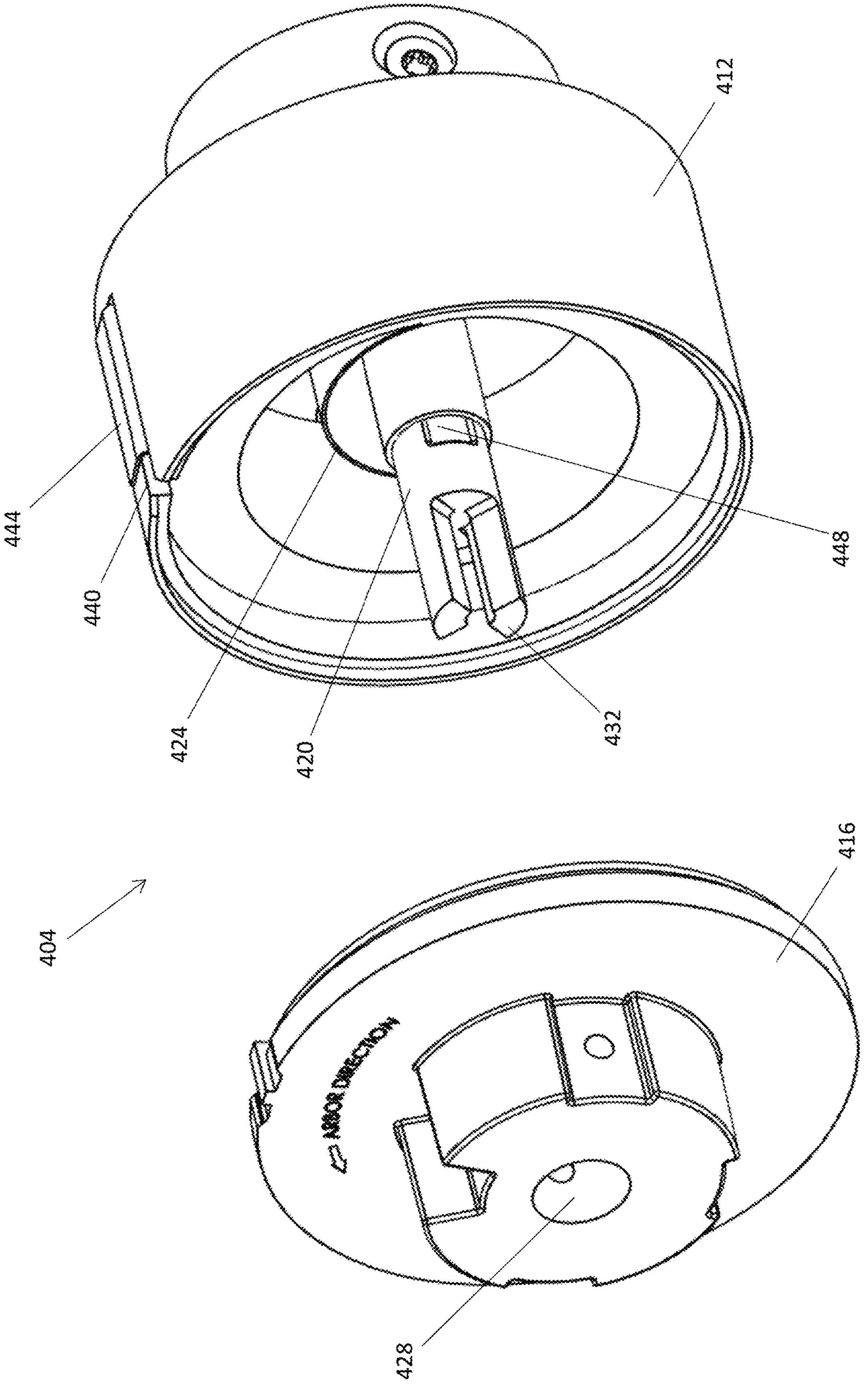
FIG. 19 is a perspective, partially exploded view of the spring assembly of FIG. 18 illustrating a cap detached from the housing.
Figure 20:
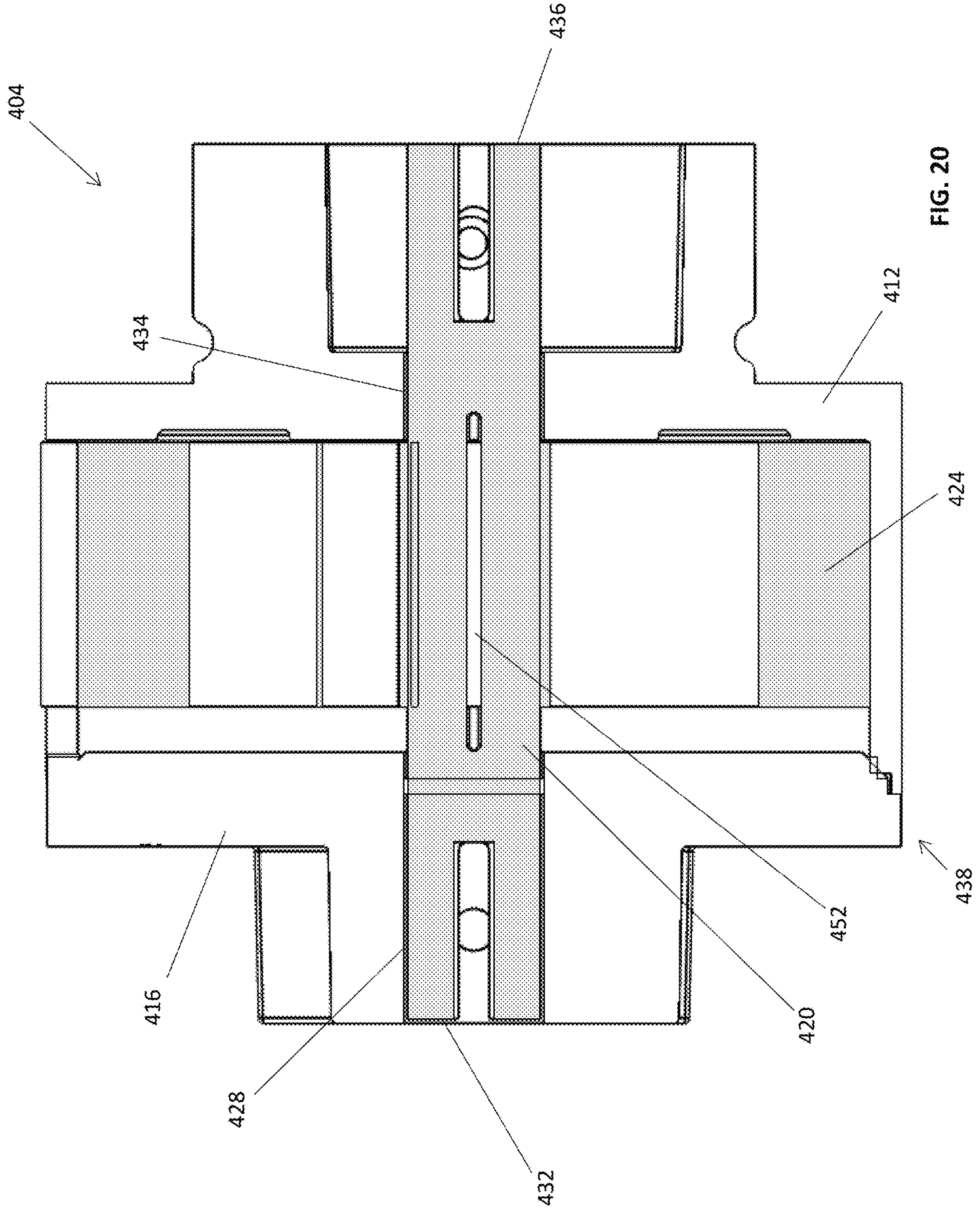
FIG. 20 is a cross-section view of the spring assembly taken along line 20-20 of FIG. 18.

With reference now to FIGS. 18-20, the spring assembly 404 includes a housing 412, an end cap 416, a shaft 420, and a biasing member 424 (or spring member 424). With reference to FIGS. 18-19, the end cap 416 is fastened to the housing 412. In the illustrated embodiment, the end cap 416 is fastened to the housing 412 by a sonic weld. In other embodiments, the end cap 416 can be fastened to the housing 412 by any suitable fastener (e.g., an adhesive, an interlocking connection, etc.). The end cap 416 defines an aperture 428 that receives a first end 432 of the shaft 420 (or arbor 420). The housing 412 defines an aperture 434 (shown in FIG. 20) that receives a second end 436 of the shaft 420. The shaft 420 is configured to rotate relative to the housing 412 and relative to the end cap 416. Stated another way, the shaft 420 is configured to rotate relative to a housing assembly 438. The housing assembly 438 includes the housing 412 and the end cap 416.

The housing 412 defines a slot 440. The slot 440 is positioned through a portion of an outer circumference of the housing 412. The slot 440 receives a first end 444 of the biasing member 424. A second end 448 of the biasing member 424 is received by a slot 452 in the shaft 420 (shown in FIG. 20). In the illustrated embodiment, the biasing member 424 is a spiral spring 424 (or a roller spring 424). The spiral spring 424 can extend from the slot 440 to the slot 452. In between the slots 440, 452, the spiral spring 424 can extend around an internal circumference of the housing 412 at least one time, and more specifically a plurality of times. In other embodiments, the biasing member 424 can be any type of spring or device that applies a biasing force onto the shaft 420 such that rotation of the shaft 420 relative to the housing assembly 438 is restrained (or limited).

As illustrated in FIGS. 16 and 18, the housing assembly 438 defines the second locking member 456. More specifically, the end cap 416 defines the second locking member 456. The second locking member 456 defines a plurality of alternating projections 460 and recesses 464 positioned on an outer circumference that surrounds the aperture 428. The second locking member 456 is configured to engage the first locking member 346 in a keyed (or interlocking) connection. In the illustrated embodiment, the second locking member 456 is configured to be received by the first locking member 346. Each projection 460 of the second locking member 456 is received by a corresponding recess 354 of the first locking member 346, while each projection 350 of the first locking member 346 is received by a corresponding recess 464 of the second locking member 456. The interlocking connection (or keyed connection) formed between the first and second locking members 346, 456 facilitates a connection between the spring tension assembly 400 and the idler assembly 300, and more specifically a connection between the spring assembly 404 and the idler housing 308. In addition to the interlocking connection, the spring assembly 404 and the idler housing 308 can be further fastened to each other by at least one fastener 359 (e.g., a screw, a bolt, etc.) (a representative fastener 359 is illustrated in FIG. 17). Each fastener 359 can be received by aligned (or overlapping) fastener apertures 358, 468 that are respectively positioned in the idler housing 308 (see FIG. 14) and the spring assembly 404 (see FIG. 18).

The second locking member 456 is positioned on a first side 472 (or at a first end 472) of the spring assembly 404 (see FIG. 16). The spring assembly 404 includes a second side 476 (or a second end 476) (see FIG. 17) that is opposite the first side 472. With reference to FIG. 17, at the second side 476, the housing assembly 438 defines a first locking member 346. More specifically, the housing 412 defines the first locking member 346. It should be appreciated that the first locking member 346 on the spring assembly 404 is substantially the same as the first locking member 346 on the idler housing 308, and includes the same components (e.g., alternating projections 350 and recesses 354, fastener apertures 358, fasteners 359, etc.) to facilitate a keyed (or interlocking) engagement with another component having a complimentary second locking member 456.

With reference back to FIGS. 16-17, the spring drive 408 (or tube adapter 408) includes a housing 480 that defines a plurality of projections 482 (or members 482). The projections 482 are positioned around an outer circumference of the housing 480 of the spring drive 408. The projections 482 are configured to engage corresponding engagement zones 240 within the roller tube 204. More specifically, each projection 482 is configured to engage a corresponding first engagement zone 240*a*. This facilitates a rotatable connection between the roller tube 204 and the spring drive 408, such that they rotate together.

With reference to FIG. 16, the spring drive 408 also includes a receptacle 484. The receptacle 484 is defined by a wall 486 and includes a drive shaft 488 (or shaft 488) positioned in the receptacle 484. The drive shaft 488 is fastened to (or formed with) the housing 480 of the spring drive 408. The drive shaft 488 does not rotate relative to the housing 480. Stated another way, the housing 480 and the drive shaft 488 rotate together, or the drive shaft 488 rotates with the housing 480. The drive shaft 488 is configured to interlock (or engage) with the shaft 420 of the spring assembly 404. More specifically, an end of the drive shaft 488 is configured to interlock (or engage) with an end of the shaft 420 of the spring assembly 404. To facilitate the interlocking connection, the drive shaft 488 defines a first coupling portion 490, while the shaft 420 defines a second coupling portion 494 (see FIG. 17). The first and second coupling portions 490, 494 are keyed to interlock (or axially interlock). The first and second coupling portions 490, 494 can together form a jaw type interlocking coupling, or any other suitable, axially keyed interlocking coupling. The interlocking coupling is configured to transfer rotational force (or torque) from the drive shaft 488 to the shaft 420, facilitating responsive rotation of the shaft 420 relative to the housing assembly 438.

With reference to FIGS. 16-17, as the first and second coupling portions 490, 494 interlock to form an axial coupling, the receptacle 484 receives a portion of the housing assembly 438 of the spring assembly 404. More specifically, the receptacle 484 of the spring drive 408 receives the first locking member 346, and an associated wall 495 that surrounds the first locking member 346. This allows the spring drive 408 to rotate relative to the housing assembly 438 of the spring assembly 404 while facilitating rotation of the shaft 420 of the spring assembly 404.

In the embodiment of the roller tube assembly 200 shown in FIG. 7, the spring tension assembly 400 includes a single spring assembly 404. As discussed above, the first side 472 of the spring assembly 404 coupled to the idler assembly 300, and more specifically to the idler housing 308. The second side 476 of the spring assembly 404 is coupled to the spring drive 408. While a single spring assembly 404 may be suitable for operation of certain roller shades, in other embodiments, the spring tension assembly 400 can include a plurality of spring assemblies 404. For example, a roller shade that has a larger diameter shades (for covering larger or taller architectural openings), or a roller shade that has a longer roller tube (for covering a wider architectural opening) may require more than one spring assembly 404.

Figure 21:
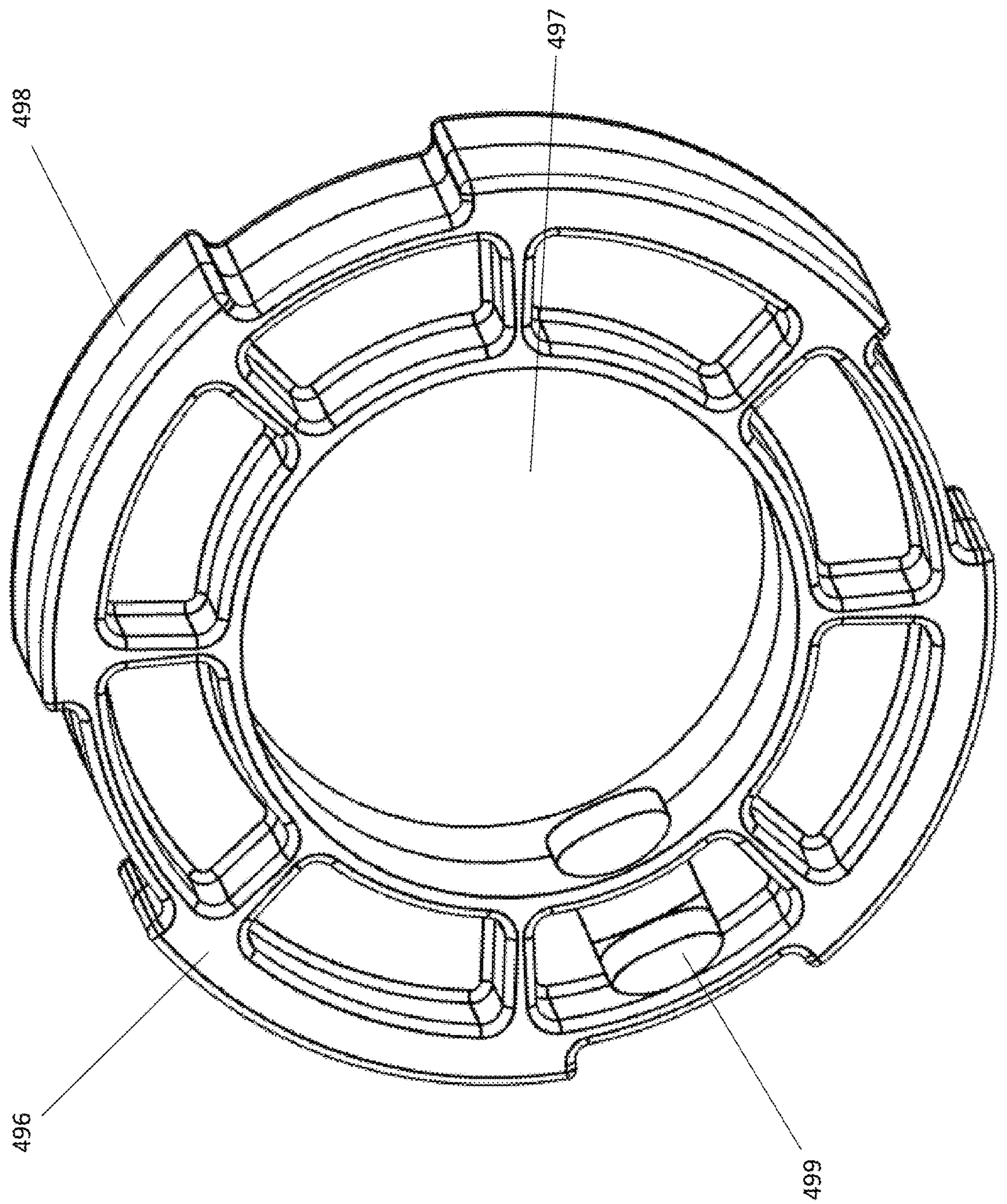
FIG. 21 is a perspective view of a drive collar for use with the spring tension assembly of FIG. 16.

The spring tension assembly 400 can include at least one drive collar 496. For example, in embodiments of the spring tension assembly 400 with a plurality of spring assemblies 404, the spring tension assembly 400 can include at least one drive collar 496. As illustrated in FIG. 21, the drive collar 496 includes a central aperture 497 and a plurality of projections 498. The plurality of projections 498 (or members 498) are positioned around an outer circumference of the drive collar 496. The projections 498 are configured to engage corresponding engagement zones 240 within the roller tube 204. More specifically, each projection 498 is configured to engage a corresponding first engagement zone 240*a* (see FIG. 8). This facilitates a rotatable connection between the roller tube 204 and the drive collar 497, such that they rotate together. The drive collar 496 can also define a radial aperture 499 (or passage 499). The aperture 499 can provide access to insert (or remove) a fastener 359 (see FIG. 22) that can be used to fasten (or couple) the spring assembly 404 and the idler housing 308, or consecutive spring assemblies 404.

Figure 22:
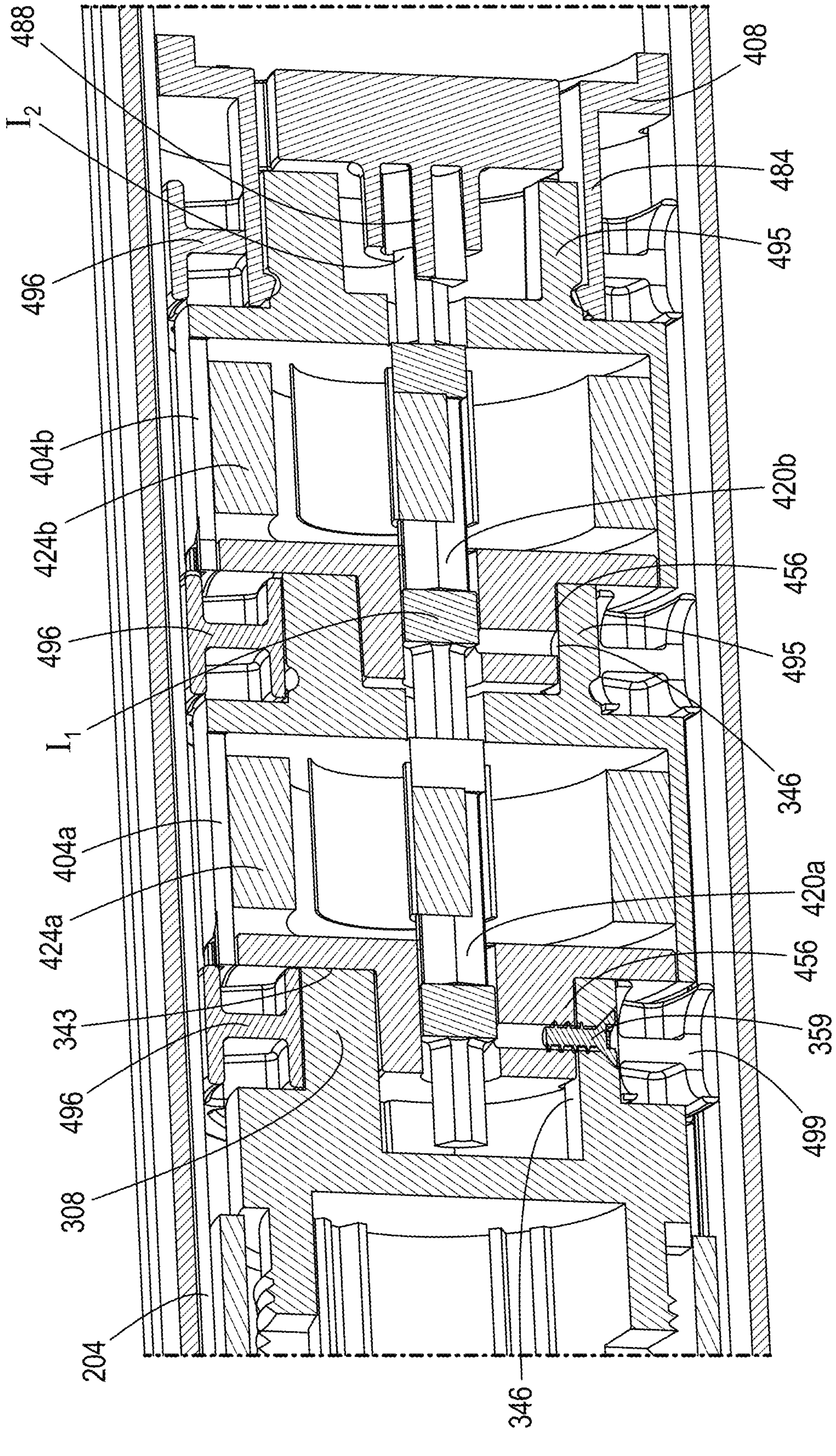
FIG. 22 is a cross-sectional view of an embodiment of the roller shade assembly of FIG. 1, the idler housing being coupled to a spring tension assembly having a plurality of spring assemblies connected in parallel.

The drive collar 496 provides an intermediate contact point with the roller tube 204 and can be positioned at one or more locations between the idler member 304 and the spring drive 408. In embodiments where the idler member 304 and the spring drive 408 are spaced apart a distance such that undesired movement (or oscillation or wobble) of the roller tube 204 relative to the spring tension assembly 400 can occur, it can be desirable to integrate one or more drive collars 496 to the spring tension assembly 400. Undesired movement (or oscillation or wobble) of the roller tube 204 relative to the spring tension assembly 400 can occur in embodiments of the spring tension assembly 400 having a plurality of spring assemblies 404. FIG. 22 illustrates an embodiment of the spring tension assembly 400 including a plurality of spring assemblies 404*a*, 404*b*. While the embodiment illustrates two spring assemblies 404*a*, 404*b*, it should be appreciated that in other embodiments two or more spring assemblies 404 can be integrated into the spring tension assembly 400.

The drive collar 496 can be positioned such that the central aperture 497 (shown in FIG. 21) receives a portion of the idler housing 308 (shown in FIG. 22). With reference to FIG. 22, the drive collar 496 can rotate relative to the idler housing 308 near the second end 343 where the first locking member 346 of the idler housing 308 engages the second locking member 456 of the spring assembly 404*a*. The idler housing 308 and the spring assembly 404*a* do not rotate in response to rotation of the roller tube 204, as neither the idler housing 308 nor the spring assembly 404*a* contact the roller tube 204. Accordingly, the drive collar 497 is free to rotate relative to the idler housing 308 in response to rotation of the roller tube 204.

With continued reference to FIG. 22, the drive collar 496 can also be positioned such that the central aperture 497 (shown in FIG. 21) receives a portion of the wall 495 that surrounds the first locking member 346 of the spring assembly 404*a*. The drive collar 496 can rotate relative to a first spring assembly 404*a* around the wall 495 where the first locking member 346 of the first spring assembly 404*a* engages the second locking member 456 of a second spring assembly 404*b*. The first spring assembly 404*a* and the second spring assembly 404*b* do not rotate in response to rotation of the roller tube 204, as neither spring assembly 404*a*, 404*b* is in contact the roller tube 204. Accordingly, the drive collar 497 is free to rotate relative to the first and second spring assemblies 404*a*, 404*b* in response to rotation of the roller tube 204.

The drive collar 496 can further be positioned such that the central aperture 497 (shown in FIG. 21) receives a portion of the receptacle 484 of the spring drive 408. The drive collar 496 can rotate relative to the spring drive 408, around the receptacle 484 that receives the second locking member 456 of the second spring assembly 404*b*. While the second spring assembly 404*b* does not rotate in response to rotation of the roller tube 204, as the second spring assembly 404*b* is not in contact the roller tube 204, the spring drive 408 is in contact with the roller tube 204. Accordingly, the drive collar 497 rotates relative to the second spring assembly 404*b* and rotates with the spring drive 408 in response to rotation of the roller tube 204.

In embodiments of the spring tension assembly 400 having a plurality of spring assemblies 404, the spring assemblies 404 can be connected (or interconnected) in parallel, in series, or a combination of both parallel and series. Stated another way, the spring assemblies 404 are connected such that the biasing force applied by the biasing member 424 onto each shaft 420 is connected in parallel, in series, or in both parallel and series.

FIG. 22 illustrates a plurality of spring assemblies 404 connected in parallel. For ease of discussion, the first spring assembly 404*a* and its associated components are identified with an "a" following the reference numeral, while the second spring assembly 404*b* and its associated components are identified with an "b" following the reference numeral. The first or second spring assemblies 404*a*, 404*b* and associated components are identical. The "a" and "b" are simply associated with either the first or second spring assemblies 404*a*, 404*b*, and are provided for purposes of clarity in the description.

With reference to FIG. 22, the shaft 420*a* (or first shaft 420*a*) of the first spring assembly 404*a*, and the shaft 420*b* (or second shaft 420*b*) of the second spring assembly 404*b* are coupled by an interlocking connection. More specifically, an end of the shaft 420*a* interlocks (or engages) with an end of the shaft 420*b*. The interlocking connection $I_1$ (or keyed connection) formed between the shafts 420*a*, 420*b* corresponds to the first locking member 346 of the first spring assembly 404*a* being positioned into engagement with the second locking member 456 of the second spring assembly 404*b*. The interlocking connection $I_1$ formed between the shafts 420*a*, 420*b* facilitates a parallel connection of the biasing forces applied by each biasing member 424*a*, 424*b* to the respective shaft 420*a*, 420*b*. The spring drive 408 rotates in response to rotation of the roller tube 204. The drive shaft 488 of the spring drive 408, which is in an interlocking connection $I_2$ with the second shaft 420*b* of the second spring assembly 404*b*, rotates with the spring drive 408. The rotation of the spring drive 408 is translated through the drive shaft 488 to the second shaft 420*b*, and in turn from the second shaft 420*b* to the first shaft 420*a*. As such, the shafts 420*a*, 420*b* rotate in response to rotation of the spring drive 408. The first biasing member 424*a* applies a first biasing force to the first shaft 420*a*, and the second biasing member 424*b* applies a second biasing force to the second shaft 420*b*. The biasing forces are connected in parallel by the associated interlocking connection of the shafts 420*a*, 420*b*.

Figure 23:
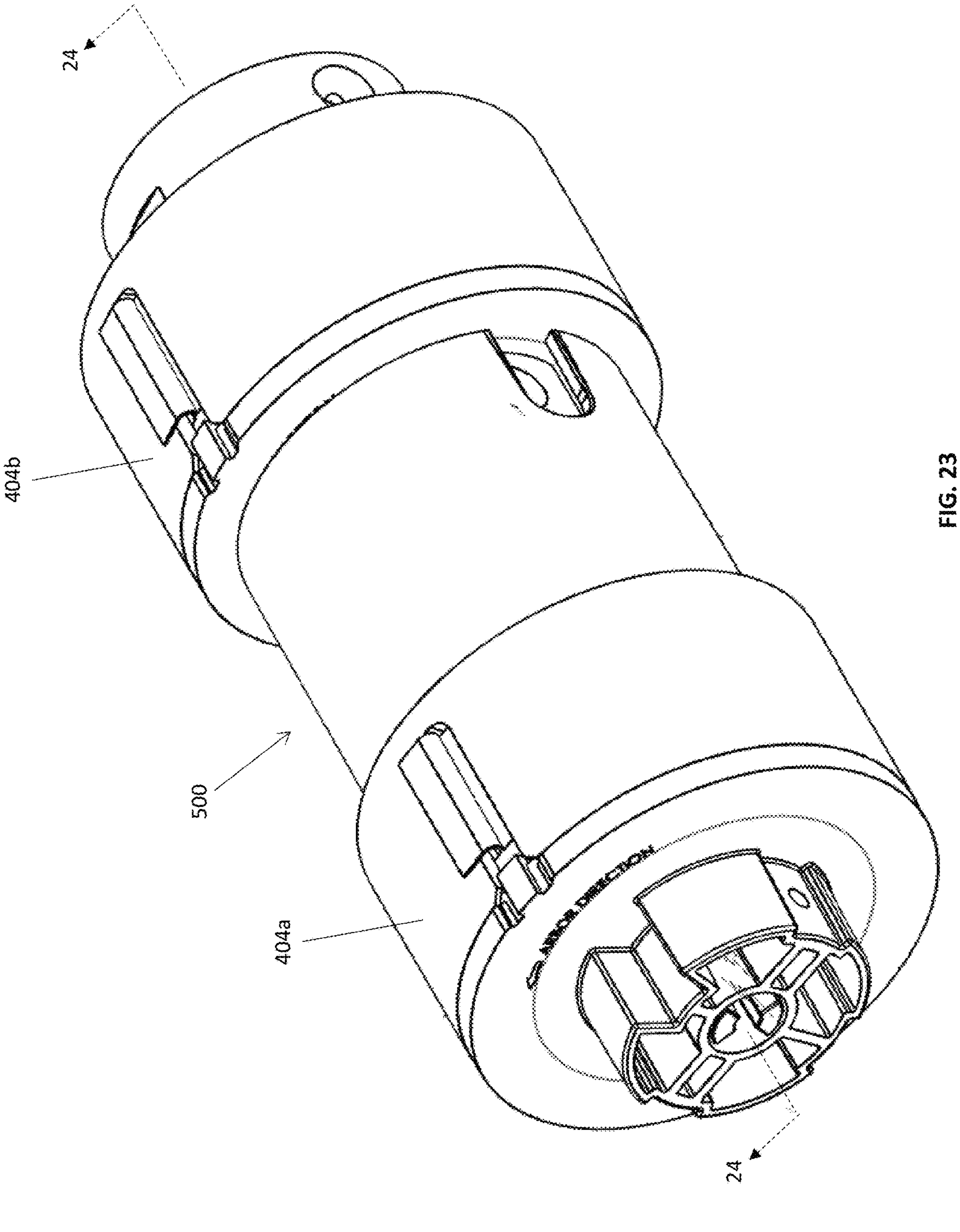
FIG. 23 is a perspective view of a series connection assembly for use with the spring tension assembly associated with the roller shade assembly of FIG. 1
Figure 24:
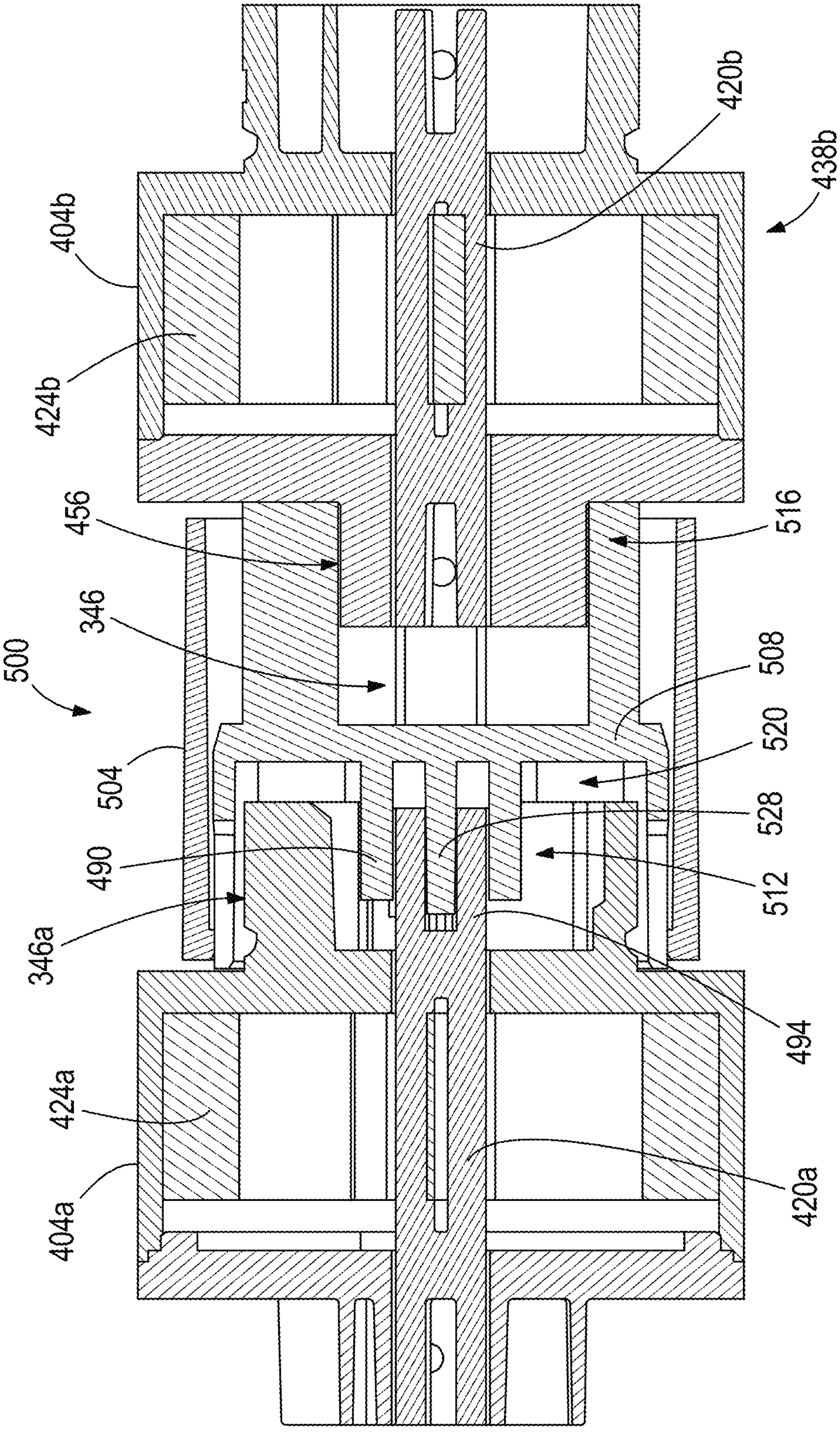
FIG. 24 is a cross-sectional view of the series connection assembly, taken along line 24-24 of FIG. 23.

FIGS. 23-24 illustrates an embodiment of a spring tension assembly 400 where a plurality of spring assemblies 404 are connected in series. With reference to FIG. 23, the first spring assembly 404*a* is connected to the second spring assembly 404*b* by a series connection assembly 500. With reference to FIG. 24, the series connection assembly 500 includes a housing 504 and a connector 508. The connector 508 is received in the housing 504. The connector 508 is also configured to rotate relative to the housing 504. The connector 508 includes a first end 512 opposite a second end 516.

Figure 25:
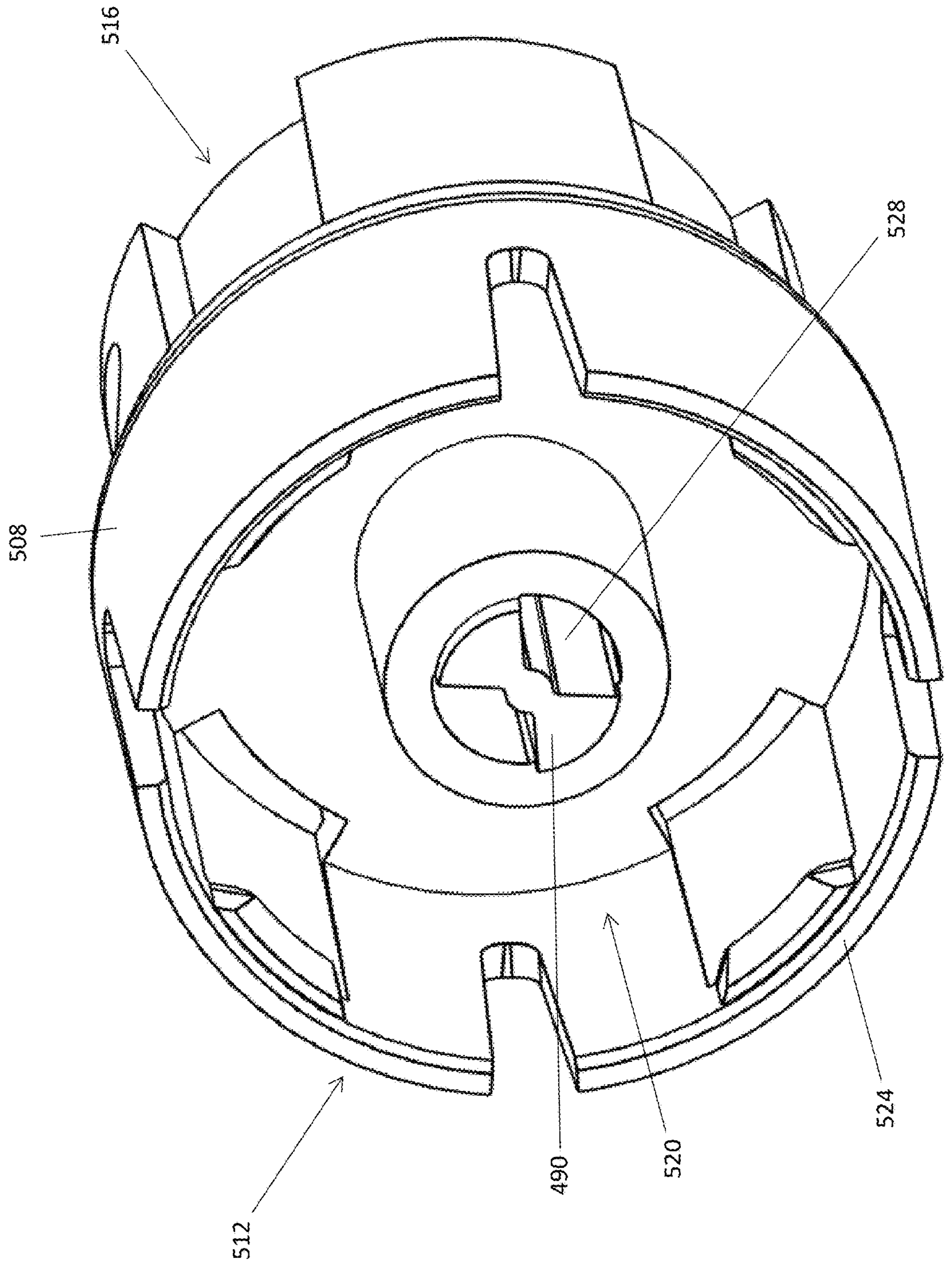
FIG. 25 is a perspective view of a first end of a connector of the series connection assembly of FIG. 23.

With reference to FIGS. 24-25, the first end 512 of the connector 508 includes a receptacle 520. The receptacle 520 is defined by a wall 524 and includes a shaft 528 positioned in the receptacle 520. The shaft 528 is fastened to (or formed with) the receptacle 520 of the connector 508. Thus, the shaft 528 does not rotate relative to the connector 508, and instead rotates with the connector 508 (or the shaft 528 and connector 508 rotate together). An end of the shaft 528 is configured to interlock (or engage) with an end of the shaft 420*a* of the first spring assembly 404*a*. To facilitate the interlocking connection, the shaft 528 defines a first coupling portion 490, while the shaft 420*a* defines a second coupling portion 494 (see FIG. 24). The first and second coupling portions 490, 494 are keyed to interlock (or axially interlock), with the first locking member 346*a* of the first spring assembly 404*a* is received by the receptacle 520. The first and second coupling portions 490, 494 can together form a jaw type interlocking coupling, or any other suitable, axially keyed interlocking coupling. The interlocking coupling is configured to transfer rotational force (or torque) between the shaft 528 and the first shaft 420*a*.

Figure 26:
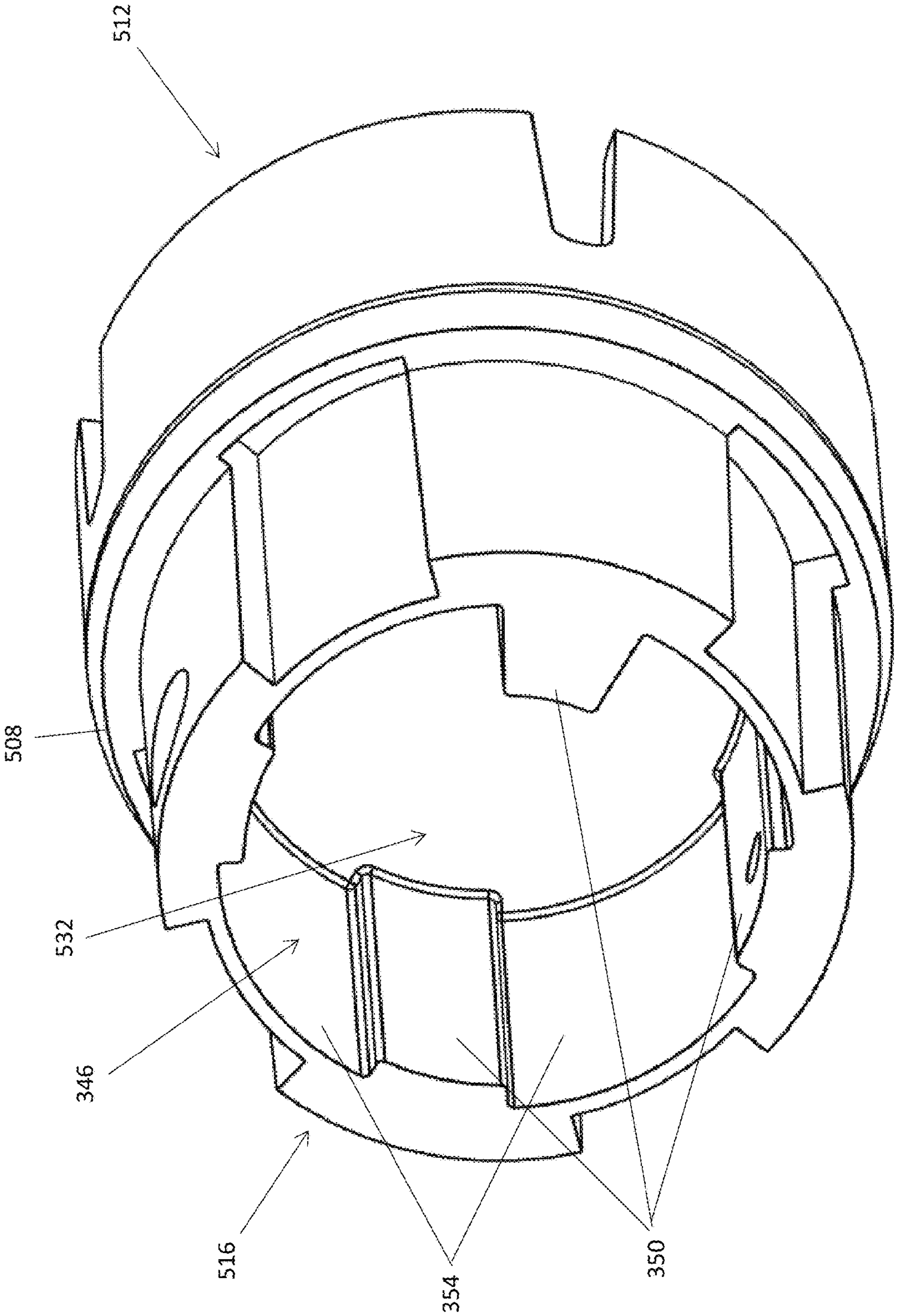
FIG. 26 is a perspective view of a second end, opposite the first end, of the connector of FIG. 25.

With reference to FIGS. 24 and 26, the second end 516 of the connector 508 defines a first locking member 346. The first locking member 346 includes a plurality of alternating projections 350 and recesses 354 positioned on an inner circumference that surrounds an opening 532. The first locking member 346 is configured to engage a corresponding second locking member 456 defined by the second spring assembly 404*b*. The first locking member 346 of the connector 508 and the second locking member 456 of the second spring assembly 404*b* facilitate a keyed (or interlocking) engagement, fastening the connector 508 to the housing assembly 438*b* of the second spring assembly 404*b*.

The connection of the connector 508 to the first and second spring assemblies 404*a*, 404*b* facilitate a series connection of the biasing forces applied by each biasing member 424*a*, 424*b* to the respective shaft 420*a*, 420*b*. With reference to FIG. 24, the first shaft 420*a* of the first springs assembly 404*a* rotates, for example in response to rotation of the spring drive 408 (as discussed above). As the first shaft 420*a* rotates, the rotational force is translated to the shaft 528 of the connector 508. Accordingly, the shaft 528 rotates in response to rotation of the first shaft 420*a*. Rotation of the shaft 528 facilitates rotation of the connector 508. The connector 508 rotates relative to the housing 504. As the connector rotates 508, the housing assembly 438*b* of the second spring assembly 404*b* rotates, as the housing assembly 438*b* is coupled to the connector 508 by the keyed first and second locking members 346, 456. Thus, upon rotation of the second shaft 420*b*, the biasing force of the first and second spring assemblies 404*a*, 404*b* are communicated to the second shaft 420*b* through the series connection. It should be appreciated that the series connection can also occur in the reverse order as to what is described above, notably from the second spring assembly 404*b* to the first spring assembly 404*a*.

It should be appreciated that the spring tension assembly 400 can include a single spring assembly 404, or a plurality of spring assemblies 404. The modular aspect of each spring assembly 404 facilitates the addition (or removal) of spring assemblies 404 as needed. In addition, while FIG. 22 illustrates spring assemblies 404 connected in parallel, while FIGS. 23-24 illustrate spring assemblies 404 connected in series, in other embodiments, a plurality of spring assemblies can be connected in parallel and in series.

As an example, in an embodiment with at least three spring assemblies 404 (or three or more spring assemblies 404), a first spring assembly 404 and a second spring assembly 404 can be connected in parallel, as discussed in association with FIG. 22, while the second spring assembly 404 and a third spring assembly 404 can be connected in series, as discussed in association with FIGS. 23-24. In other embodiments, at least two spring assemblies 404 can be connected in series, and at least two spring assemblies 404 can be connected in parallel. It should be appreciated that in yet other embodiments, a first plurality of spring assemblies 404 (e.g., two or more) can be connected in parallel, while a second plurality of spring assemblies 404 (e.g., two or more) can be connected in series. The modularity of the spring assemblies 404 facilitates adjustability to select (or change) a suitable (or desired) counterbalancing force applied to the roller shade by the spring tension assembly 400.

Figure 27:
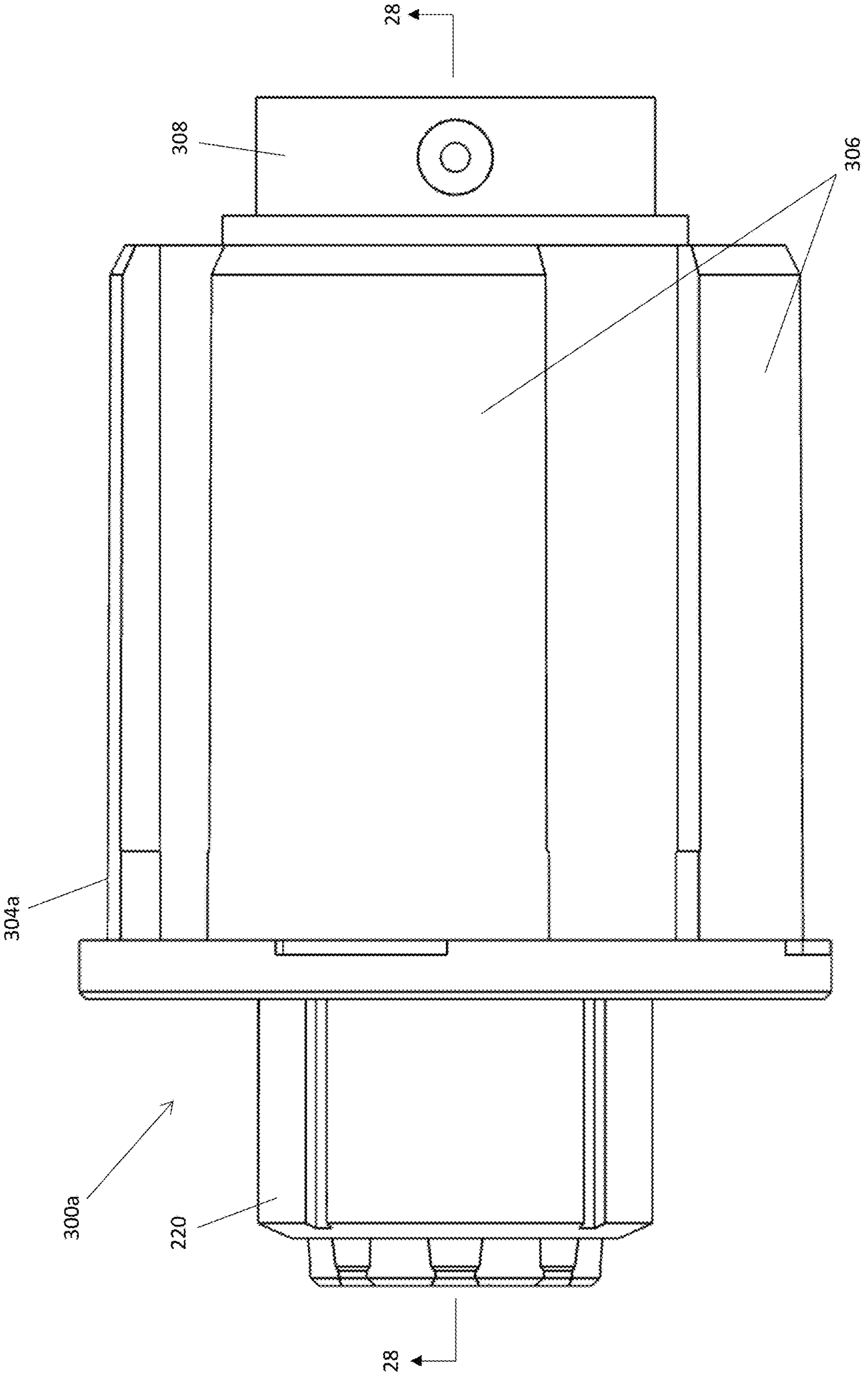
FIG. 27 is a plan view of another example of an embodiment of an idler assembly associated with the roller shade assembly of FIG. 1.
Figure 28:
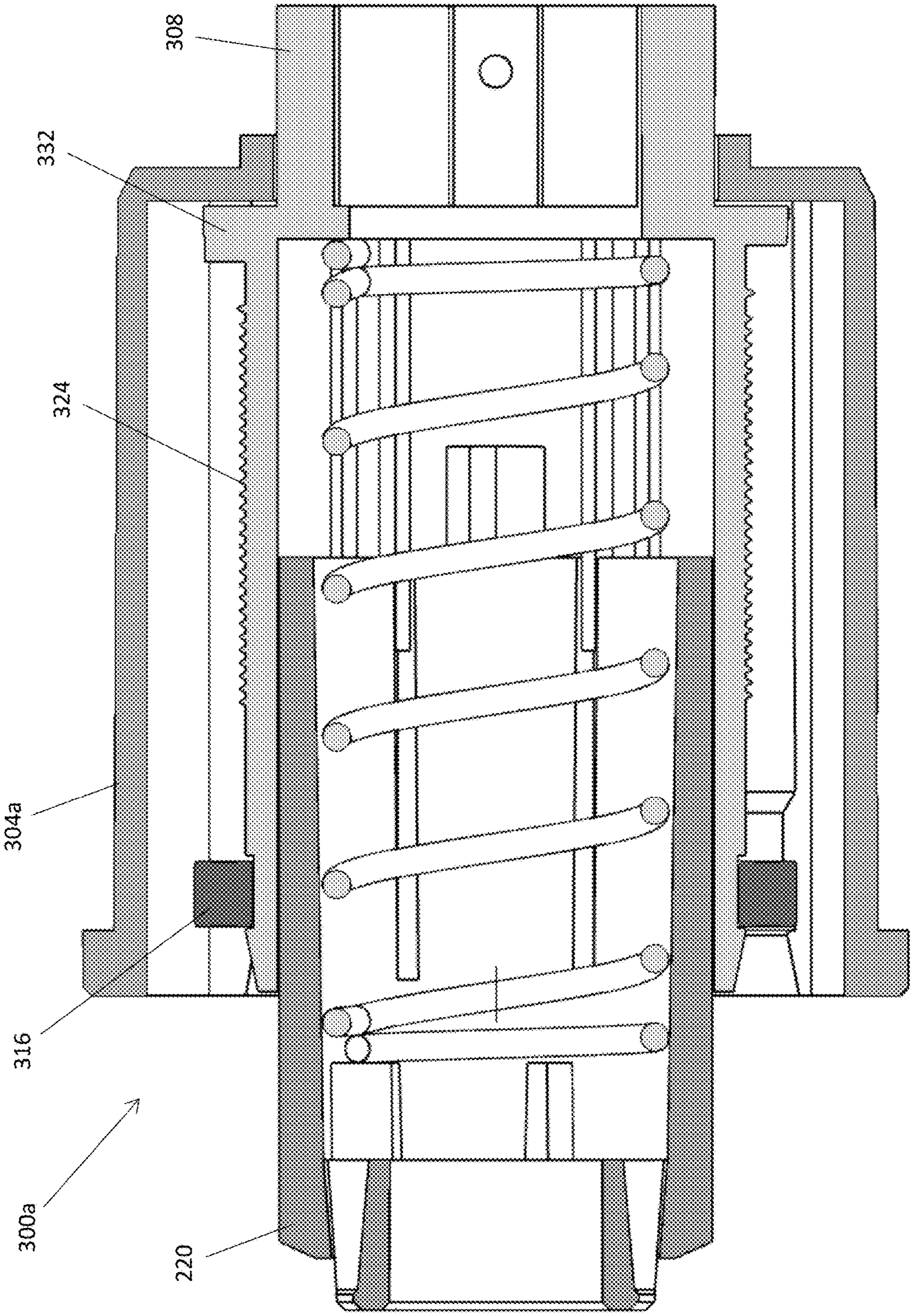
FIG. 28 is a cross-sectional view of the idler assembly of FIG. 27, taken along line 28-28 of FIG. 27.
Figure 29:
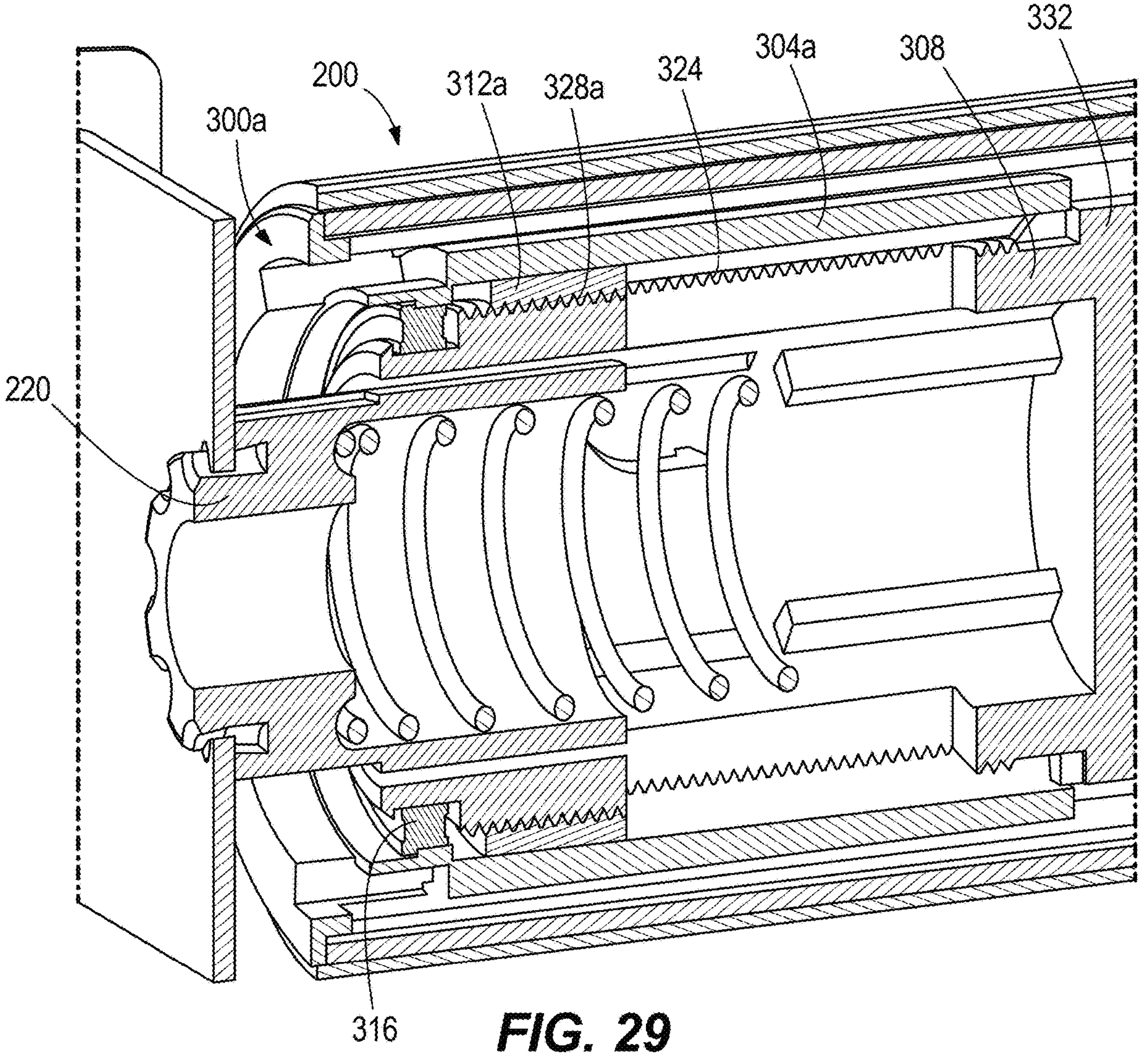
FIG. 29 is a cross-section view of a portion of the idler assembly of FIG. 27 shown within the roller tube assembly and engaged with a bracket member of FIG. 3.

FIGS. 27-29 illustrate an alternative embodiment of an idler assembly 300*a*. The idler assembly 300*a* has many of the same components as the idler assembly 300. For clarity, like numbers identify like components. Similar components that have structural differences are identified by the same reference number with an "a." The differences are discussed in additional detail below. With reference to FIG. 27, the idler assembly 300*a* includes an idler member 304*a* and an idler housing 308. The idler member 304*a* defines a plurality of projections 306. A plunger 220 is slidably received and retained by the idler housing 308. With reference to FIGS. 28-29, the idler housing 308 includes an annular bearing 316 that engages the idler member 304*a*. The idler member 304*a* is configured to rotate relative to the idler housing 308 by the annular bearing 316. The idler housing 308 also includes a thread 324 and a support collar 332.

With reference now to FIG. 29, the idler member 304*a* integrates (or incorporates) a timing ring 312*a*. Stated another way, instead of the timing ring 312 directly engaging the roller tube 204, as disclosed in association with the idler assembly 300 shown in FIGS. 9-15, the timing ring 312*a* engages the idler member 304*a*. The timing ring 312*a* defines a timing ring thread 328*a* that extends around an internal circumference of the timing ring 312*a*. The timing ring thread 328*a* is configured to engage the thread 324. The timing ring 312*a* is configured to rotate with the idler member 304*a*. The idler member 304*a* is configured to rotate with the roller tube 204. As the timing ring 312*a* rotates with the idler member 304*a*, the timing ring 312*a* travels in a lateral direction (or horizontally) along the idler housing 308. The lateral travel is in response to the engagement of the timing ring thread 328*a* with the thread 324 on the idler housing 308. Accordingly, as the timing ring 312*a* rotates relative to the idler housing 308, the timing ring 312 traverses the idler housing 308, and further laterally travels within (or along) the idler member 304*a*. For example, the timing ring 312*a* laterally travels along a channel (not shown, but similar to the engagement zone 240 of the roller tube 204) defined in the idler member 304*a*. This also facilitates joint rotation of the timing ring 312*a* and idler member 304*a*. The timing ring 312*a* rotates and laterally travels in response to rotation of the idler member 304*a*. The direction of travel is in response to the direction of rotation of the timing ring 312*a* (e.g., rotation of the timing ring 312*a* in a first direction results in a travel of the timing ring 312*a* in a first direction relative to the idler housing 308, rotation of the timing ring 312*a* in a second direction, opposite the first direction, results in a travel of the timing ring 312*a* in a second direction, opposite the first direction, relative to the idler housing 308, etc.). In the illustrated embodiment, the timing ring thread 328*a* extends around an internal circumference of the timing ring 312*a* a plurality of times. In other examples of embodiments, the timing ring thread 328*a* can extend around the internal circumference of the idler member 304*a* a single time (i.e., it can be a single thread 328*a*). It should be appreciated that the timing ring 312*a* also includes the second stop member 340 (shown in FIG. 15, not shown in FIG. 29) that is configured to engage the surface of the first stop member 336.

With reference now to FIGS. 30-39, the brake assembly 600 is illustrated in greater detail. The brake assembly 600 includes the idler assembly 300, along with additional braking components. For example, and with reference to FIGS. 30-32 and 39, the brake assembly 600 includes an idler member 304, an idler housing 308, and a plunger 220 slidably received within the idler housing 308. The idler member 304, idler housing 308, and the plunger 220 are the same as the components associated with the idler assembly 300 and operate in the same fashion as described above. For brevity, additional related components (e.g., the annual bearing 316, the biasing member 338, etc.) also operate in the same fashion as the idler assembly 300, and for the sake of brevity are not repeated in association with the brake assembly 600.

Figure 33:
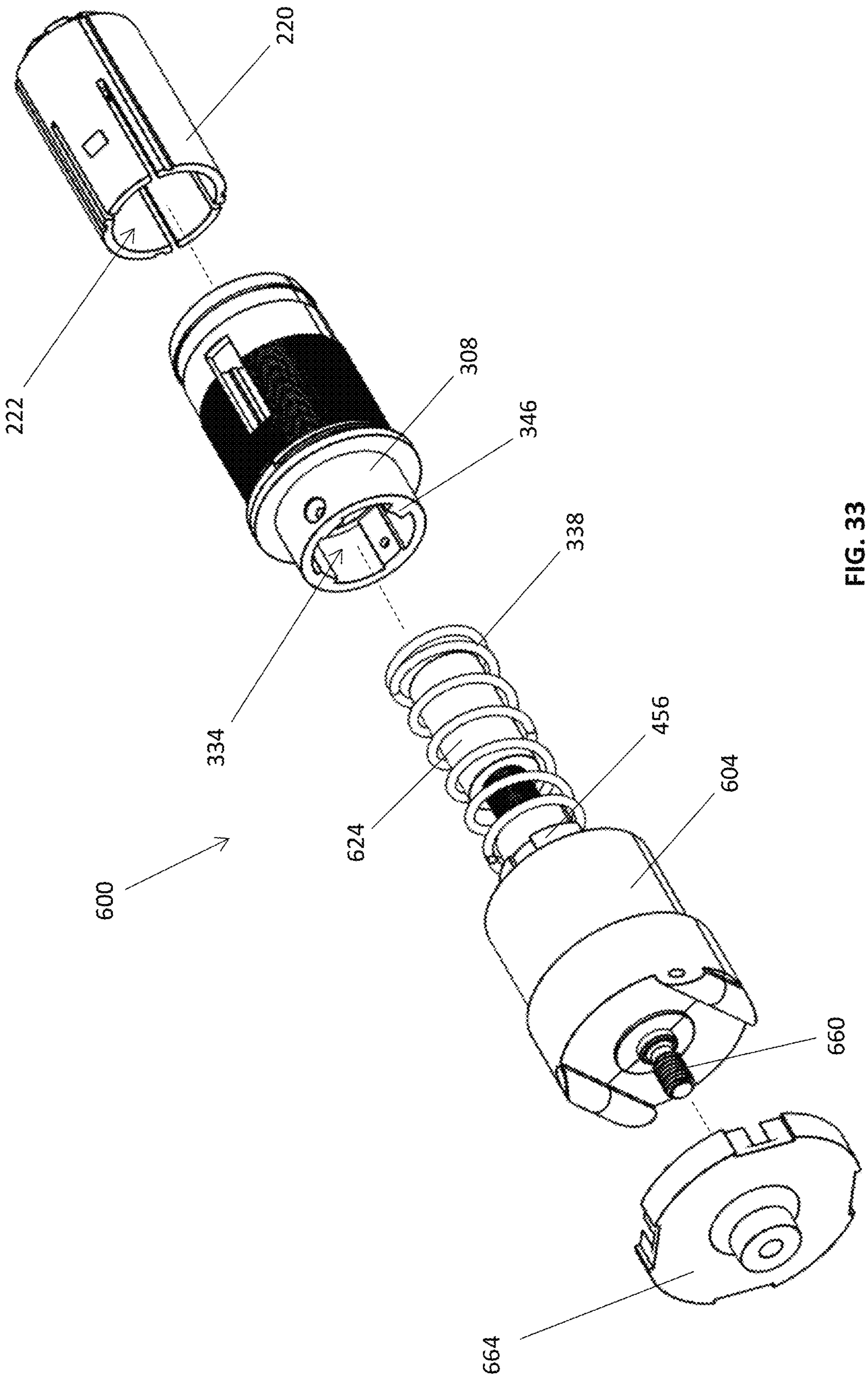
FIG. 33 is a partially exploded view of the brake assembly of FIG. 32, with the idler member and annular bearing removed for clarity.

A brake housing 604 is coupled to the idler housing 308. With reference to FIG. 33, the brake housing 604 includes a second locking member 456. The second locking member 456 is configured to engage a corresponding first locking member 346 defined by the idler housing 308. The locking members 346, 456 form a keyed (or interlocking) engagement, which can be further coupled by at least one fastener (not shown), as discussed in detail above (e.g., in association with the idler housing 308 and the spring tension assembly 400, etc.).

The brake housing 604 includes a first shell portion 608*a* and a second shell portion 608*b*. The first and second shell portions 608*a*, 608*b* are identical, and are mirror images of each other. The shell portions 608*a*, 608*b* couple together, and further can be fastened by at least one fastener 612 (e.g., screw, bolt, etc.), shown in FIG. 35.

Figure 37:
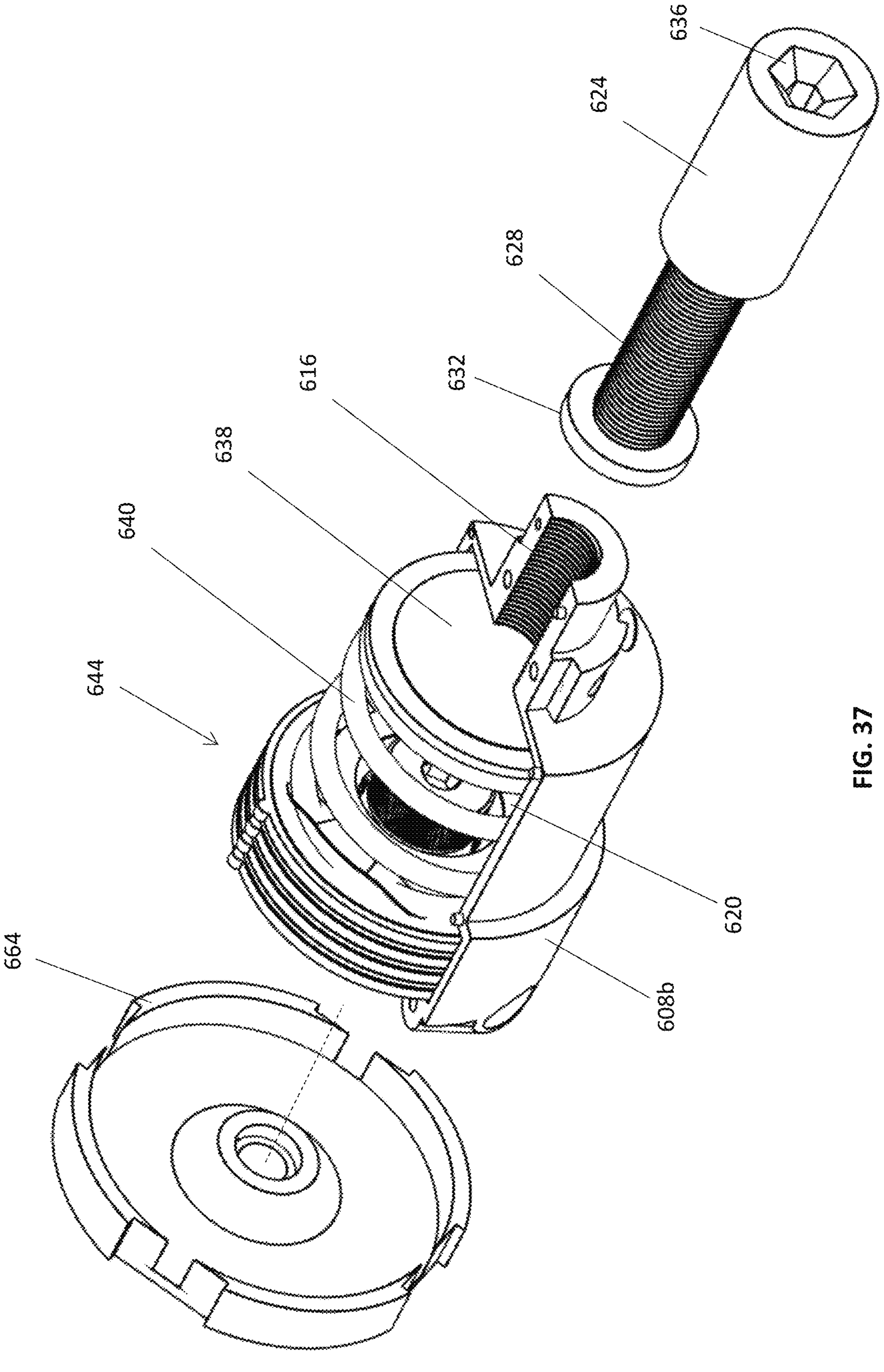
FIG. 37 is a perspective view of the brake assembly of FIG. 36.
Figure 39:
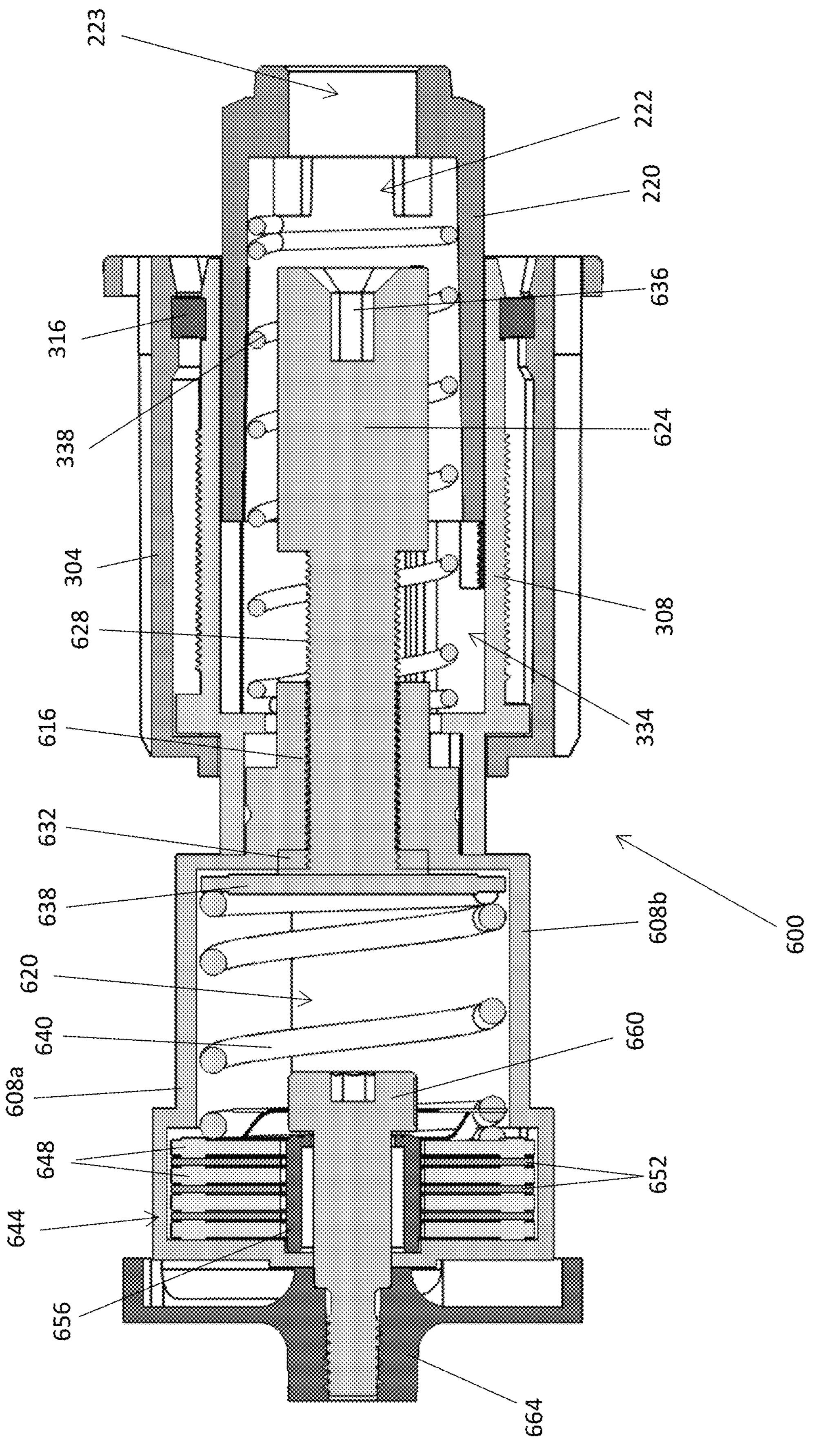
FIG. 39 is a cross-sectional view of the brake assembly, taken along line 39-39 of FIG. 31.

The shell portions 608 each define a threaded portion 616 and a brake containment portion 620. With reference to FIGS. 37 and 39, the threaded portion 616 defines a helical thread that is configured to engage a set screw 624 (also referred to as a brake force adjustment member 624), and more specifically a complimentary threaded portion 628 of the set screw 624. The set screw 624 also includes a bearing surface 632 positioned at a first end of the set screw 624, and a screw head 636 position at a second, opposite end of the set screw 624. In the illustrated embodiment, the screw head 636 is a hex socket configured to receive an Allen wrench. In other embodiments, the screw head 636 can be any suitable head or socket configured to receive (or engage) a suitable tool (e.g., Phillips, flat, star, etc.). The set screw 624 is configured to rotate relative to the shell portions 608*a*, 608*b*. As the set screw 624 rotates, the set screw 624 laterally travels into brake containment portion 620 or out of the brake containment portion 620. The lateral travel direction is determined by the direction of rotation of the set screw 624.

Figure 38:
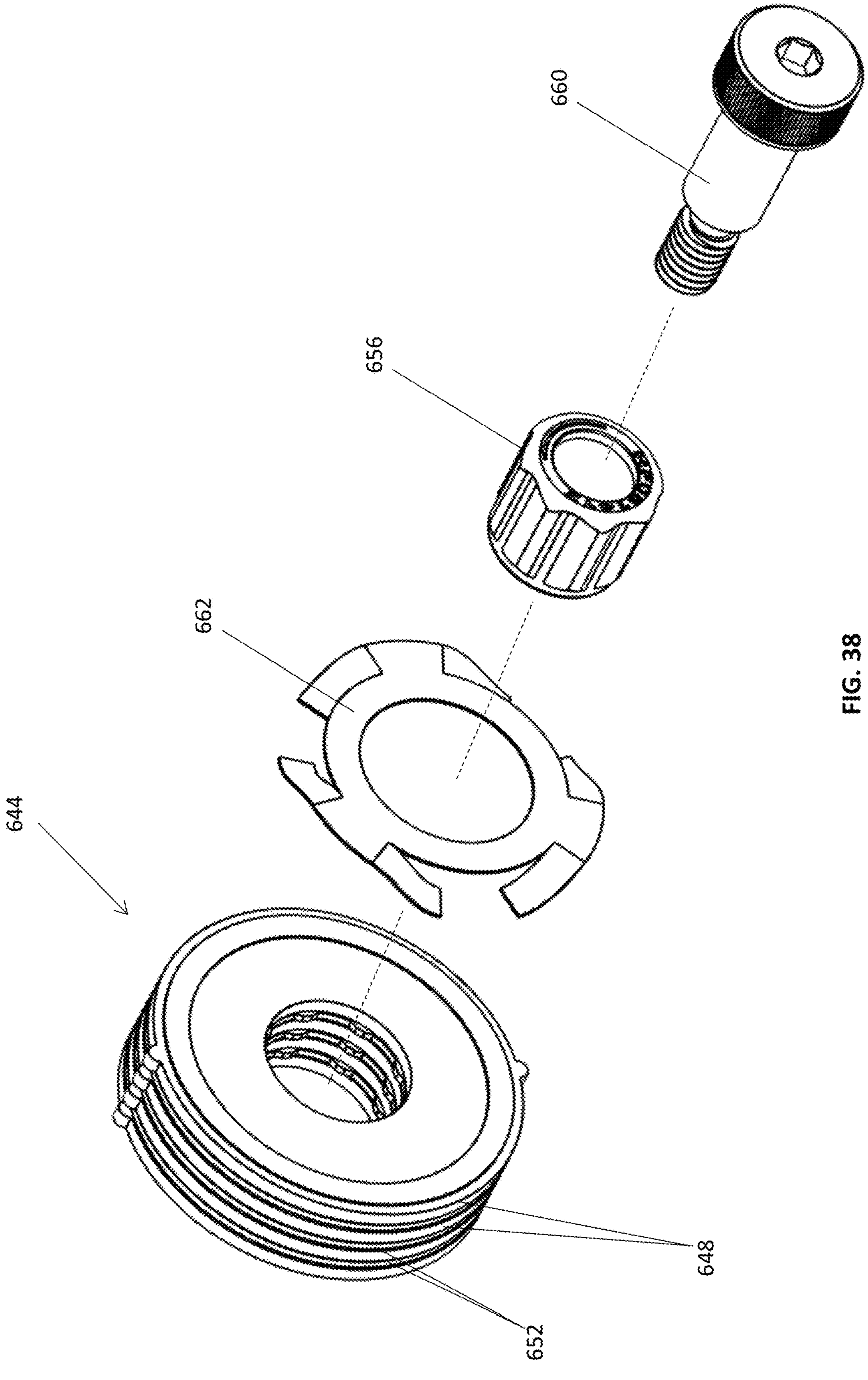
FIG. 38 is a partially exploded view of the braking surfaces, bearing, and brake shaft shown removed from the brake assembly of FIG. 37.

The bearing surface 632 is configured to contact an adjustment member 638. The adjustment member 638 is in contact with one end of a biasing member 640. The opposite end of the biasing member 640 is in contact with a plurality of braking surfaces 644. With reference to FIGS. 38-39, the plurality of braking surfaces 644 include a plurality of alternating first washers 648 and second washers 652. The first washers 648 are formed of a first material, while the second washers 652 are formed of a second material that is different from the first material. The interaction between washers 648, 652 generates friction, that facilitates generation of a braking force. It should be appreciated that the illustrated embodiment illustrates four of the first washers 648 and three of the second washers 652 shown in an alternating (or sandwich) configuration. In other embodiments fewer (or more) washers 648, 652 can be used to generate less (or greater) braking force. For example, a larger or longer roller tube 204 may require a greater braking force, and thus more washers 648, 652. To this end, the plurality of braking surfaces 644 can be referred to as a disc brake assembly 644.

The washers 648, 652 are mounted to a bearing 656. More specifically, the washers 648, 652 are mounted to an outer surface (or outer circumference) of the bearing 656. The bearing 656 is preferably a one way bearing (or an anti-reverse bearing, or a needle roller bearing, or a one-way clutch). The bearing 656 receives a brake shaft 660. A disc spring 662 (or finger spring 662) can be provided between the braking surfaces 644 and the biasing member 640. The amount of friction between the washers can be adjusted increasing (or decreasing) the biasing force applied by the biasing member 640 onto the braking surfaces 644. In the illustrated embodiment, the first washers are nylon washers, while the second washers are steel washers. In other embodiments, the washers can be made of any suitable materials whose interaction generates a suitable amount of friction to facilitate generation of a braking force.

Figure 34:
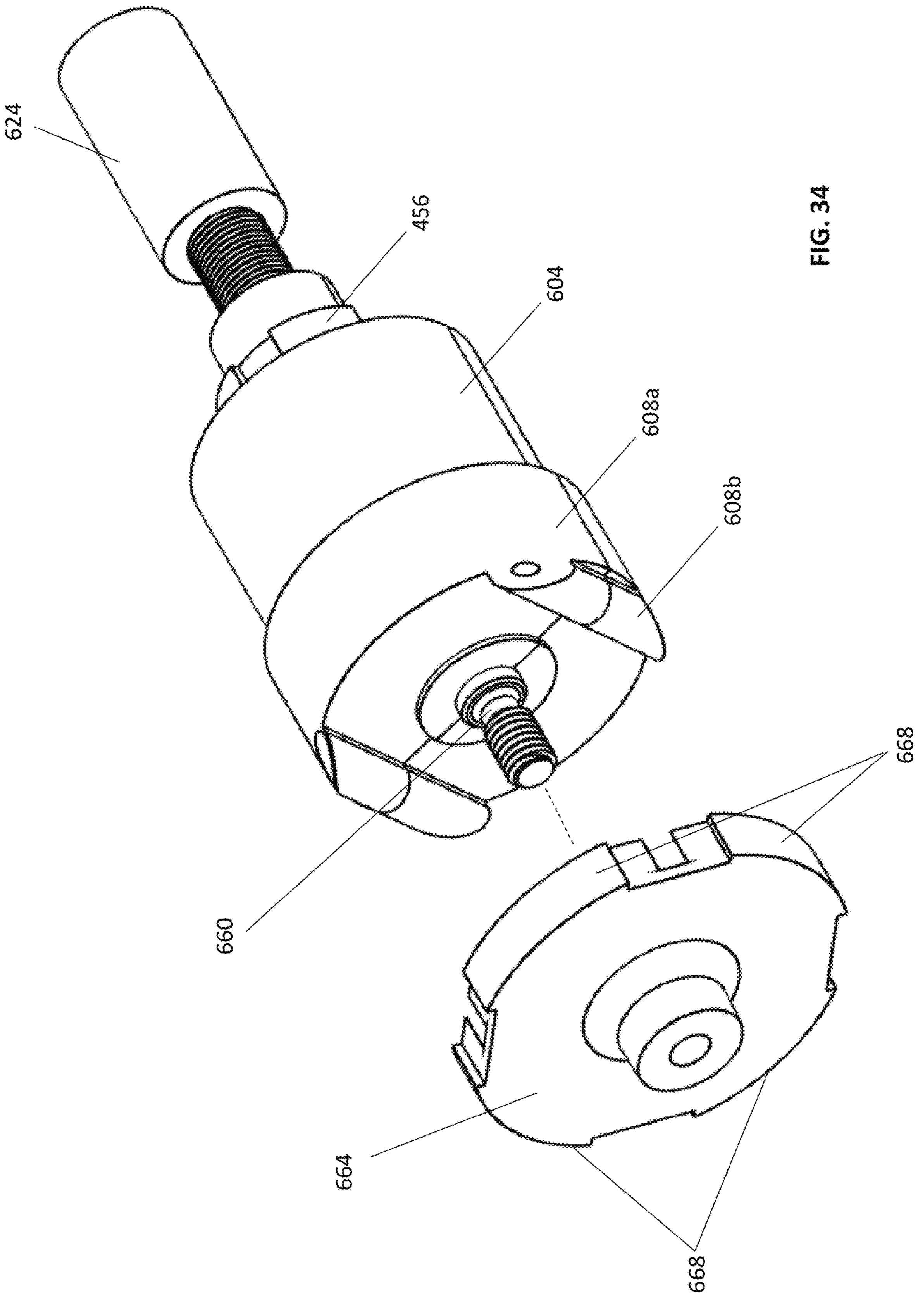
FIG. 34 is a partially exploded view of the brake assembly of FIG. 33, with the plunger, idler housing, and biasing member removed for clarity.
Figure 35:
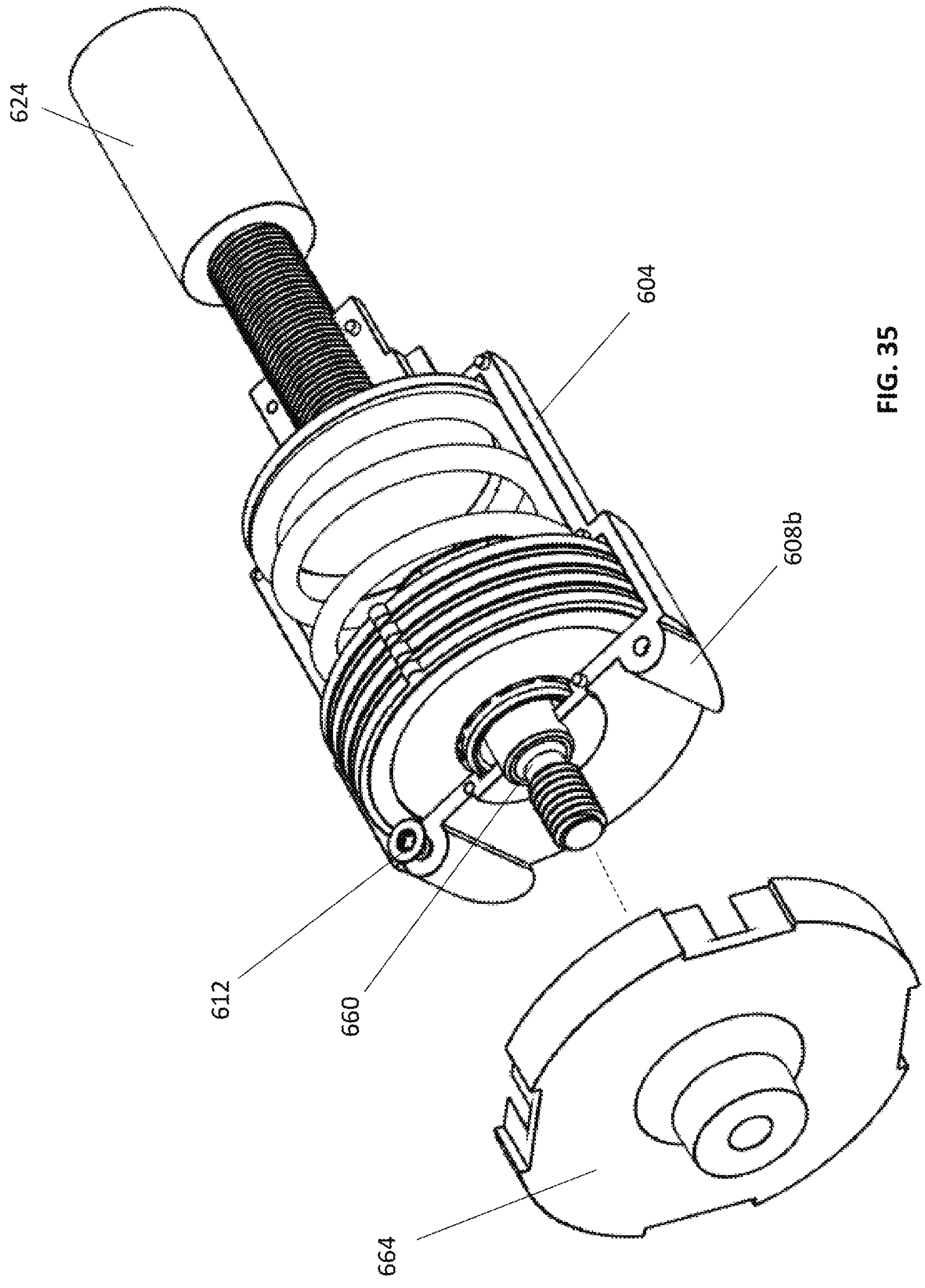
FIG. 35 is a partially exploded view of the brake assembly of FIG. 34, with a first shell portion removed for clarity.
Figure 36:
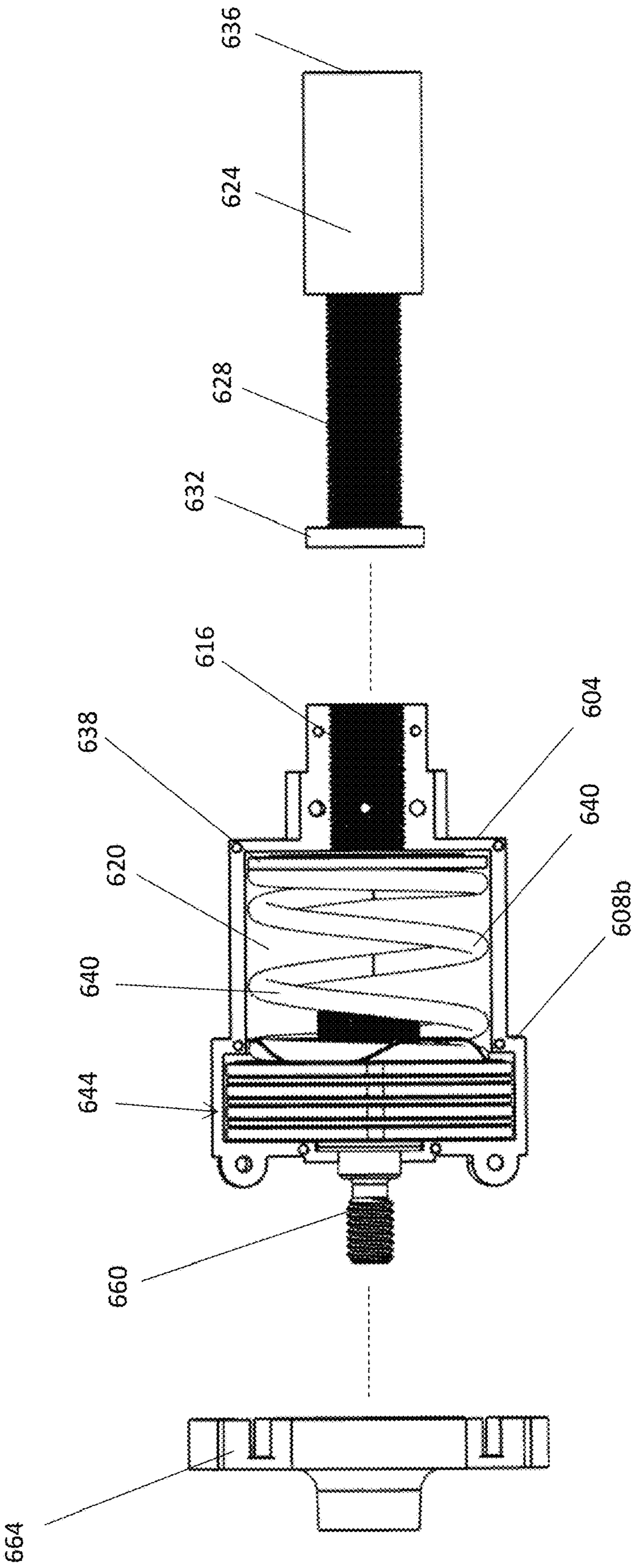
FIG. 36 is a plan view of the brake assembly of FIG. 35, with the set screw detached from the brake housing.

Referring back to FIGS. 32-36, a portion of the brake shaft 660 extends out of the brake housing 604. The brake shaft 660 couples to a brake cap 664. The brake cap 664 is configured to engage the roller tube 204. With reference to FIG. 34, the brake cap 664 defines a plurality of projections 668 (or members 668). The projections 668 are positioned around an outer circumference of the brake cap 664. The projections 668 are configured to engage corresponding engagement zones 240 within the roller tube 204. More specifically, each projection 668 is configured to engage a corresponding first engagement zone 240*a*. This facilitates a rotatable connection between the roller tube 204 and the brake cap 664, such that they rotate together.

With reference now to FIGS. 33 and 39, the set screw 624 is received by the idler housing 308. More specifically, the set screw 624 is received by the internal channel 334 defined by the idler housing 308. In addition, the set screw 624 is received by the internal channel 222 of the plunger 220. The set screw 624 also carries the biasing member 338 of the plunger 220.

With reference just to FIG. 39, the set screw 624 is configured to be accessed through the access aperture 223. This facilitates selective adjustment of the braking force (or brake tension) applied to the roller tube 204 to accommodate fine tuning of the brake without removal of components. More specifically, a user can insert a tool (e.g., an Allen wrench, a screwdriver, a customized tool, etc.) through the access aperture 223 and into the internal channel 222. The tool is configured to engage the screw head 636 of the set screw 624. The tool can then be rotated in a first direction to increase the braking force, or in a second direction to decrease the braking force.

In response to rotating the tool in the first direction, the set screw 624 responsively rotates in the first direction. As the set screw 624 rotates, the threaded portion 628 of the set screw 624 laterally traverses the threaded portion 616 of the shell portions 608. In response, the bearing surface 632 travels into the brake containment portion 620, and towards the braking surfaces 644. This slides the adjustment member 638 into the brake containment portion 620, and towards the braking surfaces 644. The adjustment member 638 compresses the biasing member 640. The biasing member 640 responsively applies a biasing force to the braking surfaces 644. More specifically, the biasing member 640 applies the biasing force to the alternating first washers 648 and second washers 652. Compressing the washers 648, 652 together increases the braking force (or braking tension) applied to the bearing 656, and in turn to the brake shaft 660 and brake cap 664. The increased braking force is transferred from the brake cap 664 to the roller tube 204.

In response to rotating the tool in the second direction, the set screw 624 responsively rotates in the second direction. As the set screw 624 rotates, the threaded portion 628 of the set screw 624 laterally traverses the threaded portion 616 of the shell portions 608. In response, the bearing surface 632 travels outward from the brake containment portion 620, and away from the braking surfaces 644. This slides the adjustment member 638 outward from the brake containment portion 620, and away from the braking surfaces 644. The adjustment member 638 decompresses the biasing member 640. The biasing member 640 responsively lessens the biasing force applied to the braking surfaces 644. More specifically, the biasing member 640 reduces the biasing force to the alternating first washers 648 and second washers 652. Relieving compression (or decompressing) the washers 648, 652 decreases the braking force (or braking tension) applied to the bearing 656, and in turn to the brake shaft 660 and brake cap 664. The reduced braking force is transferred from the brake cap 664 to the roller tube 204.

Figure 30:
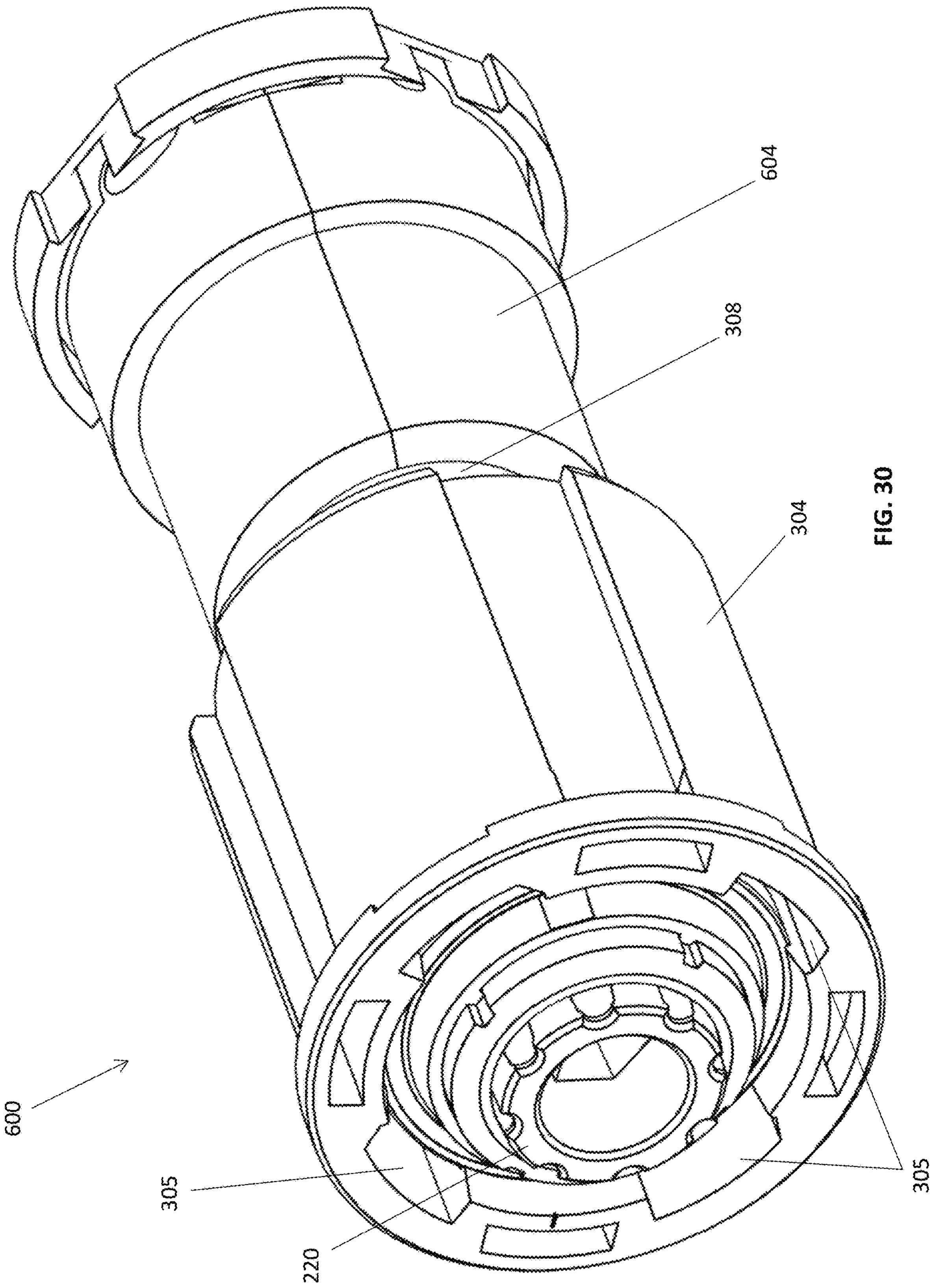
FIG. 30 is a perspective view of a first end of a brake assembly associated with the roller shade assembly of FIG. 1.
Figure 31:
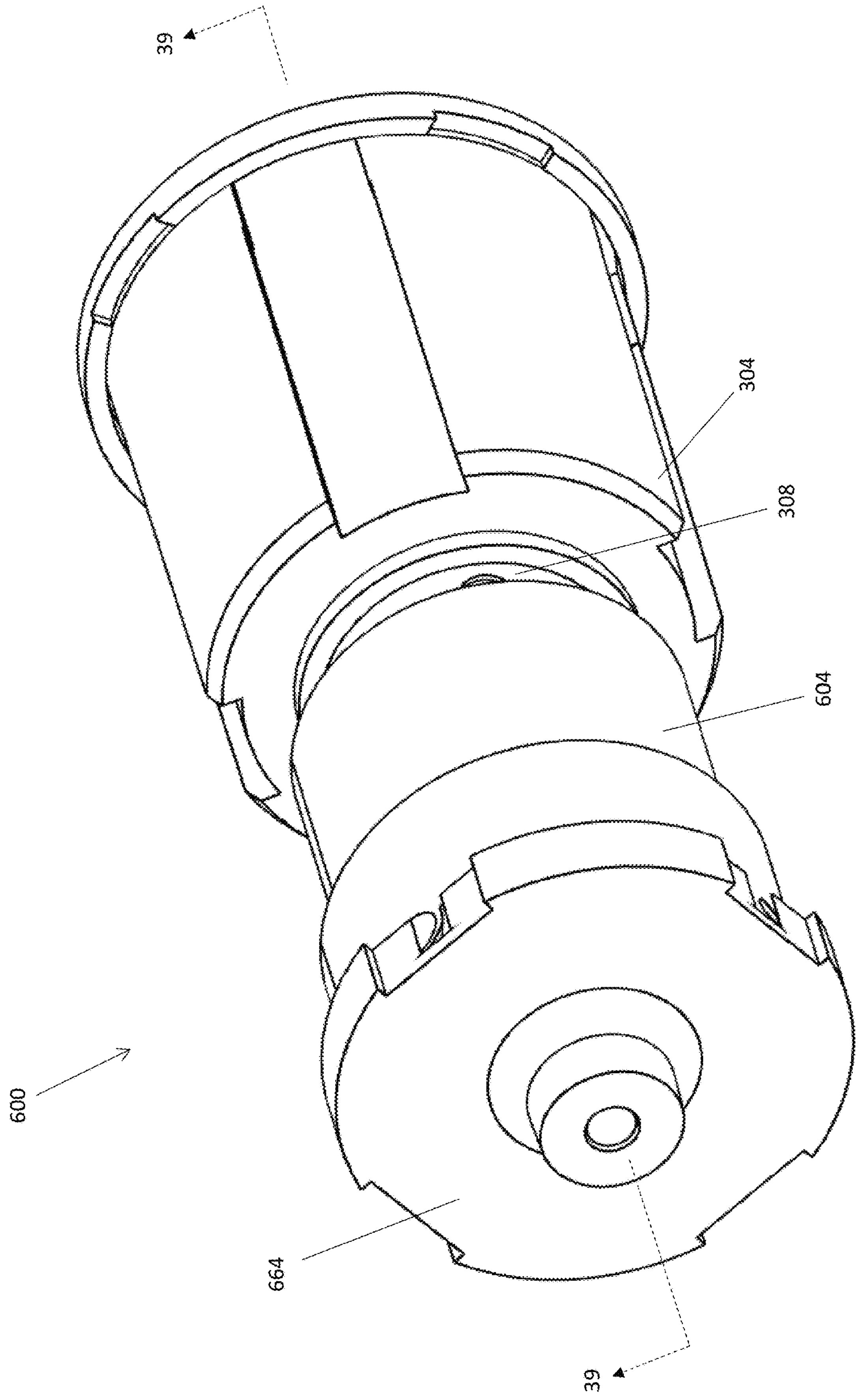
FIG. 31 is a perspective view of a second end, opposite the first end, of the brake assembly of FIG. 30.
Figure 32:
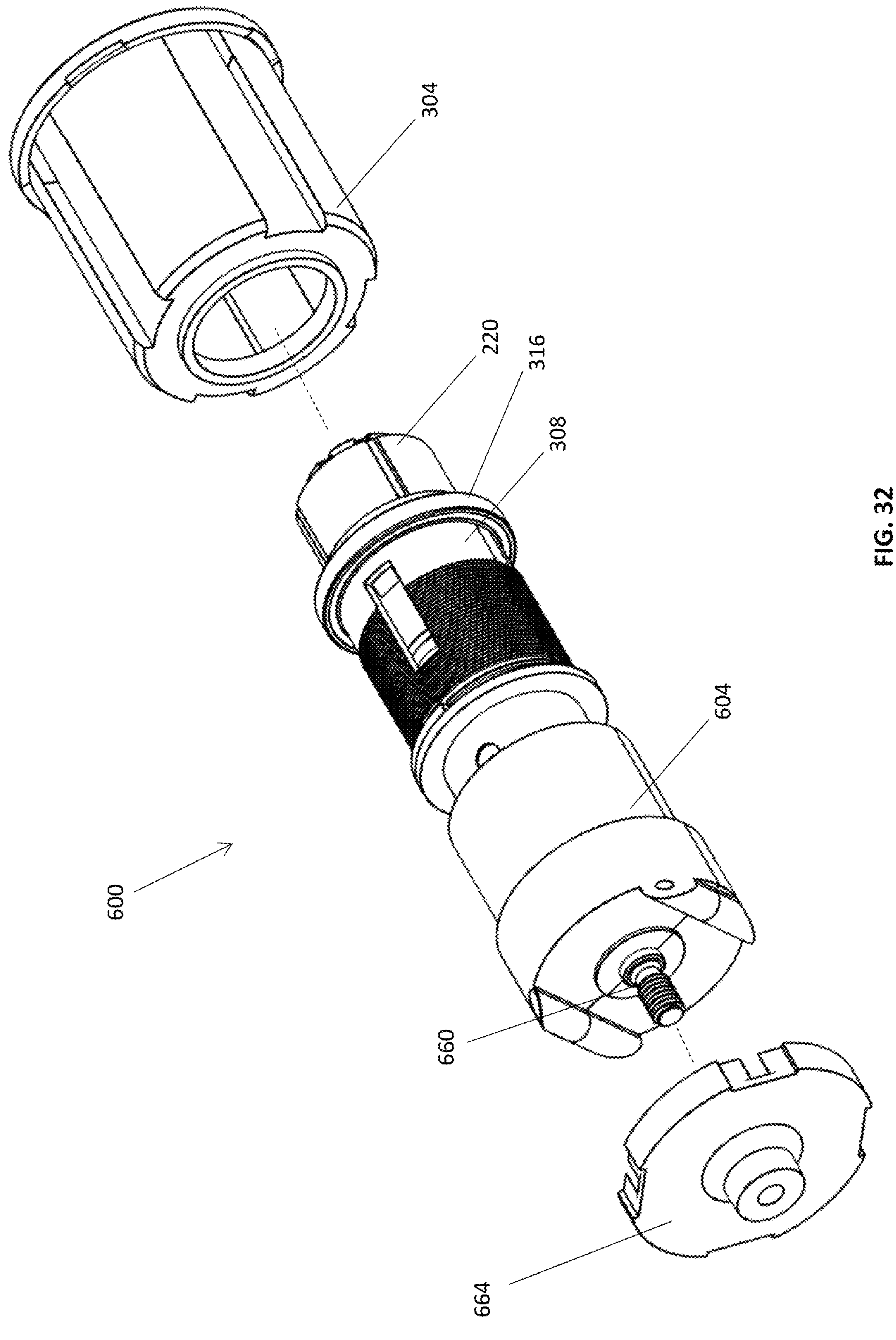
FIG. 32 is a partially exploded view of the brake assembly of FIG. 30.
Figure 40:
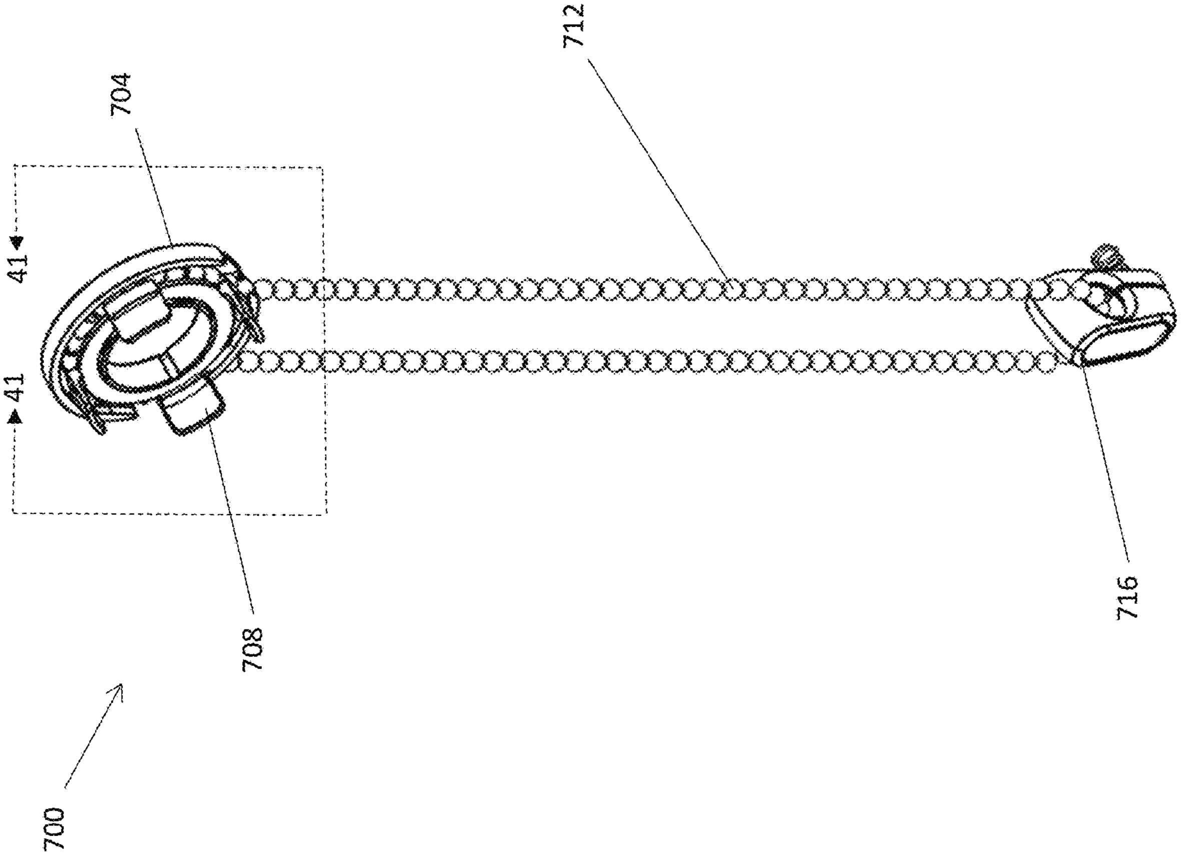
FIG. 40 is a perspective view of a clutch assembly configured to drive the roller tube assembly of FIG. 2.
Figure 41:
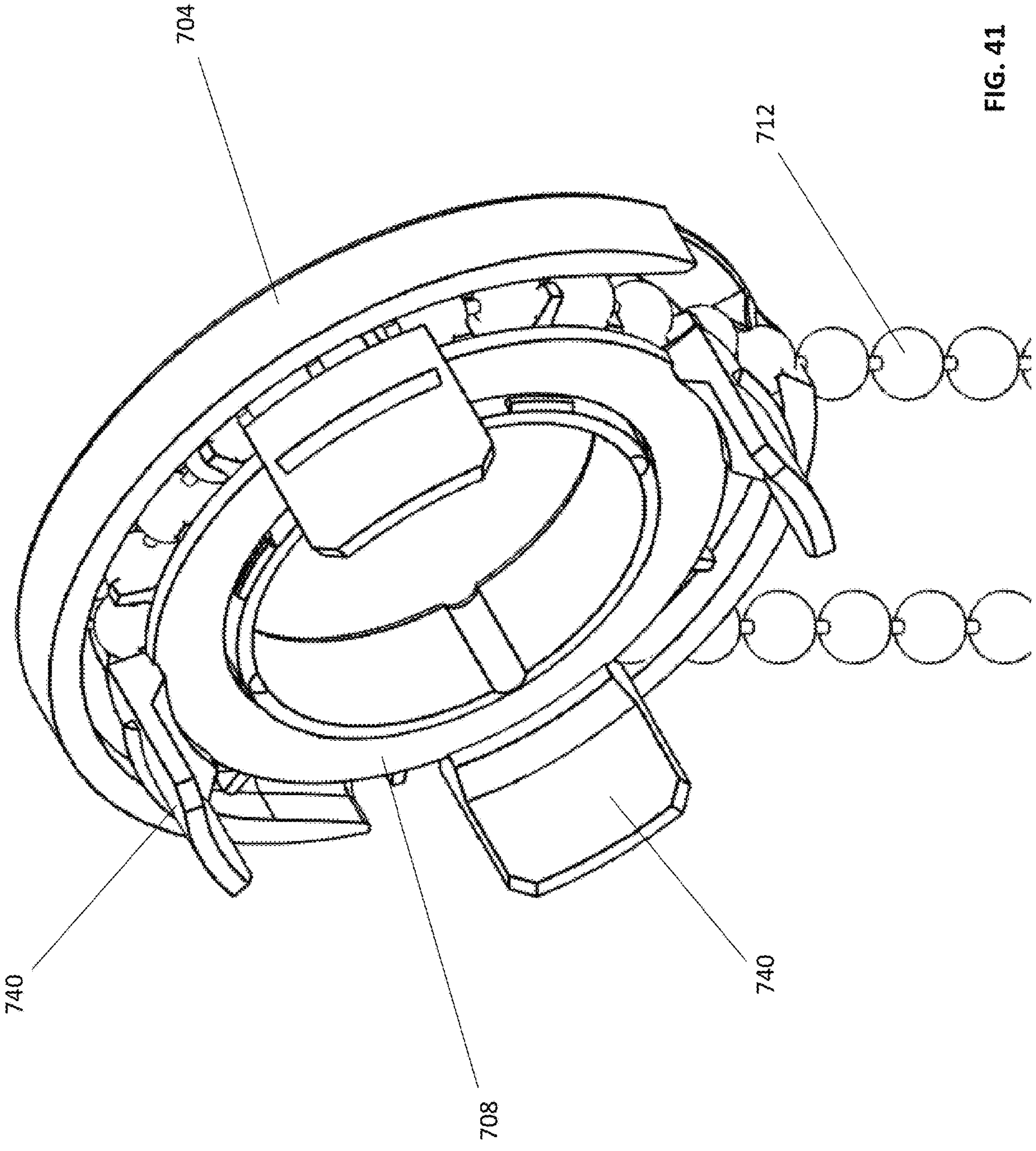
FIG. 41 is an enhanced perspective view of a portion of the clutch assembly of FIG. 40, taken along line 41-41 of FIG. 40 and illustrating a clutch housing, a clutch sprocket, and a continuous looped operator.
Figure 42:
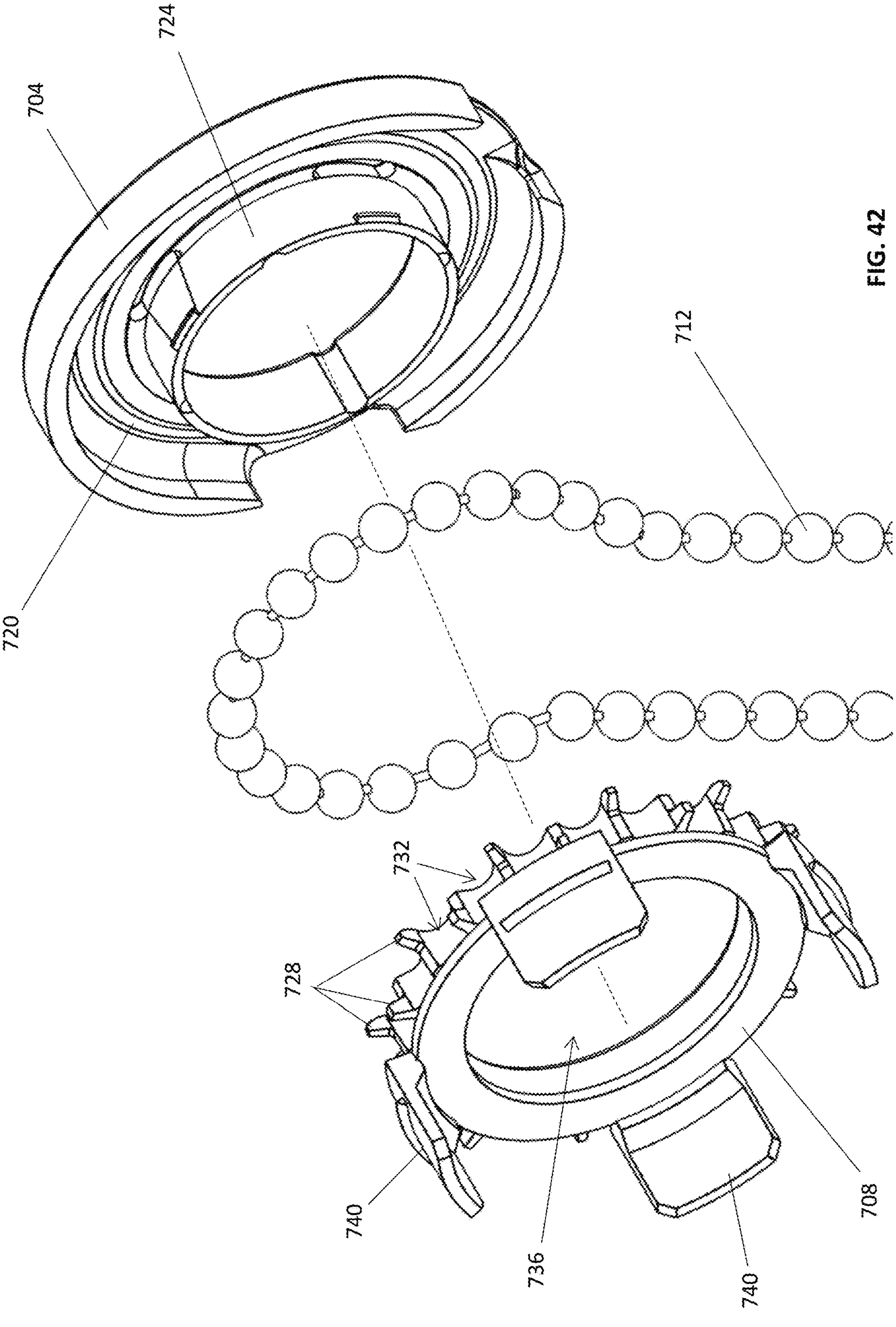
FIG. 42 is an exploded view of the portion of the clutch assembly of FIG. 41.
Figure 43:
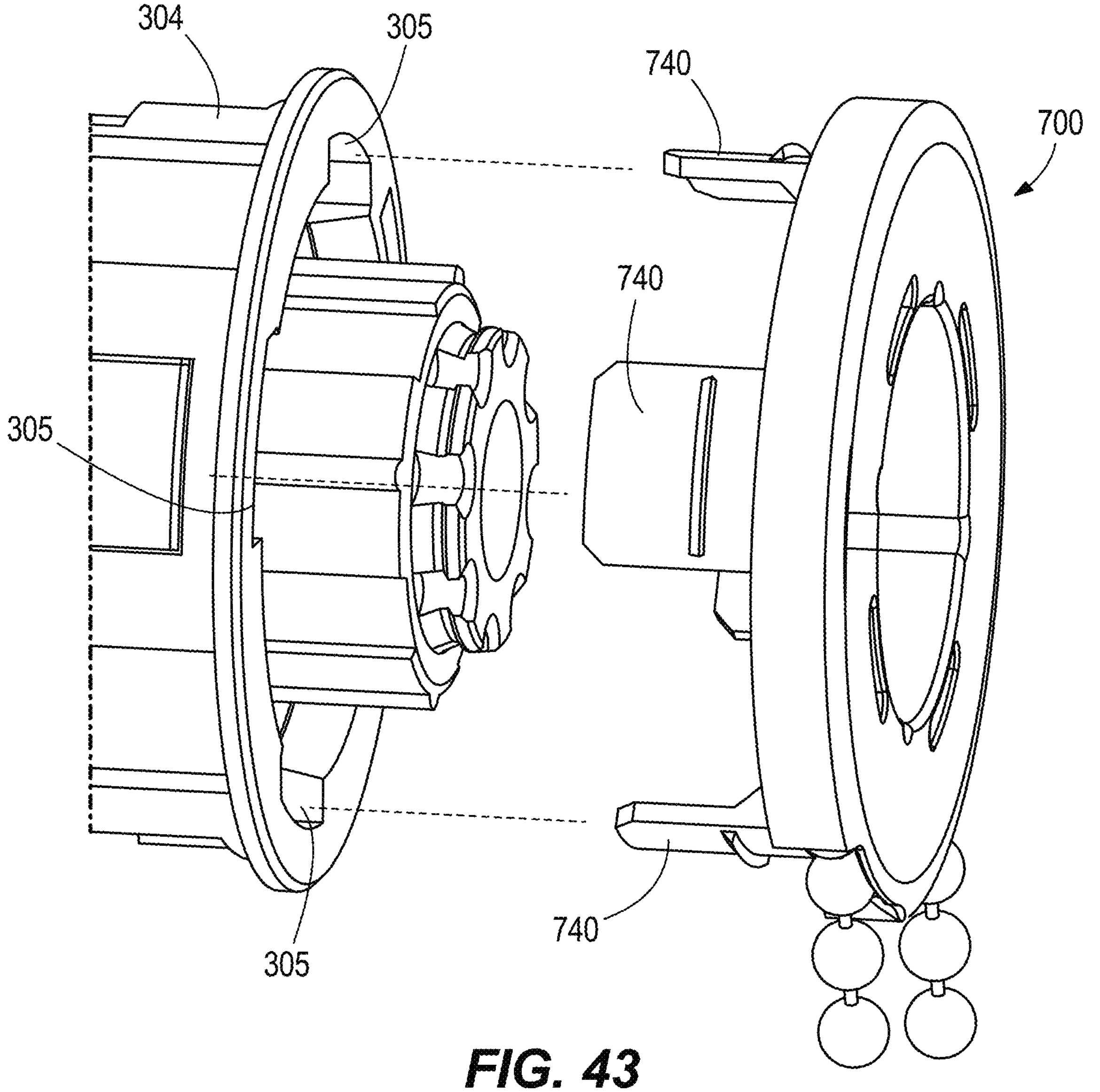
FIG. 43 is a perspective view of the clutch assembly of FIG. 40 being aligned for engagement with an idler member of the idler assembly or the brake assembly shown in FIG. 7.

With reference now to FIGS. 40-42, a clutch assembly 700 for driving the roller tube assembly 200 is illustrated. With reference to FIG. 40, the clutch assembly 700 includes a clutch housing 704, a clutch sprocket 708, a continuous looped operator 712, and a hold-down device 716. As illustrated in FIG. 42, the clutch housing 704 (or clutch bail 704) defines a channel 720 that surrounds a collar 724. The clutch sprocket 708 is configured to engage the clutch housing 704 and rotates relative to the collar 724. The clutch sprocket 708 includes plurality of radial projections 728 that define a plurality of pockets 732. Each pocket 732 is configured to selectively receive a portion of the continuous looped operator 712. In the illustrated embodiment, the continuous looped operator 712 is shown as a bead chain 712, with each pocket 732 selectively receiving one of the beads that define the bead chain 712. An aperture 736 is defined by the sprocket 708. The aperture 736 receives the collar 724 to facilitate a rotational connection between the clutch sprocket 708 and the clutch housing 704. More specifically, the clutch sprocket 708 is configured to rotate relative to the clutch housing 704. The clutch sprocket 708 also defines a plurality of mounting clips 740. As shown in FIGS. 41-42, the mounting clips 740 are positioned around the aperture 736 and are configured to engage a portion of the idler member 304. More specifically, the mounting clips 740 are configured to be selectively received by mounting slots 305, shown in FIG. 43. As illustrated in FIGS. 9 and 30, a plurality of mounting slots 305 are defined by the idler member 304 and extend around the plunger 220. The idle remember 304 associated with both the idler assembly 300 and the brake assembly 600 incorporate mounting slots 305. As such, the clutch assembly 700 can be mounted (or attached) to either end of the roller tube assembly 200. Thus, the clutch assembly 700 advantageously incorporates a non-handed system of operation. In commercial clutches available on the market, the clutch mounts on either a left-hand side of the roller shade or a right-hand side of the roller shade. This is because commercially available clutches rotate in different directions to facilitate operation of the roller shade based on the end of attachment. The clutch assembly 700 is configured for operation at either a left-hand side or right-hand side of the roller tube assembly 200 (i.e., the clutch assembly 700 is non-handed, meaning it is not limited to either left-handed or right-handed operation). The clutch assembly 700 simply needs to be placed into engagement with the idler member 304 on either end of the roller tube assembly 200 (the first end 208 of the roller tube 204, or the second end 212 of the roller tube 204) and the clutch assembly 700 is configured for operation.

Figure 44:
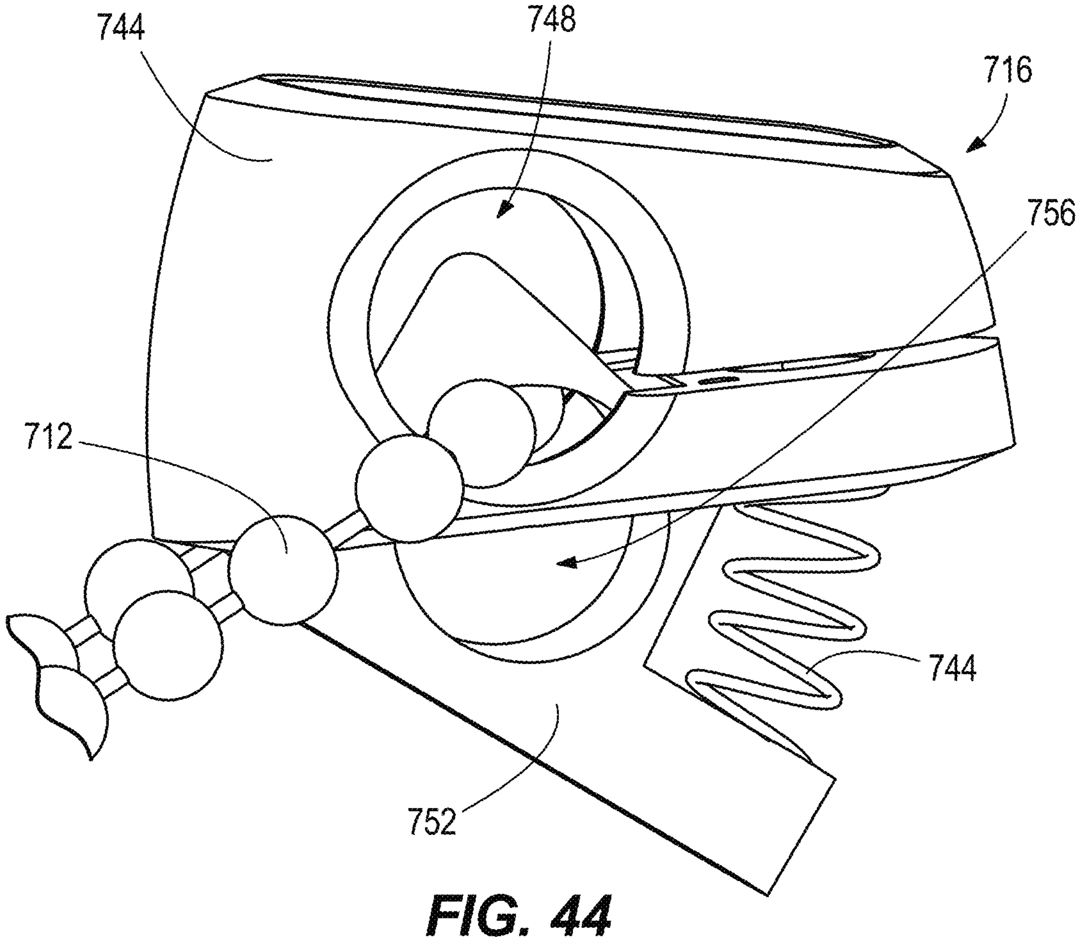
FIG. 44 is a perspective view of a hold down device of the clutch assembly of FIG. 40 shown in a first configuration where apertures are out of alignment and in engagement with a continuous looped operator.

Referring to FIGS. 40 and 44, the hold down device 716 is configured to selectively engage the continuous looped operator 712. With specific reference to FIGS. 44-45, the hold down device 716 includes a first member 744 that defines a first aperture 748, and a second member 752 that defines a second aperture 756. The second member 752 is received by the first member 744. A biasing member 760 is connected at one end to the first member 744 and at an opposite end to the second member 752 (shown in FIG. 44).

FIG. 44 illustrates the hold down device 716 in a first configuration. In this configuration, the apertures 748, 756 of the hold down device 716 are not in alignment. This is in response to the biasing member 760 biasing the second member 752 relative to the first member 744, positioning the apertures 748, 756 out of alignment. The apertures 748, 756 capture the continuous looped operator 712, meaning the continuous looped operator 712 is not free to move through the apertures 748, 756.

Figure 45:
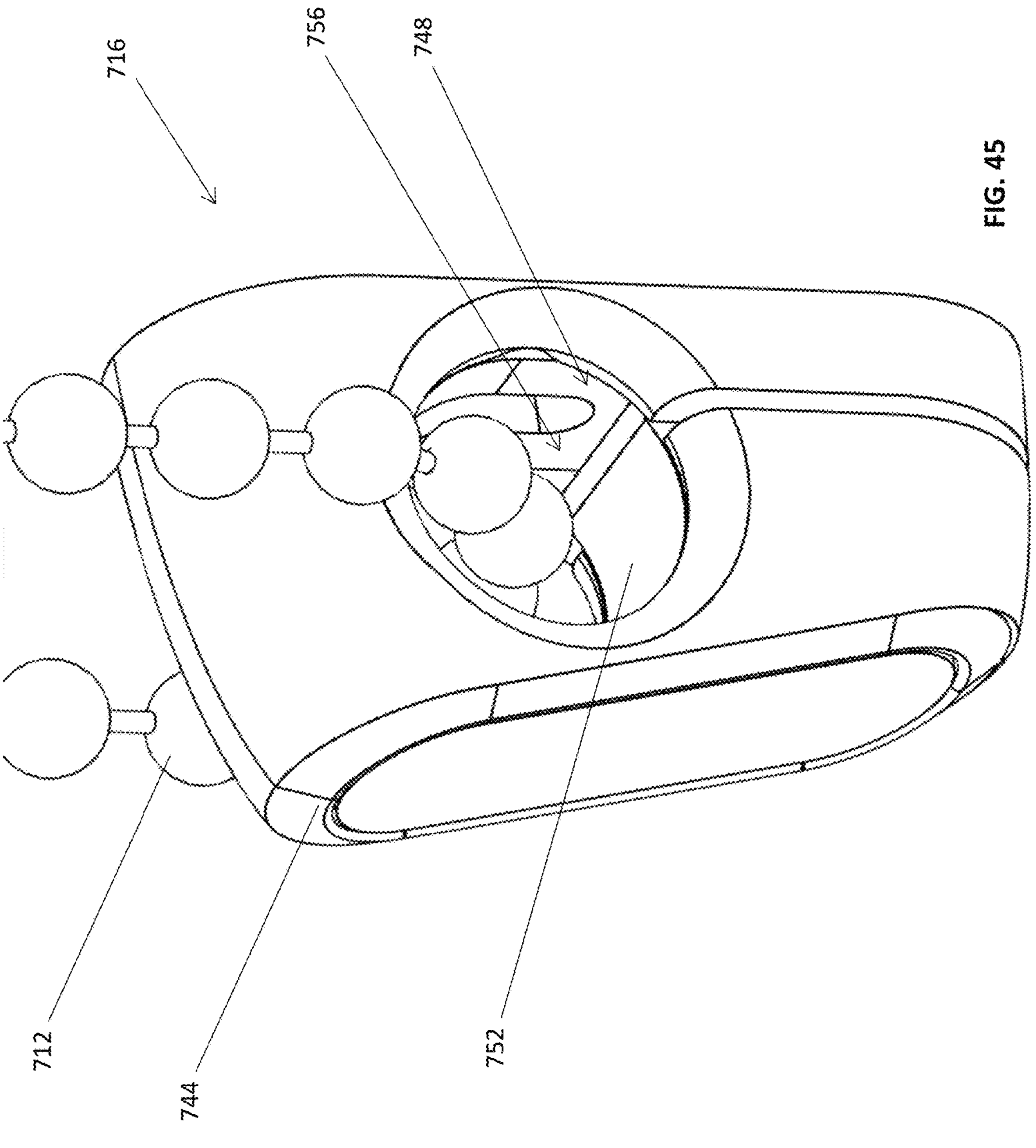
FIG. 45 is a perspective view of the hold down device of the clutch assembly of FIG. 40 shown in a second configuration where apertures are in alignment to facilitate operation of the continuous looped operator.

FIG. 45 illustrates the hold down device 716 in a second configuration. In this configuration, the apertures 748, 756 of the hold down device 716 are in alignment. This is in response to the bias being applied by the biasing member 760 being overcome, positioning the apertures 748, 756 into alignment. The apertures 748, 756 do not capture the continuous looped operator 712, meaning the continuous looped operator 712 is free to move through the apertures 748, 756. The bias can be overcome by mounting the hold down device 716 to a surface, such as a wall or other structure near the architectural opening associated with the roller shade assembly 100.

The hold down device 716 is configured to be mounted to a surface to facilitate operation in the second configuration. To facilitate mounting, the hold down device 716 will travel with the continuous looped operator 712 when in the first configuration. Eventually the hold down device 716 will contact the clutch housing 704 and/or clutch sprocket 708, which restricts further movement of the continuous looped operator 712. This interferes with proper operation of the clutch assembly 700, and associated roller tube assembly 200. Proper mounting of the hold down device 716 can also reduce the risk of potential hazards posed by a continuous looped operator 712 (e.g., tripping hazard, strangulation from free-standing loops, etc.). In other embodiments, the hold down device 716 can be any of the hold down devices disclosed in U.S. Pat. No. 9,663,988 entitled "Hold Down Device for Window Covering Looped Operator," and U.S. Pat. No. 10,415,304 entitled "Hold Down Device for Window Covering Looped Operator," the contents of each patent is hereby incorporated by reference in its entirety.

Figure 46:
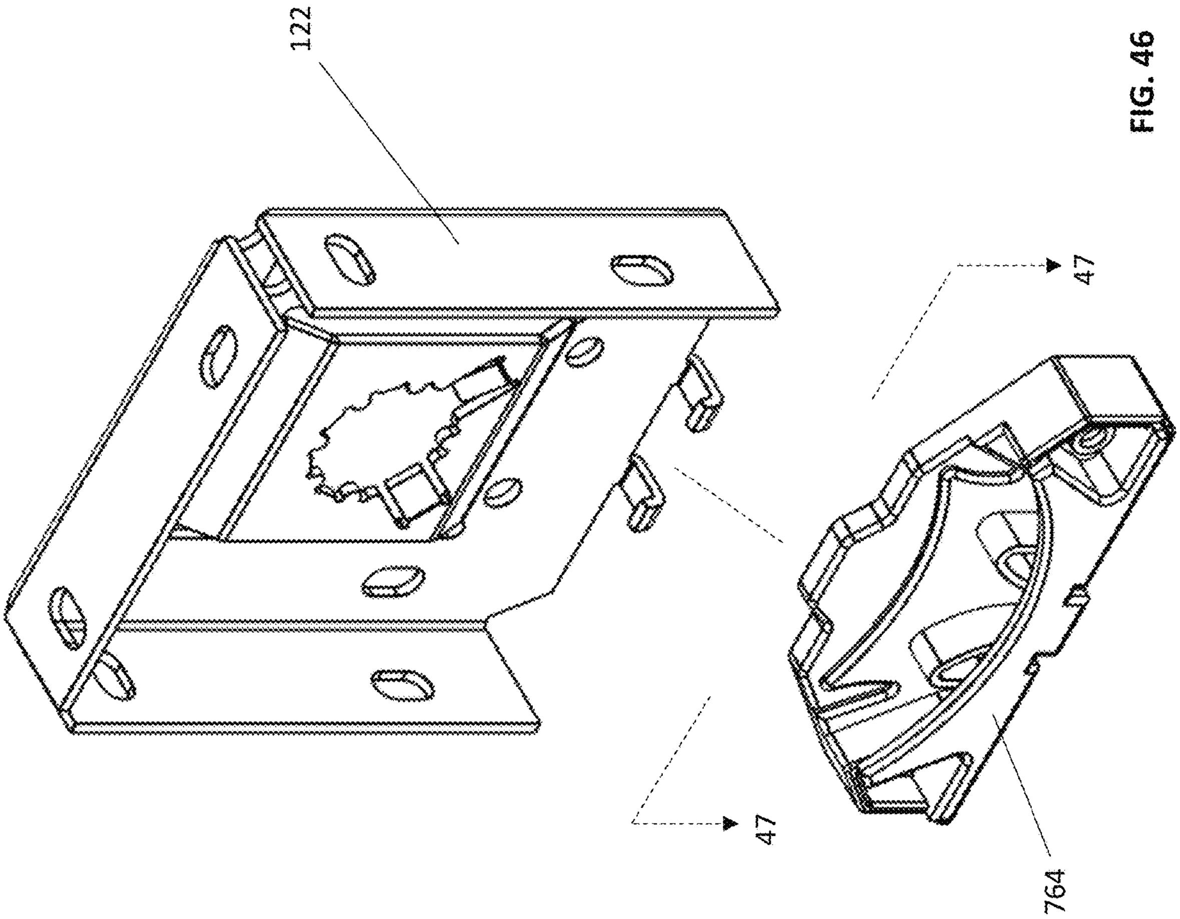
FIG. 46 is a perspective view of a chain diverter for use with the clutch assembly of FIG. 40, shown detached from a bracket member of FIG. 2.
Figure 47:
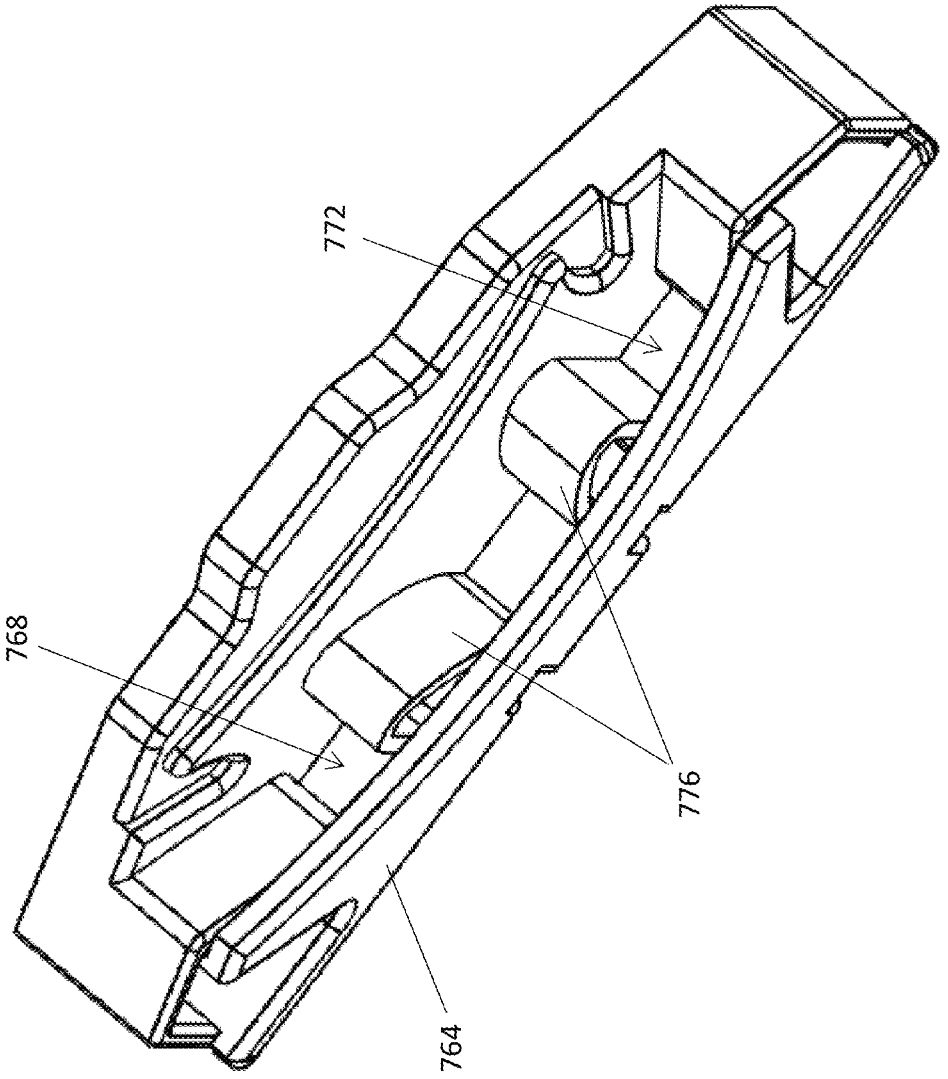
FIG. 47 is a perspective view of the chain diverter of FIG. 46, taken along line 47-47 of FIG. 46.

FIGS. 46-47 illustrate an embodiment of a chain diverter 764 for use with the clutch assembly 700. With reference to FIG. 46, the chain diverter 764 is configured to attach (or couple) to the bracket member 122. Preferably, the chain diverter 764 couples to the bracket member 122 associated with the end 208, 212 of the roller tube 204 where the clutch assembly 700 is attached. The chain diverter 764 defines a first slot 768 and a second slot 772. A spacer member 776 is positioned between the first and second slots 768, 772. Each slot 768, 772 is configured to receive one of two portions of the continuous looped operator 712. The spacer member 776, along with the spaced slots 768, 772 maintain separation of the two portions of the continuous looped operator 712. This facilitates separation of the two portions, and limits risk of undesired twisting or entanglement that can block proper operation of the continuous looped operator 712. The chain diverter 764 is positioned between the clutch housing 704 and the hold down device 716, and preferably closer to the clutch housing 704 than the hold down device 716.

In operation of the roller shade assembly 100, the roller tube assembly 200 is selectively mounted to the bracket assembly 120. In addition, the covering 216 is coupled to the roller tube 204. In a first operational configuration, the covering material 216 is unwound (or uncoiled) from the roller tube 204. This lowers the covering material 216 relative to the architectural opening. A user actuates the continuous looped operator 712 in a first direction, which in response rotates the clutch sprocket 708 relative to the clutch housing 704. The clutch sprocket 708 in turn rotates the idler member 304 to which it is connected.

In one embodiment, where the clutch assembly 700 is coupled to the idler member 304 of the idler assembly 300 (or at the first end 208 of the roller tube 204), rotation of the clutch sprocket 708 responsively rotates the idler member 304 of the idler assembly 300. The idler member 304 rotates relative to the idler housing 308, and in turn rotates the roller tube 204. As the roller tube 204 rotates, the idler member 304 of the brake assembly 600 responsively rotates. More specifically, the idler member 304 rotates relative to the idler housing 308 of the brake assembly 600.

In another embodiment, where the clutch assembly 700 is coupled to the idler member 304 of the brake assembly 600 (or at the second end 212 of the roller tube 204), rotation of the clutch sprocket 708 responsively rotates the idler member 304 of the brake assembly 600. The idler member 304 rotates relative to the idler housing 308, and in turn rotates the roller tube 204. As the roller tube 204 rotates, the idler member 304 of the idler assembly 300 responsively rotates. More specifically, the idler member 304 rotates relative to the idler housing 308 of the brake assembly idler assembly 300.

As the roller tube 204 rotates in response to the idler member 304 that is driven by the clutch assembly 700, the timing ring 312 responsively rotates. In the embodiment of the idler assembly 300 where the timing ring 312 is engaged with the roller tube 204, rotation of the roller tube 204 responsively rotates the timing ring 312. In the embodiment of the idler assembly **300*a* where the timing ring 312*a* is engaged with the idler member 304*a*, rotation of the idler member 304*a* (in response to either rotation of the roller tube 204, or rotation from the clutch assembly 700) responsively rotates the timing ring 312*a*. As the timing ring 312, 312*a* rotates relative to the idler housing 308, the timing ring 312, 312*a* traverses the idler housing 308. The timing ring 312, 312*a* traverses the idler housing 308 in response to the timing ring thread 328 traveling across the thread 324 of the idler housing 308. The timing ring 312, 312*a* traverses the idler housing 308 until the covering 216 is sufficiently (or entirely) unwound from the roller tube 204 (where the timing ring 312, 312*a* traverses in a direction away from the second stop member 336), or until the first stop member 332 engages, or otherwise contacts, the second stop member 336 (where the timing ring 312, 312*a* traverses in a direction towards the second stop member 336**).

Further, as the roller tube 204 rotates in response to the idler member 304 that is driven by the clutch assembly 700, the spring drive 408 responsively rotates. As the spring drive 408 rotates, the drive shaft 488 also rotates. Rotation of the drive shaft 488 in turn rotates a connected shaft 420 of the spring assembly 404. As the shaft 420 rotates relative to the spring assembly 404, the biasing member 424 applies a biasing force to the shaft 420. This power spring biasing force applies tension back to the roller tube 204 to assist with holding a selected position of the covering 216 relative to the architectural opening. As discussed above, in other embodiments, a plurality of spring assemblies 404 can be connected in parallel, in series, or in both parallel and series. Operation of the plurality of spring assemblies 404 connected in parallel, in series, or in both parallel and series occurs as discussed above.

In addition, as the roller tube 204 rotates in response to the idler member 304 that is driven by the clutch assembly 700, the brake cap 664 responsively rotates. As the brake cap 664 rotates, the brake shaft 660 responsively rotates. As the brake shaft 660 rotates, it rotates relative to the one-way bearing 656. Generally, the direction of rotation of the brake shaft 660 associated with the covering material 216 unwinding from the roller tube 204 is the direction of torque transmission by the one-way bearing 656 to the brake shaft 660. Accordingly, when covering material 216 is unwound from the roller tube 204 to a desired position relative to the architectural opening, the braking force generated by the braking surfaces 644 is transmitted to the brake shaft 660 through the one-way bearing 656. The braking force is further communicated from the brake shaft 660 to the roller tube 204 through the brake cap 664 to limit the covering material 216 from "creep down" or unintended drop (or unintentionally unwinding further from the roller tube 204 without user interaction with the clutch assembly 700).

In a second operational configuration, the covering material 216 is wound (or coiled) onto the roller tube 204. This raises the covering material 216 relative to the architectural opening. A user actuates the continuous looped operator 712 in a second direction, which in response rotates the clutch sprocket 708 relative to the clutch housing 704. The clutch sprocket 708 in turn rotates the idler member 304 to which it is connected. Rotation of the clutch sprocket 708 and idler member 304 is substantially the same as described above in association with unwinding the covering material 216 from the roller tube 204, only that the clutch sprocket 708, the idler member 304, and the roller tube 204 rotate in the opposite direction.

As the roller tube 204 rotates in response to the idler member 304 that is driven by the clutch assembly 700, the timing ring 312, **312*a* responsively rotates. As the timing ring 312, 312*a* rotates relative to the idler housing 308, the timing ring 312, 312*a* traverses the idler housing 308. The timing ring 312, 312*a* traverses the idler housing 308 until the covering 216 is sufficiently (or entirely) wound onto the roller tube 204 (where the timing ring 312, 312***a* traverses in a direction away from the second stop member 336), or until the first stop member 332 engages, or otherwise contacts, the second stop member 336 (where the timing ring 312, 312*a* traverses in a direction towards the second stop member 336). In the illustrated embodiment, the timing ring 213, 312*a* traverses the idler housing 308 towards the second stop member 336 while the covering material 216 is wound (or coiled) onto the roller tube 204. This prevents a hem bar (or other end structure) of the covering material 216 from being raised too far (or wound onto the roller tube 204 too far), as the contact between the first and second stop members 332, 336 restricts further rotation of the timing ring 312, 312*a*. This restriction to further rotation is then transferred to the roller tube 204 and idler members 304, and ultimately to the clutch assembly 700.

Further, as the roller tube 204 rotates in response to the idler member 304 that is driven by the clutch assembly 700, the spring drive 408 responsively rotates. Rotation of the spring drive 408 results in rotation of the drive shaft 488, and the connected shaft 420 of the spring assembly 404. As the shaft 420 rotates relative to the spring assembly 404, the biasing member 424 reduces the biasing force to the shaft 420. This power spring biasing force reduces the tension back to the roller tube 204.

In addition, as the roller tube 204 rotates in response to the idler member 304 that is driven by the clutch assembly 700, the brake cap 664 responsively rotates. As the brake cap 664 rotates, the brake shaft 660 responsively rotates. As the brake shaft 660 rotates, it rotates relative to the one-way bearing 656. Generally, the direction of rotation of the brake shaft 660 associated with the covering material 216 winding from the roller tube 204 is the direction of free rotation by the one-way bearing 656 to the brake shaft 660 (i.e., opposite the direction of torque transmission). Accordingly, the brake shaft 660 is free to rotate relative to the one-way bearing 656 to facilitate winding of the covering material 216 onto the roller tube 204 with minimal interference by the braking surfaces 644.

Figure 48:
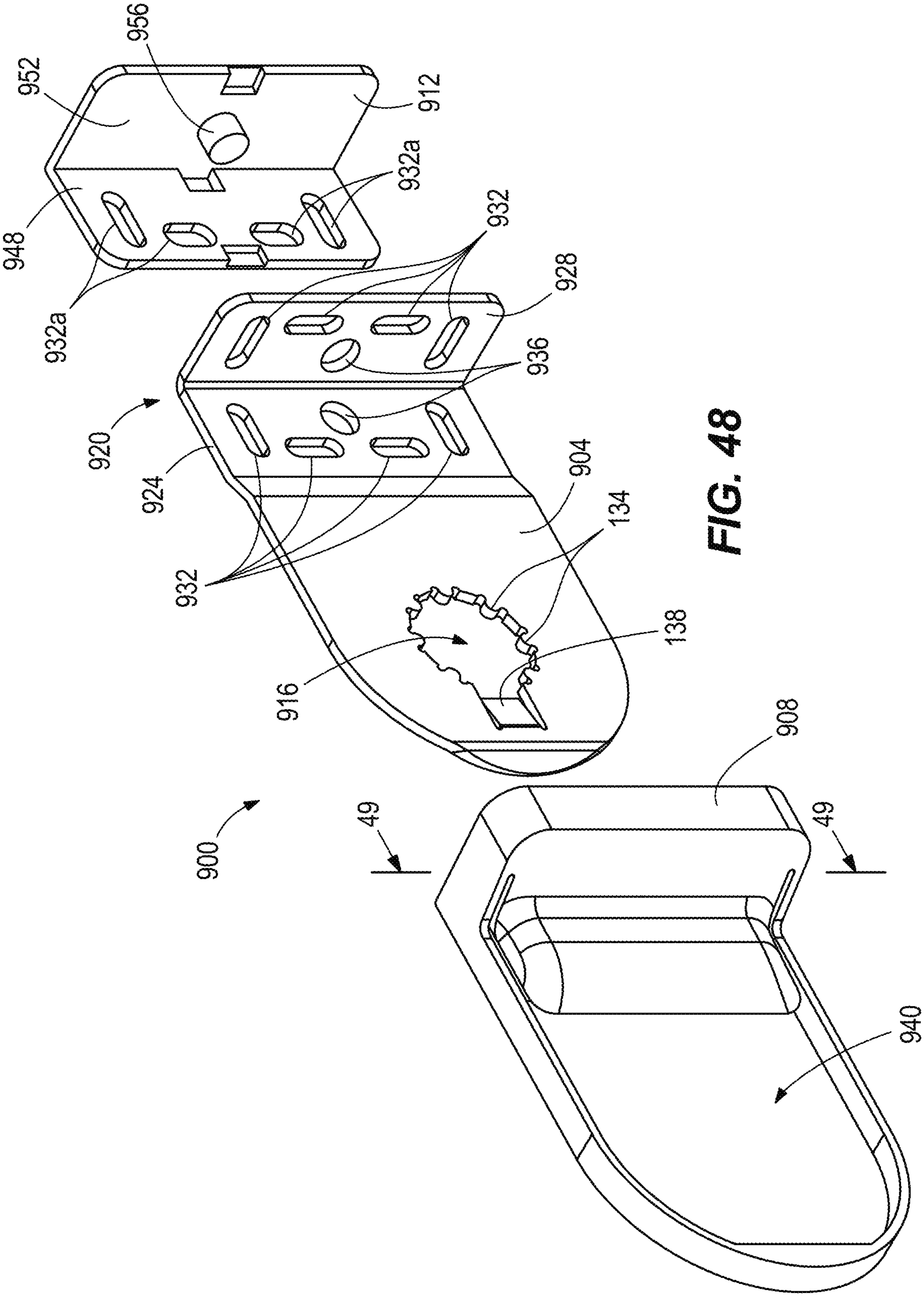
FIG. 48 is a perspective exploded view of an embodiment of a bracket assembly for use with the roller tube assembly of FIG. 4.
Figure 49:
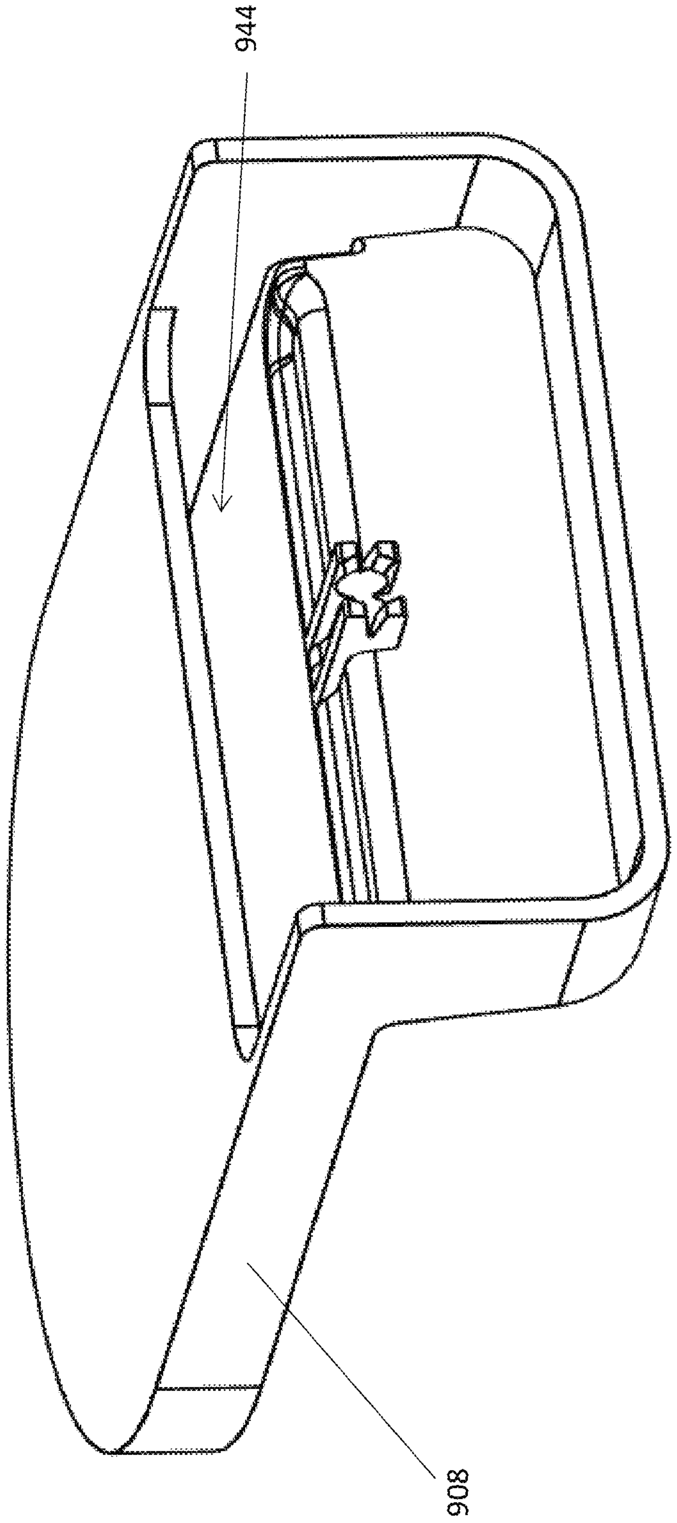
FIG. 49 is a perspective view of the first bracket cover of the bracket assembly of FIG. 48, taken along line 49-49 of FIG. 48.
Figure 50:
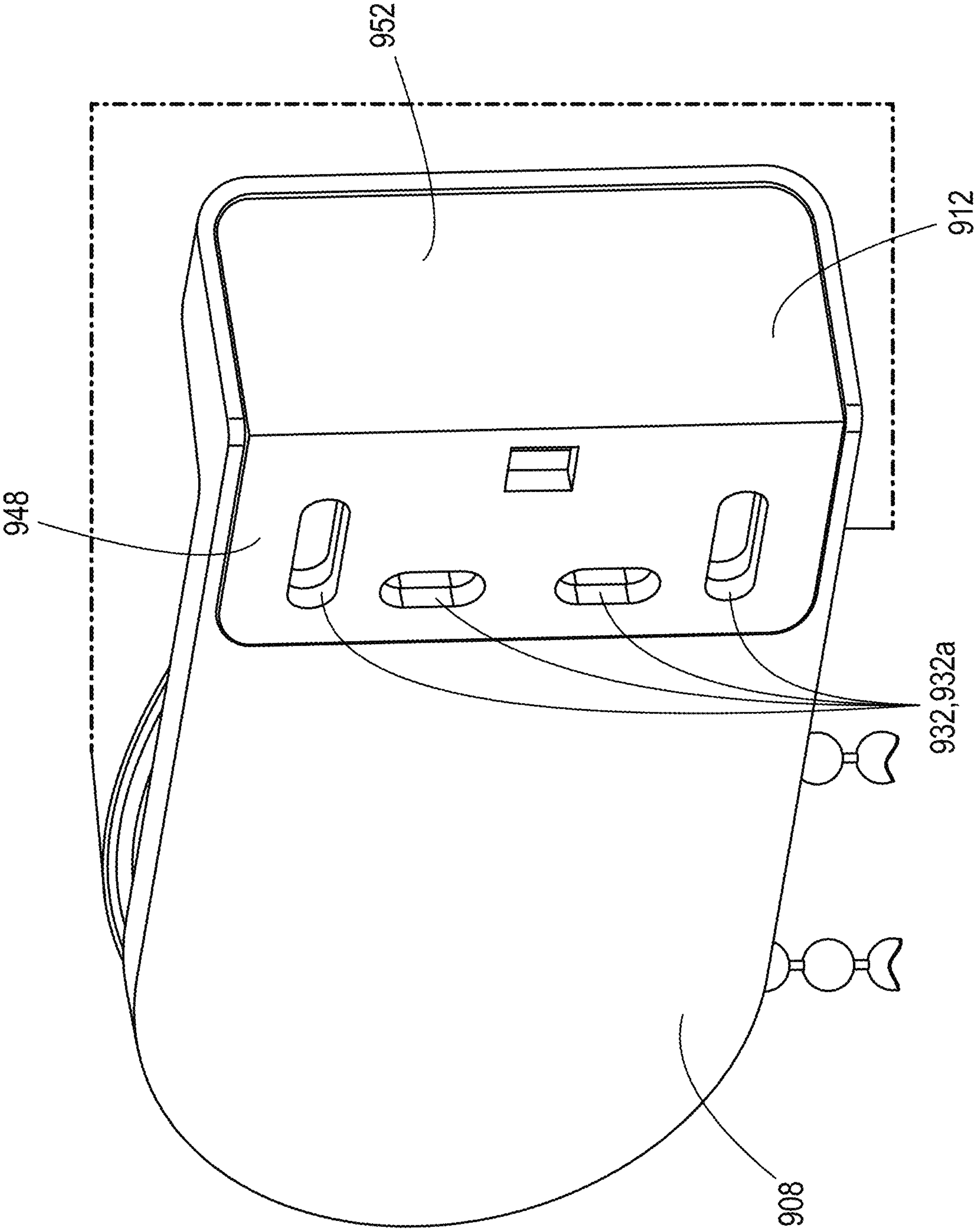
FIG. 50 is a perspective view of the bracket assembly of FIG. 48 in a first assembled configuration decoratively shielding a mounting bracket.

FIGS. 48-50 illustrate another example of an embodiment of a bracket assembly 900 for use with the roller tube assembly 200. It should be appreciated that the components of the bracket assembly 900 illustrated in FIG. 48 form one half of the bracket assembly 900. The components illustrated in FIG. 48 are configured to connect to one end of the roller tube assembly 200. A duplicate of the same components illustrated in FIG. 48 are configured to connect to the other end of the roller tube assembly 200. As such, the bracket assembly 900 includes two sets of the components shown in FIG. 48.

With reference to FIG. 48, the bracket assembly 900 includes a mounting bracket 904, a first bracket cover 908, and a second bracket cover 912. The mounting bracket 904 defines an aperture 916 and a mounting portion 920. The mounting portion 920 includes a first mounting surface 924 and a second mounting surface 928. The mounting surfaces 924, 928 are generally oriented orthogonal (or perpendicular) to each other. Each mounting surface 924, 928 defines a plurality of mounting apertures 932. The mounting apertures 932 are configured to receive an associated fastener (e.g., a screw, a nail, a bolt, etc.). The fastener is configured to selectively attach (or mount) each respective mounting bracket 904 relative to the architectural opening (e.g., to facilitate attachment within a perimeter of the architectural opening, outside of the perimeter of the architectural opening, to a window frame, to a wall or other structure outside of the window frame, etc.). Each mounting surface 924, 928 also includes at least one cover aperture 936.

The aperture 916 is configured to receive a plunger 220 of the roller tube assembly 200. The aperture 916 includes a plurality of radial members 134 (or radial fingers 134) that are positioned around a circumference of the aperture 916 and extend from the mounting bracket 904 into the aperture 916 (or protrude into the aperture 916). Each radial member 134 is spaced a distance apart from the adjacent radial member 134, forming a serrated (or sawtooth) profile. The aperture 916 also includes at least one projection 138. Each projection 138 can be actuated relative to the mounting bracket 904 (e.g., by a screwdriver or other device, etc.) to provide additional space to insert the plunger 220 into the aperture 916 (or remove the plunger 220 from the aperture 916).

In addition, the bracket assembly 900 includes a pair of mounting brackets 904 that are substantially identical. The mounting brackets 904 are oriented to face each other (i.e., one mounting bracket 904 is rotated one hundred and eighty degrees (180°) relative to the other mounting brackets 904, or one mounting brackets 904 is a mirror image of the other mounting brackets 904). The pair of mounting brackets 904 can be referred to as a first mounting brackets 904 and a second mounting brackets 904. The first mounting bracket 904 is configured to engage the plunger 220 received in the first end 208 of the roller tube 204, while the second mounting bracket 904 is configured to engage the plunger 220 received in the second end 212 of the roller tube 204.

The mounting bracket 904 is configured to be slidably received by the first bracket cover 908. The first bracket cover 908 defines a recess 940. With reference to FIG. 49, the first bracket cover 908 also defines a slot 944 that leads to the recess 940. The mounting bracket 904 is inserted (or received) by the slot 944 such that the portion of the mounting bracket 904 with the aperture 916 is positioned in the recess 940.

The second bracket cover 912 is configured to selectively engage the mounting portion 920 of the mounting bracket 904. The second bracket cover 912 includes a first face 948 and a second face 952. The faces 948, 952 are generally oriented orthogonal (or perpendicular) to each other. Further, the faces 948, 952 are oriented to have a complimentary geometry to the mounting surfaces 924, 928. The first face 948 defines a plurality of mounting apertures 932*a* that are complimentary to the mounting apertures 932 of the mounting surfaces 924, 928. The second face 952 defines a member 956 that is configured to be received by one of the cover apertures 936.

The first and second bracket covers 908, 912 together decoratively cover the mounting bracket 904. Stated another way, the mounting bracket 904 is generally not exposed. Only the portion of the mounting bracket 904 that faces roller tube 204, which is necessary to facilitate engagement of the plunger 220 with the aperture 916, is not exposed. However, the roller tube 204 and associated components of the roller tube assembly 200 generally shield the partially exposed portion of the mounting bracket 904 from sight. To facilitate covering of the mounting bracket 904, the mounting bracket 904 is received by first bracket cover 908. The second bracket cover 912 is then placed into engagement with the mounting bracket 904 based on the mounting surface 924, 928 to be used to mount the mounting bracket 904.

In a first mounting configuration, where the first mounting surface 924 is used to mount the mounting bracket 904, the second bracket cover 912 is oriented such that the mounting apertures 932*a* of the first face 948 are aligned with the mounting apertures 932 of the first mounting surface 924. The member 956 of the second face 952 is received by the cover aperture 936 of the second mounting surface 928. This facilitates one or more fasteners to be received by the aligned mounting aperture 932, 932*a* of the first mounting surface 924, while the second face 952 decoratively covers the second mounting surface 928 (see FIG. 50).

In a second mounting configuration, where the second mounting surface 928 is used to mount the mounting bracket 904, the second bracket cover 912 is oriented such that the mounting apertures 932*a* of the first face 948 are aligned with the mounting apertures 932 of the second mounting surface 928. The member 956 of the second face 952 is received by the cover aperture 936 of the first mounting surface 924. This facilitates one or more fasteners to be received by the aligned mounting aperture 932, 932*a* of the second mounting surface 928, while the second face 952 decoratively covers the first mounting surface 924.

Figure 51:
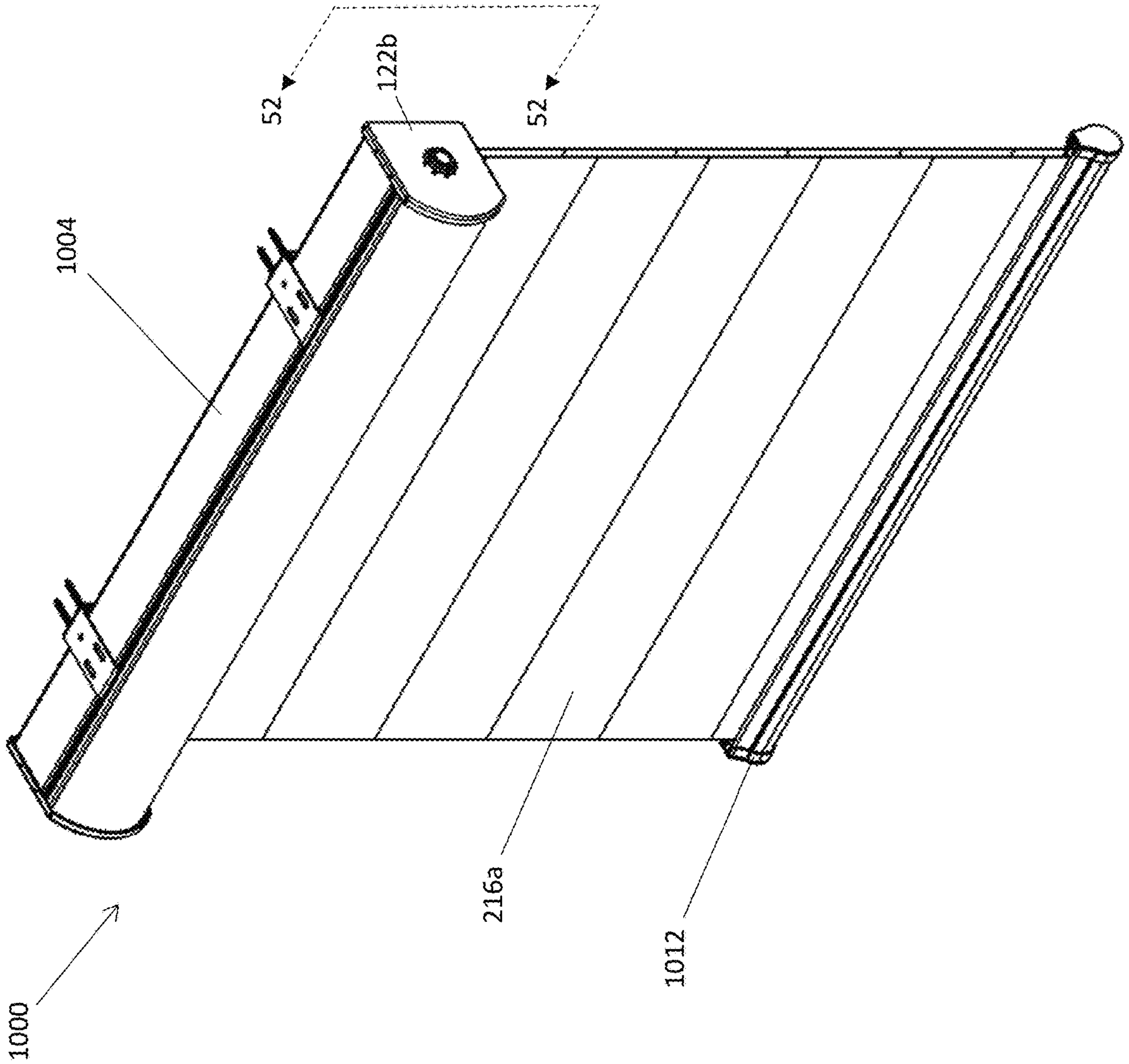
FIG. 51 is a perspective view of another embodiment of a roller shade assembly shown detached from an architectural opening.
Figure 52:
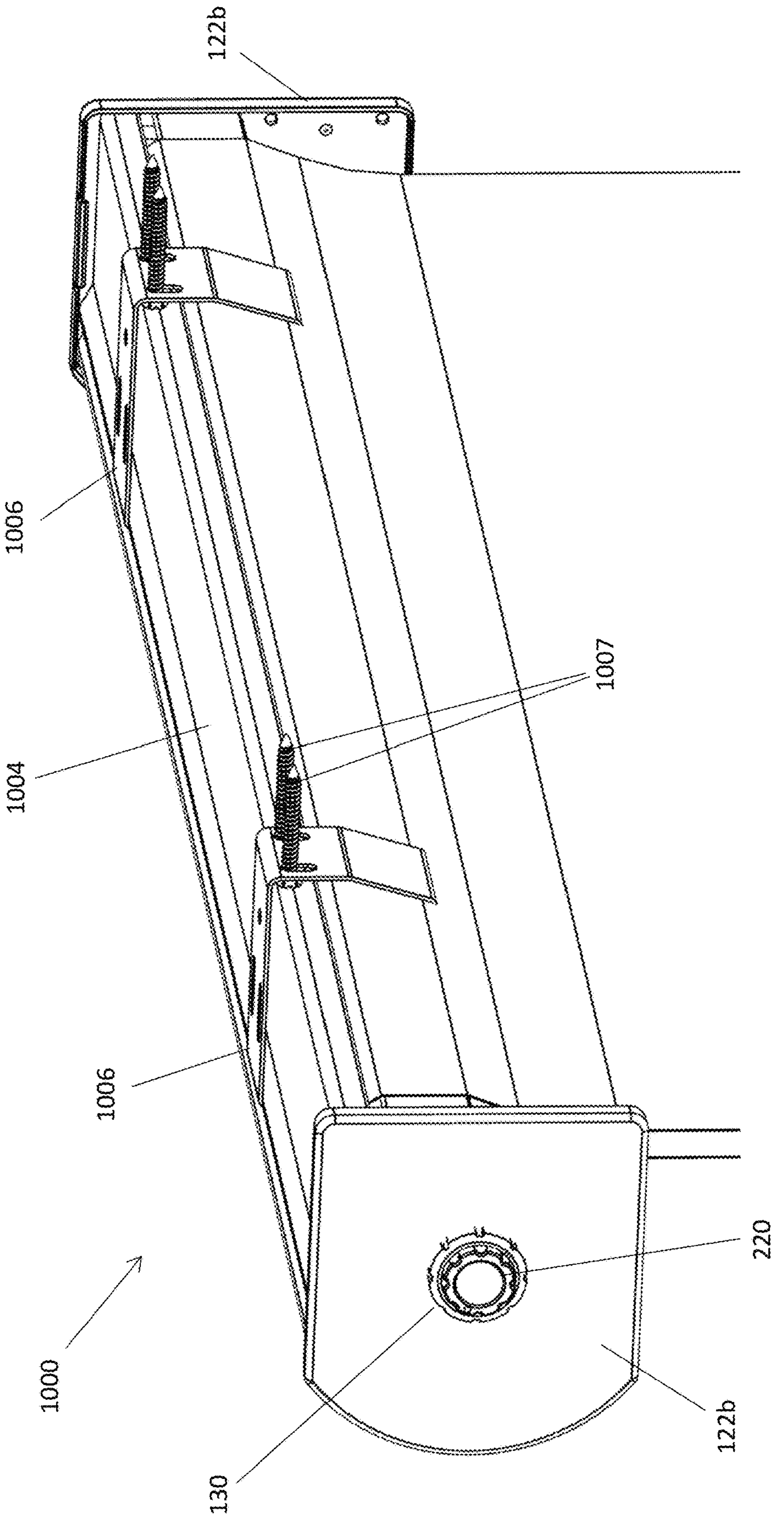
FIG. 52 is a perspective view of a portion of the roller shade assembly shown in FIG. 51, including a headrail, taken along line 52-52 of FIG. 51.
Figure 53:
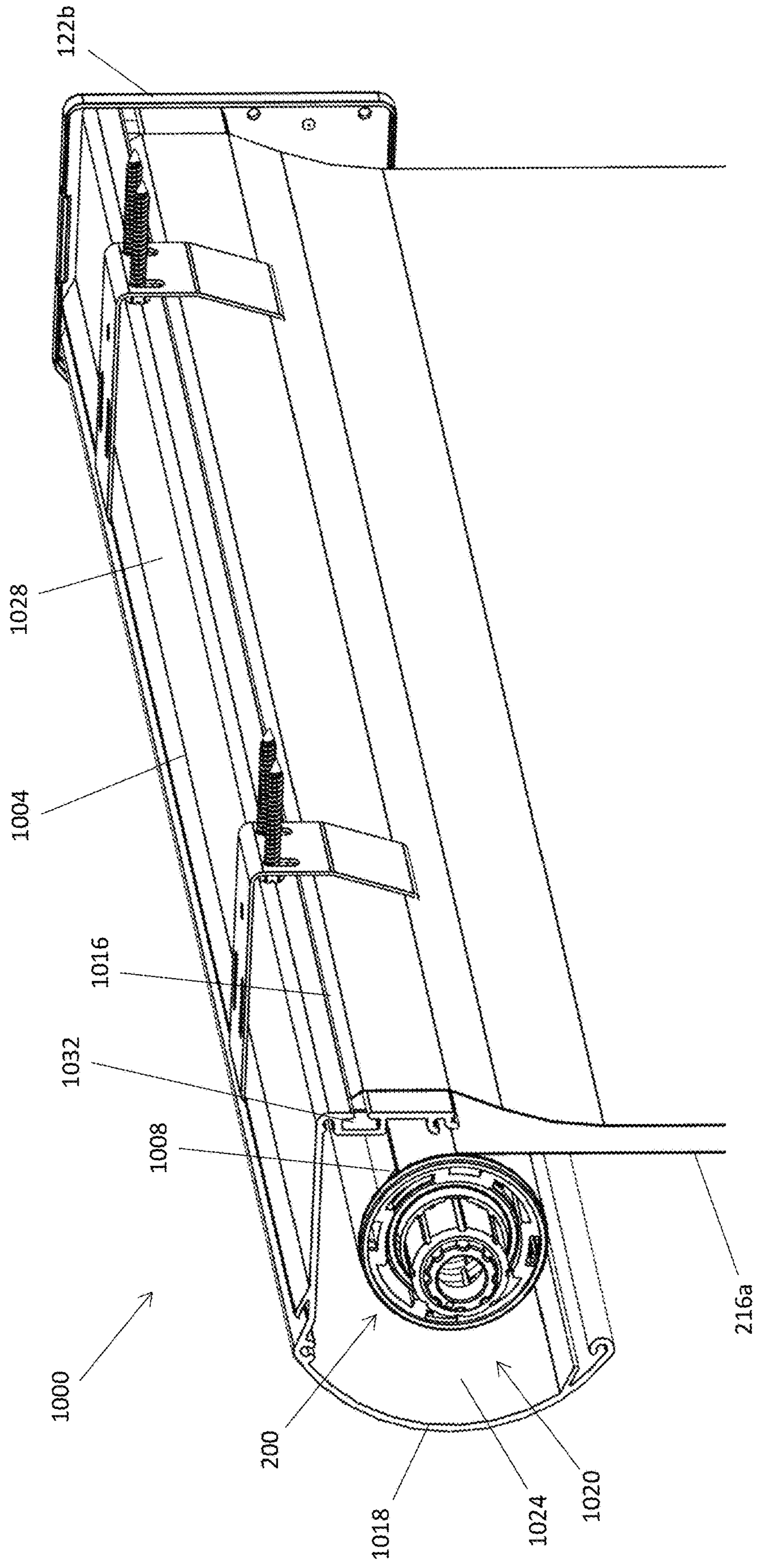
FIG. 53 is a perspective view of the portion of the roller shade assembly of FIG. 52, with one of the bracket members removed to illustrate roller shade assembly.

With reference now to FIGS. 51-53, another embodiment of a roller shade assembly 1000 is illustrated. The roller shade assembly 1000 is shown as a sheer shade. The shade assembly 1000 includes a headrail 1004 that receives a roller tube assembly 200 (see FIG. 53). The roller tube assembly 200 is identical to the roller tube assembly 200 discussed above, and includes the roller tube 204, the idler assembly 300, the spring tension assembly 400, and the brake assembly 600 (shown in FIG. 7). The idler assembly 300 and the spring tension assembly 400 are configured to be received in the first end 208 of the roller tube 204 (shown in FIG. 7). The brake assembly 600 is configured to be received in the second end 212 of the roller tube 204 (shown in FIG. 7). The roller tube assembly 200 is configured to engage bracket members 122*b*. With reference to FIG. 52, each bracket member 122*b* defines an aperture 130 that is configured to receive a plunger 220 of the roller tube assembly 200, as discussed above. The bracket members 122*b* have a different geometry than bracket members 122, 122*a*, and are not configured to mount relative to the architectural opening. The headrail 1004 instead mounts relative to the architectural opening with mounting brackets 1006 that are configured to engage a portion of the headrail 1004. The mounting brackets 1006 fasten relative to the architectural opening with a plurality of fasteners 1007 (e.g., screws, nails, bolts, etc.).

A covering 216*a* (or shade 216*a* or architectural covering 216*a*) is coupled to the roller tube 204. More specifically, the covering 216*a* includes a first end 1008 (shown in FIG. 53) that is coupled to the roller tube 204. The covering 216*a* extends from the roller tube 204 to an adjustable bottom rail 1012 (shown in FIG. 51). The bottom rail 1012 houses a cylindrical bar (or roller, not shown) in which the covering 216*a* partially wraps around and then exits the bottom rail 1012 to return to the headrail 1004. A second end 1016 of the covering 216*a* attaches to the headrail 1004.

Unlike known sheer shades, which attach the second end of the covering material within (or inside) of the headrail, the roller shade assembly 1000 advantageously attaches the second end 1016 of the covering 216*a* to a rear surface 1020 of the headrail 1004. Stated another way, the second end 1016 is attached outside of the headrail 1004. Since the attachment is not within the headrail 1004, there is more space within the headrail 1004. This allows for accommodation of a larger diameter roller tube assembly 200 and/or a larger quantity of covering 216*a* to be rolled onto the roller tube assembly 200.

The headrail 1004 includes a housing 1018 that partially defines an enclosure 1020. The enclosure 1020 receives the roller tube assembly 200. The housing 1018 includes a first side 1024 and a second, opposite side 1028. The first side 1024 is within the enclosure 1020 and faces the roller tube assembly 200. The second side 1028 is an exterior side of the headrail 1004. The housing 1018 defines a channel 1032 that is positioned on the second side 1028 of the headrail 1004. The channel 1032 is a longitudinal channel that is configured to receive the second end 1016 of the covering 216*a*. A spline (not shown) is configured to be received in the channel 1032 to retain the second end 1016 of the covering 216*a*. The covering 216*a* extends from the channel 1032 and over a portion of the second side 1028 of the housing 1018 to the bottom rail 1012. From the second end 1016 to the bottom rail 1012, the covering 216*a* is positioned on an exterior side of the headrail 1004. The channel 1032 and associated portion of the covering 216*a* position on the exterior side of the headrail 1004 is generally not visible once the headrail 1004 is mounted, as the portion of the covering 216*a* is sandwiched between the headrail 1004 and the surface to which the headrail 1004 is mounted.

In operation, a user moves the bottom rail 1012 relative to the headrail 1004. As the bottom rail 1012 moves away from the headrail 1004, the covering material 216*a* unwinds from the roller tube 204 of the roller tube assembly 200. More specifically, since the second end 1016 of the covering material 216*a* is attached to the headrail 1004, as the bottom rail 1012 moves away from the headrail 1004, the cylindrical bar applies a downward force onto the covering material 216*a*. This force translates to the roller tube assembly 200, facilitating an unwinding of the covering material 216 from the roller tube 204. The covering material 216*a* slides around the cylindrical bar as the bottom rail 1012 continues to move away from the headrail 1004. Moving the bottom rail 1012 towards the headrail 1004 facilitates winding of the covering material 216 onto the roller tube 204.

What is claimed is:

1. A roller shade assembly comprising:

a roller tube including a first end opposite a second end, the roller tube defining an opening longitudinally extending between the first and second ends;

an idler assembly partially received by the roller tube opening at the first end, the idler assembly including an idler housing, an idler member carried by the idler housing, a plunger received by the idler housing, a biasing member configured to apply a biasing force onto the plunger, and a first locking member defined by the idler housing, the first locking member defining an opening, wherein the plunger is configured to slide relative to the idler housing, and the plunger is configured to selectively engage a bracket member, and wherein the idler member is configured to engage the roller tube;

a spring assembly received by the roller tube, the spring assembly including a housing, a shaft received by the spring assembly housing, a spring member connected at one end to the spring assembly housing and at an opposite end to the shaft, and a second locking member defined by the spring assembly housing, wherein the second locking member is configured to be received by the opening defined by the first locking member to interlock the first and second locking members; and a spring drive received by the roller tube, the spring drive including a drive shaft, the drive shaft is configured to interlock with the shaft of the spring assembly, and the spring drive is configured to engage the roller tube, wherein in response to rotation of the roller tube, the spring drive is configured to rotate with the roller tube, the shaft of the spring assembly is configured to rotate in response to rotation of the spring drive, and the idler member is configured to rotate with the roller tube and relative to the idler housing, and wherein in response to rotation of the shaft of the spring assembly, the spring member is configured to apply a counterbalancing force to the roller tube.

2. The roller shade assembly of claim 1, wherein the plunger is configured to slide relative to the idler housing along an axis, the axis defining an axis of rotation of the roller tube.

3. The roller shade assembly of claim 1, further comprising a bearing coupled to the idler housing, the idler member engages the bearing to rotate relative to the idler housing.

4. The roller shade assembly of claim 3, wherein the bearing is received by an annular groove defined by the idler housing.

5. The roller shade assembly of claim 1, further comprising a timing ring coupled to the idler housing, the timing ring is configured to rotate relative to the idler housing.

6. The roller shade assembly of claim 5, wherein the idler housing defines a helical thread, the timing ring defines a timing ring thread, and the timing ring thread is configured to engage the helical thread, and wherein the idler housing defines an internal channel, the plunger is slidably received by the internal channel, and the helical thread overlaps the internal channel.

7. The roller shade assembly of claim 5, wherein the idler housing defines a helical thread, the timing ring defines a timing ring thread, and the timing ring thread is configured to engage the helical thread, and wherein in response to rotation of the timing ring relative to the idler housing, the timing ring laterally travels along the idler housing.

8. The roller shade assembly of claim 7, wherein the idler housing includes a support collar defining a first stop member, and the timing ring defines a second stop member, wherein in response to the second stop member contacting the first stop member, the timing ring is restricted from rotational movement relative to the idler housing in a first direction.

9. The roller shade assembly of claim 1, wherein in response to rotation of the roller tube, the spring drive is configured to rotate relative to the housing of the spring assembly, and wherein in response to rotation of the shaft the spring member applies a biasing force onto the shaft to generate the counterbalancing force.

10. The roller shade assembly of claim 1, further comprising:

a brake assembly received by the roller tube, the brake assembly including:

a brake housing;

a brake shaft partially received by the brake housing;

a brake cap coupled to the brake shaft;

a plurality of braking surfaces carried by the brake shaft and received by the brake housing; and a brake force adjustment member partially received by the brake housing and in operable engagement with the plurality of braking surfaces, wherein the brake cap is configured to engage the roller tube, and wherein in response to rotation of the brake force adjustment member relative to the brake housing, a braking force applied by the plurality of braking surfaces to the roller tube is adjusted.

11. The roller shade assembly of claim 10, wherein the brake force adjustment member is threadably engaged with the brake housing.

12. The roller shade assembly of claim 10, wherein the idler assembly is a first idler assembly, and further comprising:

a second idler assembly partially received by the opening at the second end of the roller tube, the second idler assembly including a second idler housing, a second plunger received by the second idler housing, and a second biasing member configured to apply a biasing force onto the second plunger, wherein the second plunger is configured to slide relative to the second idler housing, the second plunger is configured to selectively engage a second bracket member, and the second idler housing engages the brake housing, a portion of the brake force adjustment member is received by the second idler housing.

13. The roller shade assembly of claim 1, wherein the idler housing defines an aperture, and the first end of the biasing member is received by the aperture.

14. The roller shade assembly of claim 13, wherein the shaft defines a slot, and the second end of the biasing member is received by the slot.

15. The roller shade assembly of claim 1, wherein the shaft of the spring assembly is configured to rotate relative to the housing of the spring assembly.

16. The roller shade assembly of claim 1, wherein in response to rotation of the roller tube in a first direction the spring assembly is configured to apply a counterbalancing force to the roller tube through the spring drive.

17. A roller shade assembly comprising:

an idler assembly partially received by a roller tube, the idler assembly including an idler housing, an idler member carried by the idler housing, and a first locking member defined by the idler housing, the first locking member defining an opening, wherein the idler member is configured to engage the roller tube;

a spring assembly received by the roller tube, the spring assembly including a housing, a shaft received by the spring assembly housing, and configured to rotate relative to the spring assembly housing, a spring member connected at one end to the spring assembly housing and at an opposite end to the shaft, and a second locking member defined by the spring assembly housing, wherein the second locking member is configured to be received by the opening defined by the first locking member to interlock the first and second locking members; and a spring drive received by the roller tube, the spring drive including a drive shaft, the drive shaft is configured to interlock with the shaft of the spring assembly, and the spring drive is configured to engage the roller tube, wherein in response to rotation of the roller tube in a first direction, the spring drive is configured to rotate with the roller tube, the shaft of the spring assembly is configured to rotate in response to rotation of the spring drive, and the idler member is configured to rotate with the roller tube and relative to the idler housing, and wherein in response to rotation of the shaft of the spring assembly in the first direction, the spring member is configured to apply a counterbalancing force to the roller tube.

18. The roller shade assembly of claim 17, wherein in response to the rotation of the roller tube, the idler housing and the spring assembly housing remain stationary.

* * * * *